United States Patent
Mathur et al.

(10) Patent No.: US 12,518,843 B2
(45) Date of Patent: Jan. 6, 2026

(54) FAILSAFE MEMORY CARD ARCHITECTURE USING VOLTAGE DRIVER OUTPUT ENABLE SIGNALS

(71) Applicant: Sandisk Technologies, Inc., Milpitas, CA (US)

(72) Inventors: Shiv Harit Mathur, Bangalore (IN); Sai Ravi Teja Konakalla, Bangalore (IN); Niravkumar Natwarbhai Patel, Bangalore (IN); Utkarsh Srivastava, Bengaluru (IN); Gopikrishna Siddula, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 23 days.

(21) Appl. No.: 18/362,804

(22) Filed: Jul. 31, 2023

(65) Prior Publication Data

US 2024/0347120 A1    Oct. 17, 2024

Related U.S. Application Data

(60) Provisional application No. 63/496,322, filed on Apr. 14, 2023.

(51) Int. Cl.
*G11C 29/02* (2006.01)
*G11C 5/14* (2006.01)
*G11C 7/10* (2006.01)

(52) U.S. Cl.
CPC ........... *G11C 29/021* (2013.01); *G11C 5/147* (2013.01); *G11C 7/1096* (2013.01); *G11C 29/022* (2013.01)

(58) Field of Classification Search
CPC ..... G11C 29/021; G11C 5/147; G11C 7/1096; G11C 29/022
See application file for complete search history.

(56) References Cited

U.S. PATENT DOCUMENTS

| | | | |
|---|---|---|---|
| 10,666,257 B1 | 5/2020 | Srinivasan | |
| 10,673,436 B1 | 6/2020 | Hegde | |
| 11,416,691 B2 | 8/2022 | Yang | |
| 11,626,876 B2 * | 4/2023 | Wijetunga | ....... H03K 19/00361 326/14 |
| 2020/0243512 A1* | 7/2020 | Sharma | ................ H10D 89/911 |
| 2022/0005520 A1 | 1/2022 | Fujimoto | |
| 2022/0052690 A1 | 2/2022 | Wijetunga | |

* cited by examiner

*Primary Examiner* — Vanthu T Nguyen
(74) *Attorney, Agent, or Firm* — Pearl Cohen Zedek Latzer Baratz LLP

(57) ABSTRACT

Embodiments of the present technology provide memory cards intelligently designed to provide protection when mistakenly inserted into non-memory card hosts. Embodiments achieve such protection with less footprint/circuitry than existing fail-safe solutions, and without electrical overstress-causing offset voltages characteristic of existing fail-safe solutions. To realize these advantages, a memory card of the present technology includes a fail-safe reference voltage supply circuit that operates in a "fail-safe mode" by default, and exits and re-enters the fail-safe mode in response to voltage mode driver output enable (OE) signals.

19 Claims, 26 Drawing Sheets

| Parameters | OE=0 (VDDO=0V) | OE=0 (VDDO=1.8V) | OE=0 (VDDO=3.3V) | OE=1 (VDDO=1.8V) | OE=1 (VDDO=3.3V) |
|---|---|---|---|---|---|
| VDDO | (VDDO=0V) | (VDDO=1.8V) | (VDDO=3.3V) | VDDO=1.8V | VDDO=3.3V |
| POC | 0 | 1 | 1 | 1 | 1 |
| LV | 0 | 1 | 0 | 1 | 0 |
| INPUT | X | X | X | 0 or 1 | 0 or 1 |
| PAD | From 0 V to 3.3V | From 0 V to 3.3V | From 0 V to 3.3V | From 0 V to VDDO | From 0 V to VDDO |
| REFP_fs | 0.5*PAD | REFP | REFP | REFP | REFP |
| REFN_fs | 0.5*PAD | REFN | REFN | REFN | REFN |
| DATA_P_B | 0.5*PAD | VDDO | VDDO | VDDO when Input =0; REFP when input =1 | VDDO when Input =0; REFP when input =1 |
| REFP_DRIVER_FS | PAD | Higher of PAD and REFP_fs | Higher of PAD and REFP_fs | REFP_FS | REFP_FS |
| REFN_DRIVER_FS | 0.5*PAD | Lower of PAD and REFN_fs | Lower of PAD and REFN_fs | REFN_FS | REFN_FS |
| DATA_N_B | 0 | 0 | 0 | REFN when Input =0; 0V when input =1 | REFN when Input =0; 0V when input =1 |

FIG. 9

FAILSAFE MEMORY CARD ARCHITECTURE USING VOLTAGE DRIVER OUTPUT ENABLE SIGNALS

CROSS REFERENCE TO RELATED APPLICATIONS

This application claims the benefit of and priority to U.S. Provisional Patent Application No. 63/496,322, filed on Apr. 14, 2023, the contents of which are incorporated herein by reference in their entirety.

DESCRIPTION OF RELATED ART

A memory card (e.g., a secure digital card (SD card), a micro-SD card, etc.) is a non-volatile flash memory card developed for use in portable devices. Memory cards are often sold/packaged separately from the devices in which they are implemented. Accordingly, a user typically (manually) inserts a memory card into a specially configured slot/adaptor (i.e., a memory card host) of a device. Upon insertion, pins of the memory card (e.g., supply pins, ground pins, I/O pins, etc.) should align with corresponding pins of the memory card host. For example, a supply pin of the memory card should align (i.e., substantially/completely overlap) with a supply pin of the memory card host, a data line input/output (I/O) pin of the memory card should align with a corresponding data line I/O pin of the memory card host, and so on.

A memory card typically includes one or more transceivers (e.g., data line transceivers, control line transceivers, etc.). A memory card transceiver can send and receive signals to and from a host (e.g., a memory card host) via an I/O pad (e.g., a data line I/O pad, a control line I/O pad, etc.). When the transceiver is transmitting (i.e., in a transmitter mode), a voltage mode driver of the transceiver can drive voltage of the I/O pad to desired values—thereby transmitting desired signals to the host. When the transceiver is receiving (i.e., in a receiver mode), voltage of the I/O pad is driven by external signals received from the host. In general, the voltage mode driver is enabled (i.e., on/activated) when the transceiver is transmitting and disabled (i.e., off/deactivated) when the transceiver is receiving. The voltage mode driver is enabled in response to voltage mode driver enabling output enable (OE) signals, and disabled in response to voltage mode driver disabling OE signals. Voltage mode driver enabling OE signals and voltage mode driver disabling OE signals may generally be referred to as voltage mode driver OE signals herein. Voltage mode driver OE signals—along with input signals desired to be transmitted via the I/O pad—are typically provided to a pre-driver of the transceiver by control/processing circuitry of the memory card.

One type of voltage mode driver used in memory cards is a voltage mode cascoded driver. An example voltage mode cascoded driver implemented in a memory card may include four metal-oxide-semiconductor (MOS) devices (see e.g., FIG. 6). Gate terminals of two of the MOS devices may be supplied with data-driven voltage signals (i.e., voltages that enable or disable the voltage mode cascoded driver—and when the voltage mode cascoded driver is enabled, determine the voltage the voltage mode cascoded driver will drive an I/O pad to). Gate terminals of the other two MOS devices may be supplied with "reference voltage signals" that protect the MOS devices and other components of the memory card. In the voltage mode cascoded driver, two of the MOS devices (e.g., a first data-driven signal-receiving MOS device and a first reference voltage signal-receiving MOS device) may comprise a "top branch" that is electrically connected between an MCIO supply line (i.e., a supply line connected to the IO domain of the memory card) and an I/O pad. The other two MOS devices (e.g., a second data-driven signal-receiving MOS device and a second reference voltage signal-receiving MOS device) may comprise a "bottom branch" of the voltage mode cascoded driver that is electrically connected between an MCIO ground line (i.e., a ground line connected to the 10 domain of the memory card) and the I/O pad. When the voltage mode cascoded driver is enabled, typically only one of the top branch and the bottom branch will be enabled, while the other is disabled.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 9 depicts a table illustrating example values for pre-reference voltages, reference voltage signals, and data-driven signals, in accordance with various embodiments of the present technology.

The figures are not exhaustive and do not limit the present disclosure to the precise form disclosed.

DETAILED DESCRIPTION

As alluded to above, memory cards are often sold/packaged separately from the devices in which they are implemented. Accordingly, a user typically (manually) inserts a memory card into a specially configured slot/adaptor (i.e., a memory card host) of a device.

Modern devices often have multiple slots/adaptors (i.e., hosts) configured to receive different types of cards. For example, a device can have both a memory card host (i.e., a slot/adaptor configured to receive a memory card) and a nano-Subscriber Identity Module (nano-SIM) host (i.e., a slot/adaptor configured to receive a nano-SIM card). Form factors for memory cards/hosts and nano-SIM hosts can be quite similar (see e.g., FIG. 5 for illustration). Unfortunately, form factor/appearance similarity between memory cards/hosts and nano-SIM hosts can lead to problematic "mistaken insertion" scenarios where a user mistakenly inserts a memory card into a nano-SIM host.

Figure 5:
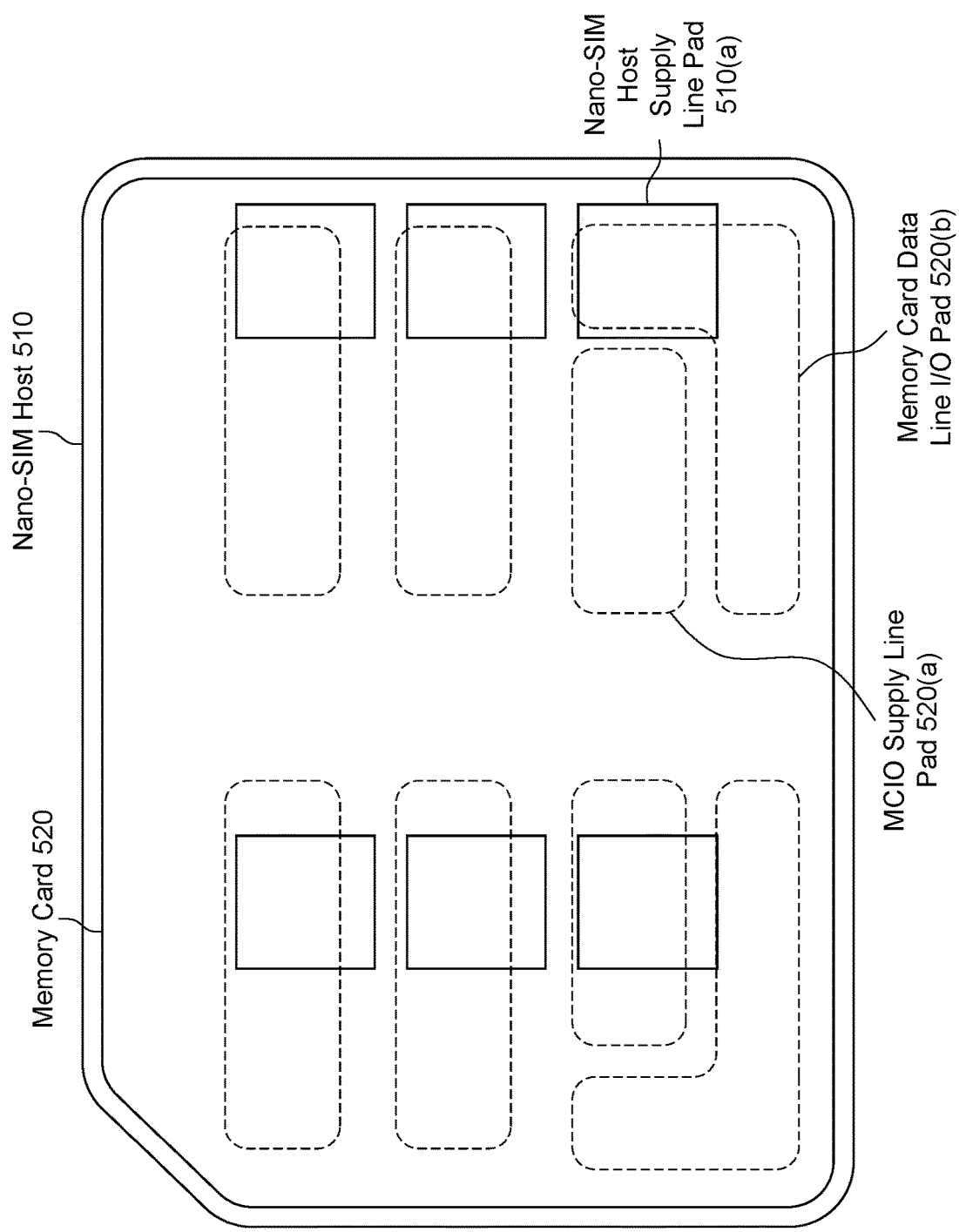
FIG. 5 depicts an overlay between an example nano-Subscriber Identity Module (nano-SIM) host and an example memory card.

In the above-described "mistaken insertion" scenarios, certain pins of the memory card will often overlap with pins of the nano-SIM host (see e.g., FIG. 5 for illustration). As a common example, a data line I/O pin of the memory card will overlap with a supply pin of the nano-SIM host. Overlap between the memory card data line I/O pin and the nano-SIM host supply pin can be especially problematic when the nano-SIM host supply pin does not overlap with a supply pin of the memory card. In these scenarios, a memory card data line I/O pad (associated with the memory card data line I/O pins) may be driven to the supply voltage of the nano-SIM host while the memory card supply pin is left floating. With the memory card supply pin floating, voltage of an MCIO supply line of the memory card will be essentially 0 V as voltage of the MCIO supply line is derived from the memory card supply pin. This is problematic because—among other reasons—the reference voltage signals designed to protect components of the memory card are conventionally derived from voltage of the MCIO supply line (as described above, these reference voltage signals may be supplied to gate terminals of reference voltage signal-receiving MOS devices of a voltage mode driver implemented in the memory card). Accordingly, when the voltage of the MCIO supply line is 0 V (or essentially 0 V), the values of the reference voltage signals will follow. When supplied at 0 V, the reference voltage signals designed to protect components of the memory card can be ineffectual. This lack of reference voltage signal protection can lead to electrical overstress-related degradation of the memory card when the nano-SIM host supply pin drives voltage of the memory card data line I/O pad to non-zero values (e.g., 3.3 V).

In addition to electrical overstress-related degradation, other problems can arise when a memory card data line I/O pad is driven by supply voltage of a nano-SIM host while the memory card supply pin is floating. For example, a current path may be created through components of the memory card electrically connected between the memory card data line I/O pad and the MCIO supply line (such electrical components may include the "top branch" MOS devices of a voltage mode driver implemented in the memory card). Namely, current may flow from the (higher voltage) memory card data line I/O pad to the (lower voltage) MCIO supply line through the components—leading to electromigration-related degradation of the memory card.

The above-described concerns (i.e., lack of effective reference voltage protection and current paths between memory card data line I/O pad and MCIO supply line) may be similar when the memory card supply pin is not floating—but the MCIO supply line voltage is lower than a host's (either a memory card host's or a non-memory card host's) supply voltage driving voltage of an memory card transceiver I/O pad (i.e., an I/O pad of an memory card transceiver, such as a data line I/O pad of a memory card, a control line I/O pad of a memory card, etc.). In these scenarios, reference voltage signals derived from the MCIO supply line voltage (e.g., 1.8 V) may not be high enough to provide effective protection to the memory card when the memory card transceiver I/O pad is driven to the higher supply voltage of the host (e.g., 3.3 V). Similarly, because the memory card transceiver I/O pad voltage is higher than the MCIO supply line voltage (i.e., 3.3 V vs. 1.8 V), there may still be a current path through components of the memory card electrically connected between the (higher voltage) memory card transceiver I/O pad and the (lower voltage) MCIO supply line.

To protect memory cards in scenarios similar to those described above, a few current technologies leverage fail-safe solutions. However, these existing fail-safe solutions have flaws. For example, such fail-safe solutions typically utilize a comparison between MCIO supply line voltage and memory card transceiver I/O pad voltage to determine whether a "fail-safe mode" should be triggered. Such a comparison typically requires large footprint voltage comparison circuits—which can add cost to the memory card among other negative implications. Relatedly, a common by-product of voltage comparison/voltage comparison circuits is the addition of a large offset voltage (sometimes on the order of 800 mV or higher) to MCIO supply line voltage. For example, in conventional solutions a fail-safe mode may only be triggered when:

(Memory card data line I/O pad voltage)>(MCIO supply line voltage+offset voltage)

The (large) offset voltages characteristic of existing fail-safe solutions can electrically overstress components of a memory card before a fail-safe mode is triggered, leading to electrical overstress-related degradation of the memory card. Relatedly, in certain scenarios (i.e., when memory card transceiver I/O pad voltage is within the large offset range of MCIO supply line voltage) the fail-safe mode may not be triggered even when memory card transceiver I/O pad voltage is higher than reliability limits of electrical components of the memory card—which can also lead to electrical overstress-related degradation of the memory card. In sum, conventional/existing fail-safe solutions for memory cards are imperfect due to large footprint requirements (and associated costs), large offset voltages, and sub-optimal protection.

Against this backdrop, embodiments of the present technology provide memory cards intelligently designed to provide protection when the memory cards are inserted into non-memory card hosts (e.g., nano-SIM hosts). Embodiments achieve such protection with less footprint/circuitry than existing fail-safe solutions, and without electrical overstress-causing offset voltages characteristic of existing fail-safe solutions.

To realize these advantages, a memory card of the present technology includes a fail-safe reference voltage supply circuit that operates in a "fail-safe mode" by default, and exits and re-enters the fail-safe mode in response to voltage mode driver OE signals. Because the fail-safe solution of the present technology does not rely on large voltage comparison circuits, embodiments may be less expensive and easier to implement than existing fail-safe solutions. Relatedly, without the (large) offset voltages characteristic of voltage comparison circuits, embodiments may be realized with less electrical overstress-related degradation than existing fail-safe solutions.

In various examples, a memory card of the present technology may comprise: (1) an I/O pad (e.g., a data line I/O pad, a control line I/O pad, etc.); (2) a voltage mode driver comprising a reference voltage signal-receiving MOS device, wherein a drain terminal of the reference voltage signal-receiving MOS device is electrically connected to the I/O pad (it should be understood that such a voltage mode driver may comprise one or more additional reference voltage signal-receiving MOS devices electrically connected to the I/O pad—which are not described here for the sake of brevity); and (3) a fail-safe reference voltage signal supply circuit that supplies a reference voltage signal to a gate terminal of the reference voltage signal-receiving MOS device based in part on voltage mode driver OE signals received by the fail-safe reference voltage signal supply circuit (it should be understood that the fail-safe reference voltage signal supply circuit may supply additional reference voltage signals where the voltage mode driver has multiple reference voltage signal-receiving MOS devices).

The fail-safe reference voltage signal supply circuit may operate in a fail-safe mode by default, and switch to a normal operation mode in response to receiving a voltage mode driver enabling OE signal (i.e., an OE signal conventionally sent by processing circuitry of the memory card to enable a voltage mode driver). In various embodiments, processing circuitry of the memory card may only provide voltage mode driver enabling OE signals after an initialization process has been successfully completed between the memory card and a host into which the memory card is inserted. Because a (mistakenly inserted) memory card could not complete such an initialization process with a non-memory card host (e.g., a nano-SIM host), such a design feature ensures that during mistaken insertion scenarios the memory card only operates in the fail-safe mode. Upon completion of such an initialization process, the fail-safe reference voltage signal supply circuit can switch to a normal operation mode in response to receiving a voltage mode driver enabling OE signal.

As will be described in greater detail below, when the fail-safe reference voltage signal supply circuit operates in the fail-safe mode and the supply pin of the memory card is floating, the reference voltage signal supplied by the fail-safe reference voltage signal supply circuit may comprise an I/O pad-based voltage (i.e., a voltage derived from voltage of the I/O pad). By contrast, when the fail-safe reference voltage signal supply circuit operates in the normal operation mode, the reference voltage signal supplied by the fail-safe reference voltage signal supply circuit may comprise an MCIO supply line-based voltage (i.e., a voltage derived from voltage of the MCIO supply line)—as would be conventional in existing non-fail-safe technologies.

In certain examples, the fail-safe reference voltage signal supply circuit may comprise: (a) a first logic switch sub-circuit; and (b) a second logic switch sub-circuit. The first logic switch sub-circuit may comprise: (i) a first source terminal that receives the I/O pad-based voltage; (ii) a second source terminal that receives a pre-reference voltage (the value of this pre-reference voltage may vary depending on whether the fail-safe reference voltage signal supply circuit operates in the fail-safe mode vs. the normal operation mode and/or voltage of the MCIO supply line); and (iii) a drain terminal that supplies, to a first source terminal of the second logic switch sub-circuit, the higher voltage received by the first and second source terminals of the first logic switch sub-circuit. The second logic switch sub-circuit may comprise: (i) the first source terminal (of the second logic switch sub-circuit) that receives voltage supplied from the drain terminal of the first logic switch sub-circuit; (ii) a second source terminal that receives the pre-reference voltage; (iii) a switching terminal that receives voltage mode driver OE signals; and (iv) a drain terminal that supplies the reference voltage signal to the gate terminal of the reference voltage signal-receiving MOS device such that: ($\alpha$) the reference voltage signal comprises the voltage received by the first source terminal of the second logic switch sub-circuit by default (and in response to the switching terminal of the second logic switch sub-circuit receiving a voltage mode driver disabling OE signal); and ($\beta$) in response to the switching terminal of the second logic switch sub-circuit receiving a voltage mode driver enabling OE signal (i.e., the trigger for switching to the normal operation mode), the reference voltage signal comprises the voltage received by the second source terminal of the second logic switch sub-circuit. When the fail-safe reference voltage signal supply circuit operates in the fail-safe mode and the memory card supply pin is floating, the pre-reference voltage may be a second I/O pad-based voltage which is smaller than the I/O based-voltage supplied at the first source terminal of first logic switch sub-circuit. Accordingly, the drain terminal of the first logic switch sub-circuit may supply the I/O pad-based voltage to the first source terminal of the second logic switch sub-circuit. Relatedly, by default (and in response to receiving a voltage mode driver disabling OE signal), the drain terminal of the second logic switch sub-circuit may supply, as the reference voltage signal, the I/O pad-based voltage received at the first source terminal of the second logic switch sub-circuit. In this way, an I/O pad-based reference voltage signal is supplied to the gate terminal of the reference voltage signal-receiving MOS device when the voltage of the MCIO supply line is essentially 0 V (as the memory card supply pin is floating)—thereby reducing/eliminating electrical overstress-related degradation in such a scenario.

In some embodiments, the voltage mode driver may further comprise a data-driven signal-receiving MOS device (it should be understood that the voltage mode driver may include one or more additional data-driven signal-receiving MOS devices—which are not described here for the sake of brevity). A source terminal of the data-driven signal-receiving MOS device may be electrically connected to the MCIO supply line. A drain terminal of the data-driven signal-receiving MOS device may be connected to a source terminal of the reference voltage signal-receiving MOS device. Accordingly, the data driven signal-receiving MOS device and the reference voltage signal-receiving MOS device may comprise a "top branch" of the voltage mode driver. In these examples, when the fail-safe reference voltage signal supply circuit operates in the fail-safe mode and the memory card supply pin is floating, the voltage supplied to a gate terminal of the data-driven voltage signal-receiving MOS device may be an I/O pad-based voltage as well in order to protect the memory card.

In some embodiments, the memory card may further comprise an electrostatic discharge (ESD) float rail. Voltage of the ESD float rail may be set to the higher of the voltage of the I/O pad and voltage of the MCIO supply line. In these examples, the data-driven signal-receiving MOS device may include a first internal diode and the reference voltage signal-receiving MOS device may include a second internal diode. Negative terminals (n-terminals) of the first and second internal diodes respectively may be electrically connected to the ESD float rail. As will be described in greater detail below, such a design breaks from convention where these n-terminals are instead electrically connected to the MCIO supply line. However by connecting the n-terminals of the first and second internal diodes to the ESD float rail instead, embodiments can reduce/eliminate electromigration-related degradation caused by currents flowing through the first and second internal diodes when the MCIO supply line is at a lower voltage than the I/O pad. In some embodiments, the memory card may further comprise a diode associated with the I/O pad. In these embodiments, a positive terminal (p-terminal) of the I/O pad-associated diode may be electrically connected to the I/O pad while an n-terminal of the I/O pad-associated diode is electrically connected to the ESD float rail. Again, such a design breaks from convention where such an n-terminal is typically electrically connected to the MCIO supply line. However by connecting the n-terminal of the I/O pad-associated diode to the ESD float rail instead, embodiments can reduce/eliminate electromigration-related degradation caused by currents flowing through the I/O pad-associated diode when the MCIO supply line is at a lower voltage than the I/O pad.

Specific design features of the above-described technology—along with their associated benefits—will be described in greater detail the following paragraphs.

Operating in Fail-Safe Mode by Default

As alluded to above, a memory card of the present technology may be configured to operate in a fail-safe mode by default. Accordingly, the memory card (i.e., processing circuitry of the memory card) may only exit the fail-safe mode after successful completion of an initialization process that is conventionally performed between a memory card host and memory card. That is, the memory card may only provide voltage mode driver enabling OE signals that trigger exit from the fail-safe mode after successful completion of the initialization process. Because a (mistakenly inserted) memory card could not complete such an initialization process with a non-memory card host (e.g., a nano-SIM host), such a design feature ensures that during mistaken insertion scenarios the memory card only operates in the fail-safe mode.

Exiting and Re-Entering Fail-Safe Mode Using Voltage Mode Drive OE Signals

As alluded to above, a memory card of the present technology includes a fail-safe reference voltage supply circuit that operates in a "fail-safe mode" by default, and exits/re-enters the fail-safe mode in response to voltage mode driver OE signals. Namely, the fail-safe reference voltage supply circuit operates in the fail-safe mode by default and switches to a normal operation mode in response to receiving voltage mode driver enabling OE signals (i.e., OE signals conventionally used for enabling a voltage mode driver). The fail-safe reference voltage supply circuit may then re-enter the fail-safe mode in response to receiving voltage mode driver disabling OE signals (i.e., OE signals conventionally used for disabling a voltage mode driver).

As alluded to above, by using voltage mode driver OE signals for exiting/re-entering fail-safe mode, embodiments can realize a fail-safe solution without relying on large voltage comparison circuits. Accordingly, embodiments may be less expensive and easier to implement than existing fail-safe solutions. Relatedly, without the (large) offset voltages characteristic of voltage comparison circuits, embodiments may be realized with less electrical overstress-related degradation than existing fail-safe solutions.

By using voltage mode driver OE signals as the trigger for exiting/re-entering fail-safe mode, embodiments leverage an existing/conventional signal for a new and additional purpose. In doing so, embodiments can achieve a simpler fail-safe solution than alternatives which require a specialized signal and/or specialized processing circuitry to trigger exiting/re-entering fail-safe mode. Accordingly, embodiments may be less expensive/simpler to implement than alternative solutions.

Operation of the Fail-Safe Reference Voltage Supply Circuit During "Fail-Safe" Mode When the fail-safe reference voltage supply circuit operates in the fail-safe mode, the memory card will be protected when inserted into non-memory card hosts. As described above, in certain mistaken insertion scenarios, voltage of an I/O pad of the memory card (e.g., a data line I/O pad, a control line I/O pad, etc.) may be driven by a supply voltage of a non-memory card host, while the supply pin of the memory card is left floating. With the memory card supply pin floating, the voltage of the MCIO supply line will be essentially 0 V as voltage of the MCIO supply line is derived from the memory card supply pin. This is problematic because—among other reasons—the reference voltage signals designed to protect components of the memory card are conventionally derived from the MCIO supply line voltage (as described above, these reference voltage signals may be supplied to gate terminals of reference voltage signal-receiving MOS devices of a voltage mode driver implemented in the memory card). Accordingly, when the voltage of the MCIO supply line is 0 V (or essentially 0 V), the values of the reference voltage signals will follow. When supplied at essentially 0 V, the reference voltage signals designed to protect components of the memory card can be ineffectual. This lack of reference voltage signal protection can lead to electrical overstress-related and electromigration-related degradation of the memory card when the non-memory card host supply voltage drives voltage of the I/O pad to non-zero values (e.g., 3.3 V).

To address the floating memory card supply pin problems described above, during fail-safe mode operation the failsafe reference voltage supply circuit of the present technology may supply reference voltage signals derived from the I/O pad (i.e., I/O pad-based reference voltage signals). By deriving reference voltage signals from I/O pad voltage—instead of MCIO supply line voltage—embodiments can ensure that effective reference voltage signals are provided when the memory card supply pin is floating due to mistaken insertion into a non-memory card host. That is, even when I/O pad voltage of a (mistakenly inserted) memory card is driven by supply voltage of a non-memory card host while the memory card supply pin is floating—the fail-safe reference voltage supply circuit provides effective reference voltage signals derived from the I/O pad voltage. Again, such a design deviates from conventional systems where reference voltage signals are derived from the MCIO supply line voltage.

As will be described in greater detail below, during fail-safe mode operation the fail-safe reference voltage supply circuit of the present technology may selectively/strategically supply I/O pad-based reference voltage signals even when the MCIO supply line pad is non-floating. That is, when the fail-safe reference voltage supply circuit operates in the fail-safe mode and the memory card supply pin is non-floating (which may occur in certain mistaken insertion scenarios, but will occur more commonly in non-mistaken insertion scenarios), the fail-safe reference voltage supply circuit may provide I/O pad-based reference voltage signals and/or MCIO supply line-based reference voltage signals depending on relative values between the I/O pad voltage and the MCIO supply line voltage. As alluded to above (and as will be described in greater detail below), the fail-safe reference voltage supply circuit can be implemented using cascaded logic switch sub-circuits that automate the above-described selection such that an appropriate reference voltage signal is supplied.

As alluded to above, by supplying appropriate/effective reference voltage signals during mistaken insertion scenarios, embodiments can reduce degradation of the memory card due to electrical overstress. However, as alluded to above, mistaken insertion scenarios can also cause electromigration issues associated with current flowing from a higher voltage I/O pad to a lower voltage MCIO supply line. Supplying appropriate/effective reference voltage signals during mistaken insertion scenarios partially addresses/reduces these electromigration-related concerns. To further address these issues, embodiments can incorporate an electrostatic discharge (ESD) float rail.

ESD Float Rail

As described above, in addition to electrical overstress-related degradation, other problems can arise when an I/O pad of a memory card (e.g., a data line I/O pad, a control line I/O pad, etc.) is driven by a supply voltage that is higher than an MCIO supply line voltage. For example, a current path may be created through components of the memory card electrically connected between the I/O pad and the lower voltage MCIO supply line. Namely, current may flow from the (higher voltage) I/O pad to the lower voltage MCIO supply line through the components—leading to electromigration-related degradation of the memory card.

To address this issue, embodiments include an ESD float rail that is maintained at a voltage that is the higher of the I/O pad voltage and the MCIO supply line voltage. Accordingly, by electrically connected terminals of certain electrical components to the ESD float rail instead of the MCIO supply line, embodiments can eliminate current paths through these components during mistaken insertion scenarios—thereby reducing/eliminating electromigration-related degradation of the memory card.

Figure 1:
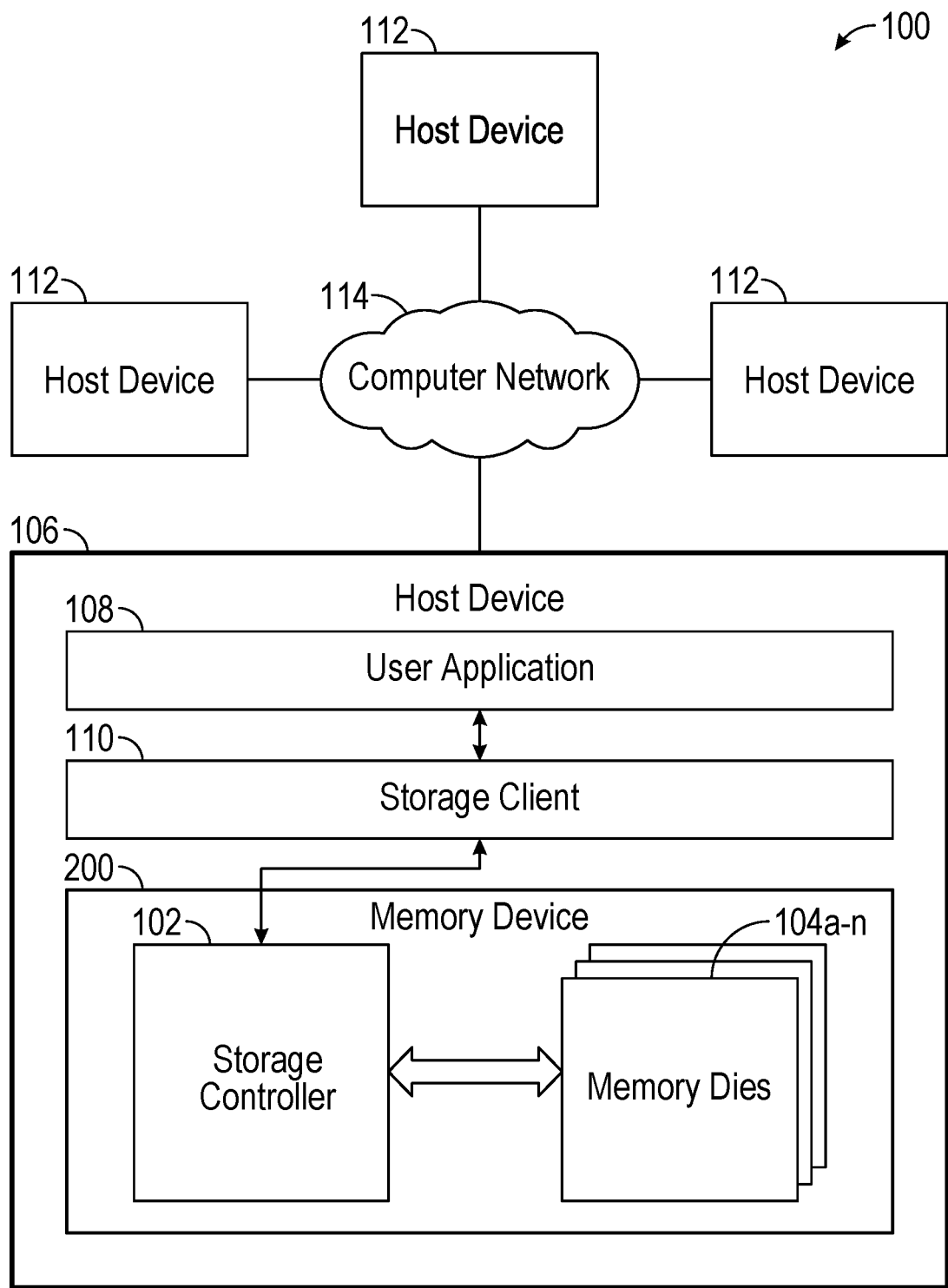
FIG. 1 is a block diagram of an example memory system, in connection with which, example embodiments of the disclosed technology can be implemented.

FIGS. 1 to 4H depict an example memory system that can be used to implement the technology disclosed herein. Of course, this is just an example implementation and the disclosed technology is not limited to implementing the present memory cards in a memory system. FIG. 1 is a schematic block diagram illustrating a memory system 100. The memory system 100 includes a memory device 200 (also referred to herein as a storage device), a host device 106, at least one host device 112, and a computer network 114.

The host device 106 may be a computing device (e.g., laptop, desktop, smartphone, tablet, digital camera, wearable smart device, and so on) that includes one or more processors and readable storage devices (such as, but not limited to, RAM, ROM, flash memory, hard disk drive, solid state memory) that store processor readable code (also referred to herein as instructions or software) for programming storage controller 102 to perform the methods described herein. The host device 106 may also include additional system memory, one or more input/output interfaces, and/or one or more input/output devices in communication with the one or more processors, as well as other components well known in the art.

The memory system 100 includes at least one memory device 200, comprising the storage controller 102 and a plurality of memory dies 104. "Storage controller" refers to any hardware, device, component, element, or circuit configured to manage data operations on non-volatile memory media, and may comprise one or more processors, programmable processors (e.g., FPGAs), ASICs, micro-controllers, or the like. In some embodiments, the storage controller is configured to store data on and/or read data from non-volatile memory media, to transfer data to/from the non-volatile memory device(s), and so on.

In some embodiments, the memory system 100 may include two or more memory devices. Each memory device 200 may include a plurality of memory dies 104, such as flash memory, nano random access memory ("nano RAM or NRAM"), magneto-resistive RAM ("MRAM"), dynamic RAM ("DRAM"), phase change RAM ("PRAM"), etc. The data memory device 200 may also include other types of non-volatile and/or volatile data storage, such as dynamic RAM ("DRAM"), static RAM ("SRAM"), magnetic data storage, optical data storage, and/or other data storage technologies.

The memory device 200 may be a component within a host device 106 as depicted in FIG. 1, and may be connected using a system bus, such as a peripheral component interconnect express ("PCI-e") bus, a Serial Advanced Technology Attachment ("serial ATA") bus, or the like. In another embodiment, the memory device 200 may be external to the host device 106 and is connected via a wired connection, such as, but not limited to, a universal serial bus ("USB") connection, an Institute of Electrical and Electronics Engineers ("IEEE") 1394 bus ("FireWire"), or the like. In other embodiments, the memory device 200 may be connected to the host device 106 using a peripheral component interconnect ("PCI") express bus using external electrical or optical bus extension or bus networking solution such as Infiniband or PCI Express Advanced Switching ("PCIe-AS"), or the like.

In various embodiments, the memory device 200 may be in the form of a dual-inline memory die ("DIMM"), a daughter card, or a micro-module. In another embodiment, the memory device 200 may be a component within a rack-mounted blade. In another embodiment, the memory device 200 may be contained within a package that is integrated directly onto a higher level assembly (e.g., mother-board, laptop, graphics processor, etc.). In another embodiment, individual components comprising the memory device 200 may be integrated directly onto a higher level assembly without intermediate packaging.

In some embodiments, instead of directly connected to the host device 106 via a wired connection, the data memory device 200 may be connected to the host device 106 over a wireless connection. For example, the data memory device 200 may include a storage area network ("SAN") storage device, a network attached storage ("NAS") device, a network share, or the like. In some embodiments, the memory system 100 may be connected to the host via a data network, such as the Internet, a wide area network ("WAN"), a metropolitan area network ("MAN"), a local area network ("LAN"), a token ring, a wireless network, a fiber channel network, a SAN, a NAS, ESCON, or the like, or any combination of networks. A data network may also include a network from the IEEE 802 family of network technologies, such Ethernet, token ring, Wi-Fi, Wi-Max, and the like. A data network may include servers, switches, routers, cabling, radios, and other equipment used to facilitate networking between the host device 106 and the data memory device 200.

The memory system 100 includes at least one host device 106 connected to the memory device 200. Multiple host devices may be used and may comprise a host, a server, a storage controller of a storage area network ("SAN"), a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. "Computer" refers to any computing device. Examples of a computer include, but are not limited to, a personal computer, a laptop, a tablet, a desktop, a server, a main frame, a supercomputer, a computing node, a virtual computer, a hand held device, a smart phone, a cell phone, a system on a chip, a single chip computer, and the like. In another embodiment, a host device 106 may be a client and the memory device 200 may operate autonomously to service data requests sent from the host device 106. In this embodiment, the host device 106 and memory device 200 may be connected using a computer network, system bus, DAS or other communication means suitable for connection between a computer and an autonomous memory device 200.

The illustrative example shown in FIG. 1, the memory system 100 includes a user application 108 in communication with a storage client 110 as part of the host device 106. "Application" refers to any software that is executed on a device above a level of the operating system. An application will typically be loaded by the operating system for execution and will make function calls to the operating system for lower-level services. An application often has a user interface, but this is not always the case. Therefore, the term 'application' includes background processes that execute at a higher level than the operating system.

"Operating system" refers to logic, typically software, that supports a device's basic functions, such as scheduling tasks, managing files, executing applications, and interacting with peripheral devices. In normal parlance, an application is said to execute "above" the operating system, meaning that the operating system is necessary in order to load and execute the application and the application relies on modules of the operating system in most cases, not vice-versa. The operating system also typically intermediates between applications and drivers. Drivers are said to execute "below" the operating system because they intermediate between the operating system and hardware components or peripheral devices.

In various embodiments, the user application 108 may be a software application operating on or in conjunction with the storage client 110. The storage client 110 manages files and data and utilizes the functions and features of the storage controller 102 and associated memory dies 104. "File" refers to a unitary data structure for storing, retrieving, and communicating data and/or instructions. A file is distinguished from other types of packaging by having associated management metadata utilized by the operating system to identify, characterize, and access the file. Representative examples of storage clients include, but are not limited to, a server, a file system, an operating system, a database management system ("DBMS"), a volume manager, and the like. The storage client 110 may be in communication with the storage controller 102 within the memory device 200.

In various embodiments, the memory system 100 may include one or more clients connected to one or more host device 112 through one or more computer networks 114. A host device 112 may be a host, a server, a storage controller of a SAN, a workstation, a personal computer, a laptop computer, a handheld computer, a supercomputer, a computer cluster, a network switch, router, or appliance, a database or storage appliance, a data acquisition or data capture system, a diagnostic system, a test system, a robot, a portable electronic device, a wireless device, or the like. The computer network 114 may include the Internet, a wide area network ("WAN"), a metropolitan area network ("MAN"), a local area network ("LAN"), a token ring, a wireless network, a fiber channel network, a SAN, network attached storage ("NAS"), ESCON, or the like, or any combination of networks. The computer network 114 may also include a network from the IEEE 802 family of network technologies, such Ethernet, token ring, Wi-Fi, WiMax, and the like.

The computer network 114 may include servers, switches, routers, cabling, radios, and other equipment used to facilitate networking the host device 106 or host devices and host devices 112 or clients. In some embodiments, the memory system 100 may include one or more host devices 112 and host device 106 that communicate as peers over a computer network 114. In other embodiments, the memory system 100 may include multiple memory devices 200 that communicate as peers over a computer network 114. One of skill in the art will recognize other computer networks comprising one or more computer networks and related equipment with single or redundant connection(s) between one or more clients or other computer with one or more memory devices 200 or one or more memory devices 200 connected to one or more host devices. In one embodiment, the memory system 100 may include two or more memory devices 200 connected through the computer network 114 to a host device 112 without a host device 106.

In some embodiments, the storage client 110 communicates with the storage controller 102 through a host device interface comprising an Input/Output (I/O) interface. "Interface" refers to a protocol and associated circuits, circuitry, components, devices, systems, sub-systems, and the like that enable one device, component, or apparatus to interact and/or communicate with another device, component, or apparatus. For example, the memory device 200 may support the ATA interface standard, the ATA Packet Interface ("ATAPI") standard, the small computer system interface ("SCSI") standard, and/or the Fibre Channel standard which are maintained by the InterNational Committee for Information Technology Standards ("INCITS").

In certain embodiments, the storage media of a memory device is divided into volumes or partitions. Each volume or partition may include a plurality of sectors. A sector of data is typically 512 bytes, corresponding to the size of a sector in magnetic disk drives.

In various embodiments number of sectors form a block (or data block), anywhere from 8 sectors, which is 4 KB, for example, up to 32, 64, 128 or more sectors. Different sized blocks and sectors can also be used. In certain storage systems, such as those interfacing with the Windows® operating systems, the data blocks may be referred to as clusters. In other storage systems, such as those interfacing with UNIX, Linux, or similar operating systems, the data blocks may be referred to simply as blocks. A block or data block or cluster represents a smallest physical amount of storage space on the storage media that is managed by a storage manager, such as a storage controller, storage system, storage unit, storage device, or the like.

In some embodiments, the storage controller 102 may be configured to store data on one or more asymmetric, write-once storage media, such as solid-state storage memory cells within the memory die(s) 104. As used herein, a "write once" storage media refers to storage media that is reinitialized (e.g., erased) each time new data is written or programmed thereon. As used herein, an "asymmetric" storage media refers to a storage media having different latencies for different storage operations. Many types of solid-state storage media (e.g., memory die) are asymmetric; for example, a read operation may be much faster than a write/program operation, and a write/program operation may be much faster than an erase operation (e.g., reading the storage media may be hundreds of times faster than erasing, and tens of times faster than programming the storage media).

Management of a data block by a storage manager may include specifically addressing a particular data block for a read operation, write operation, or maintenance operation. A block storage device may associate n blocks available for user data storage across the storage media with a logical address, numbered from 0 to n. In certain block storage devices, the logical addresses may range from 0 to n per volume or partition. In conventional block storage devices, a logical address, also referred to as a logical block address (LBA), maps directly to a particular data block on physical storage media. In conventional block storage devices, each data block maps to a particular set of physical sectors on the physical storage media.

However, certain storage devices need not directly or necessarily associate logical addresses with particular physical data blocks. These storage devices may emulate a conventional block storage interface to maintain compatibility with a block storage client 110.

In some embodiments, the storage controller 102 may provide a block I/O emulation layer, which serves as a block device interface, or API. In these embodiments, the storage client 110 communicates with the storage device through this block device interface. The block I/O emulation layer may receive commands and logical addresses from the storage client 110 in accordance with this block device interface. As a result, the block I/O emulation layer may provide the storage device compatibility with a block storage client 110.

In some embodiments, a storage client 110 communicates with the storage controller 102 through a host device interface comprising a direct interface. In these embodiments, the memory device 200 directly exchanges information specific to non-volatile storage devices. Memory device 200 using direct interface may store data in the memory die(s) 104 using a variety of organizational constructs including, but not limited to, blocks, sectors, pages, logical blocks, logical pages, erase blocks, logical erase blocks, ECC codewords, logical ECC codewords, or in any other format or structure advantageous to the technical characteristics of the memory die(s) 104.

The storage controller 102 may receive a logical address and a command from the storage client 110 and perform the corresponding operation in relation to the memory die(s) 104. The storage controller 102 may support block I/O emulation, a direct interface, or both.

Figure 2A:
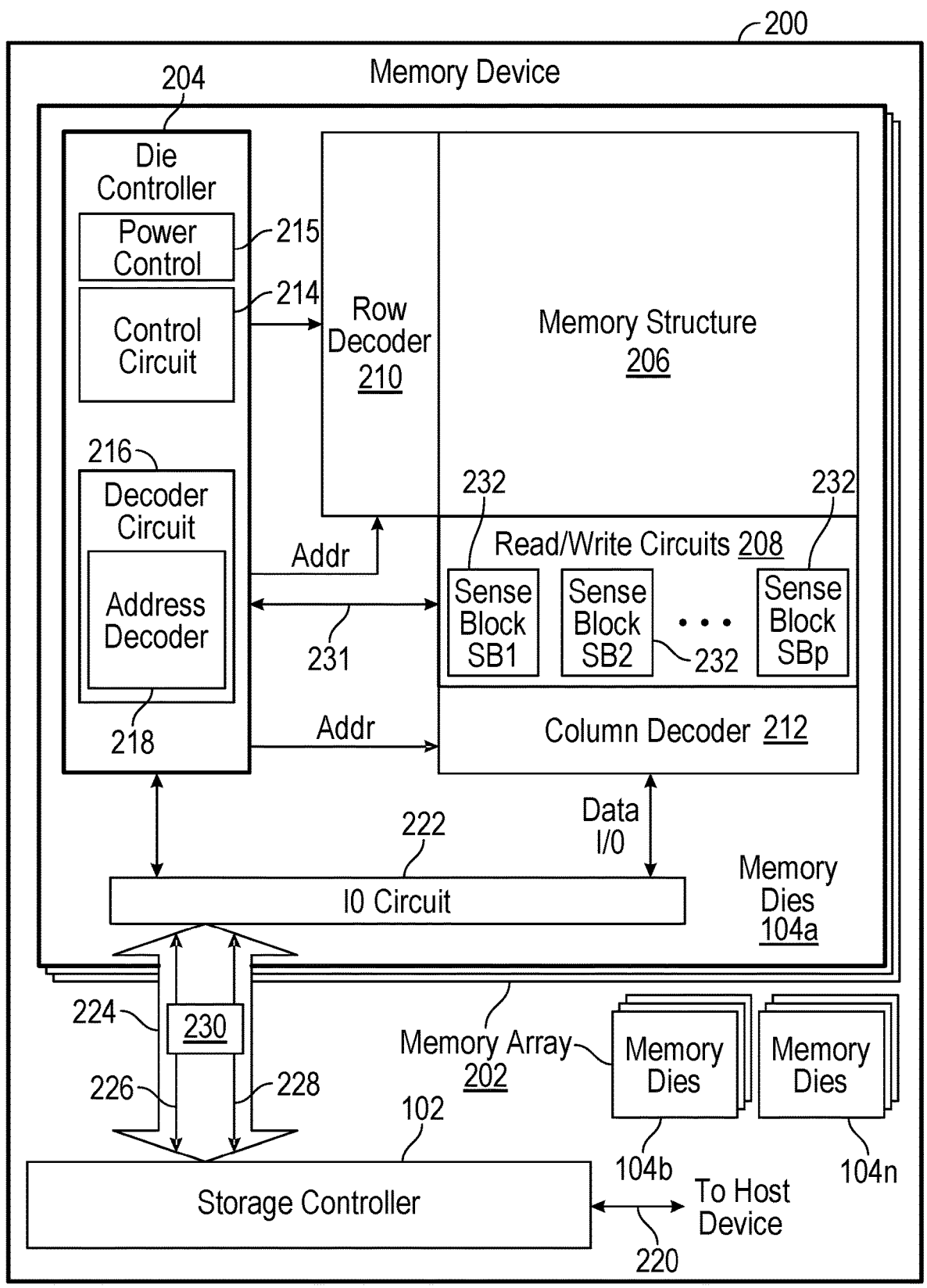
FIG. 2A is a block diagram of an example memory device, in connection with which, example embodiments of the disclosed technology can be implemented.

FIG. 2A is a functional block diagram of an example memory device 200. The components depicted in FIG. 2A are electrical circuits.

The memory device 200 may include a storage controller 102 and a memory array 202 comprised of a number of memory dies 104a-n, the storage controller 102 and memory dies 104a-n being effectively as described with regard to FIG. 1. Each memory die 104a-n can be a complete memory die or a partial memory die and may include a die controller 204, at least one memory structure 206, and read/write circuits 208. The following description will be made with reference to memory die 104a as an example of memory dies 104a-n, where each memory die may include same or similar components and function in the same or similar way. Thus, while reference herein is made to memory die 104a, the same description may be applied equally to memory dies 104b-n.

In this context, "memory array" refers to a set of memory cells (also referred to as storage cells) organized into an array structure having rows and columns. A memory array is addressable using a row identifier and a column identifier, each represented as part of an address, such as a column or row address. A non-volatile memory array is a memory array having memory cells configured such that a characteristic (e.g., threshold voltage level, resistance level, conductivity, etc.) of the memory cell used to represent stored data remains a property of the memory cell without a requirement for using a power source to maintain the characteristic.

Those of skill in the art recognize that a memory array may comprise the set of memory cells within a plane, the set of memory cells within a memory die, the set of memory cells within a set of planes, the set of memory cells within a set of memory die, the set of memory cells within a memory package, the set of memory cells within a set of memory packages, or with other known memory cell set architectures and configurations.

A memory array may include a set of memory cells at a number of levels of organization within a storage or memory system. In one embodiment, memory cells within a plane may be organized into a memory array. In one embodiment, memory cells within a plurality of planes of a memory die may be organized into a memory array. In one embodiment, memory cells within a plurality of memory dies of a memory device may be organized into a memory array. In one embodiment, memory cells within a plurality of memory devices of a storage system may be organized into a memory array.

In the context of FIG. 2A, memory structure 206 may be addressable by wordlines via a row decoder 210 and by bitlines via a column decoder 212. The read/write circuits 208 include multiple sense blocks 232 including SB1, SB2, . . . , SBp (sensing circuitry) and allow a pages of memory cells to be read or programmed in parallel. Also, many strings of memory cells can be erased in parallel.

"Circuitry", as used herein, refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

A physical page may include memory cells along a row of the memory array for a single plane or for a single memory die. In some embodiments, each memory die 104a-n includes a memory array made up of two equal sized planes. A plane is a division of the memory array that permits certain storage operations to be performed on both places using certain physical row addresses and certain physical column addresses. In one embodiment, a physical page of one plane of a memory die includes four data blocks (e.g., 16 KB). In one embodiment, a physical page (also called a "die page") of a memory die includes two planes each having four data blocks (e.g., 32 KB).

The memory structure 206 can be two-dimensional (2D—laid out in a single fabrication plane) or three-dimensional (3D—laid out in multiple fabrication planes). The non-volatile memory array 202 may comprise one or more arrays of memory cells including a 3D array. In one embodiment, the non-volatile memory array 202 may comprise a monolithic three-dimensional memory structure (3D array) in which multiple memory levels are formed above (and not in) a single substrate, such as a wafer, with no intervening substrates. The non-volatile memory array 202 may comprise any type of non-volatile memory that is monolithically formed in one or more physical levels of arrays of memory cells having an active area disposed above a silicon substrate. The non-volatile memory array 202 may be in a non-volatile solid state drive having circuitry associated with the operation of the memory cells, whether the associated circuitry is above or within the substrate. Word lines may comprise sections of the layers containing memory cells, disposed in layers above the substrate. Multiple word lines may be formed on single layer by means of trenches or other non-conductive isolating features.

The die controller 204 (also referred to as a die control circuitry) cooperates with the read/write circuits 208 to perform memory operations on memory cells of the non-volatile memory array 202 and includes a control circuit 214 (also referred to as a state machine), a decoder circuit 216 that may incorporate an address decoder 218, and a power control circuit 215. The control circuit 214 provides chip-level control of memory operations on the memory die 104a. The die controller 204 may also include power control circuit 215 that controls the power and voltages supplied to the wordlines, bitlines, and select lines during memory operations. The power control circuit 215 may include voltage circuitry, in one embodiment. Power control circuit 215 may include charge pumps for creating voltages. The sense blocks 232 include bitline drivers. The power control circuit 215 executes under control of the control circuit 214, in various embodiments.

"Die controller" refers to a set of circuits, circuitry, logic, or components configured to manage the operation of a die. In one embodiment, the die controller is an integrated circuit. In another embodiment, the die controller is a combination of discrete components. In another embodiment, the die controller is a combination of one or more integrated circuits and one or more discrete components. In one example, the die controller may include buffers such as registers, read-only memory (ROM) fuses and other storage devices for storing default values such as base voltages and other parameters.

"Control circuit" refers to a device, component, element, module, system, sub-system, circuitry, logic, hardware, or circuit configured and/or operational to manage one or more other circuits. For example, a controller programmed by firmware to perform the functions described herein is one example of a control circuit. A control circuit can include a processor, a PGA (Programmable Gate Array), an FPGA (Field Programmable Gate Array), an ASIC (Application Specific Integrated Circuit), or another type of integrated circuit or circuit more generally. In certain embodiments, a control circuit is responsible to ensure that primary features and functionality of a larger circuit, die, or chip, that includes the control circuit, perform properly. The address decoder 218 provides an address interface between that used by the host or a storage controller 102 to the hardware address used by the row decoder 210 and column decoder 212. Power control circuit 215 controls the power and voltages supplied to the wordlines, bitlines, and select lines during memory operations. The power control circuit 215 includes voltage circuitry, in one embodiment. The power control circuit 215 executes under control of the control circuit 214, in one embodiment.

Commands and data are transferred between the host device and storage controller 102 via a data bus 220, and between the storage controller 102 and an input/output (IO) circuit 222 on each of the memory dies 104a-n via a memory interface 224. The memory interface 224 may be a type of communication bus, comprising a control bus 226 and a data bus 228 (also referred to herein as I/O data bus), over which fixed length command sequences 230 may be transmitted. The command bus may comprise, for example but not limited to, a command bus over which commands are transmitted to the memory die 104a and an address bus over which addresses are transmitted to the memory die 104a. "Memory interface" refers to an interface between a memory die and a storage controller. Examples of memory interface that may be used in connection with the disclosed solution include Toggle Mode ("TM"), Toggle NAND 2.0, Open NAND Flash Interface (ONFI) NAND, a vendor specific interface, a proprietary interface, and the like. In the depicted embodiment, the memory interface 224 is a proprietary interface configured to transfer fixed length command sequences 230.

"Communication bus" refers to hardware, software, firmware, logic, control line(s), and one or more associated communication protocols, that are configured to enable a sender to send data to a receiver. A communication bus may include a data bus and/or a control bus.

"Firmware" refers to logic embodied as processor-executable instructions stored on volatile memory media and/or non-volatile memory media.

"Data bus" refers to a communication bus used to exchange one or more of data bits between two electronic circuits, components, chips, die, and/or systems. A data bus may include one or more signal/control lines. A sender, such as a controller, may send data signals over one or more control lines of the data bus in parallel (operating as a parallel bus) or in series (operating as a serial bus). A data bus may include the hardware, control line(s), software, firmware, logic, and/or the communication protocol used to operate the data bus.

Examples data buses may include 8-bit buses having 8 control lines, 16-bit buses having 16 control lines, 32-bit buses having 32 control lines, 64-bit buses having 64 control lines, and the like. Control lines may carry exclusively communication data, exclusively address data, exclusively control data, or any combination of these types of data.

In various embodiments, a single data bus may be shared by a plurality of components, such as memory die. When multiple chips or memory dies share a data bus, that data may be accessed or transferred by a single memory die or by all the memory dies in parallel based on signals on a chip enable control line.

A data bus may operate, and be configured, according to an industry standard or based on a proprietary protocol and design. Multiple control line of a data bus may be used in parallel and may latch data into latches of a destination component according to a clocking signal, data strobe signal ("DQS"), or clock, such as strobe signal. In certain embodiments, a control bus and a data bus together may form a communication bus between a sender and a receiver.

"Control bus" refers to a communication bus used to exchange one or more of data, address information, control signals, clock signals, and the like, between two electronic circuits, components, chips, die, and/or systems. A control bus may comprise 1 or more control lines, be configured to operate as a parallel bus or a serial bus, and may include the hardware, control line(s), software, firmware, logic, and/or the communication protocol used to operate the control bus. Typically, a control bus sends control signals to one or more memory die to manage operations on the memory die.

In certain embodiments, the control bus sends control signals such as, for example, one or more of, a write enable ("WEn"), chip enable ("CEn"), read enable ("REn"), a clock signal, strobe signal ("DQS"), command latch enable ("CLE"), address latch enable ("ALE"), and the like.

In certain embodiments, the control bus may not transfer data relating to a storage operation, such as write data or read data. Instead, write data and read data may be transferred over a data bus. In certain embodiments, a control bus and a data bus together may form a communication bus between a sender and a receiver.

The address decoder 218 of the die controller 204 may be coupled to the memory structure 206 in order to identify a location within the memory structure 206 for a storage command. In particular, the address decoder 218 determines a row identifier and a column identifier which together identifies the location within the memory structure 206 that applies to a storage command associated with a command address. The storage command and command address are received in a fixed length command sequence.

The input/output (IO) circuit 222 may be coupled, through the memory interface 224 and to the memory interface circuit 234 of the storage controller 102, to a data bus 220 in order to receive a fixed length command sequence 230. The decoder circuit 216 of the die controller 204 may be coupled through the input/output (IO) circuit 222 to a control bus 226 to receive fixed length command sequences 230 over the data bus 220 via memory interface circuit 234.

In one embodiment, the data bus 220 may comprise eight control lines, each configured to transfer one bit in parallel across the data bus 220.

The decoder circuit 216 may decode a command address and a storage command from a fixed length command sequence. The control circuit 214 of the die controller 204 may be coupled to the input/output (IO) circuit 222 and decoder circuit 216 and may generate control signals 231 to execute storage commands decoded by the decoder circuit 216. "Control signal" refers to an electrical signal (wired or wireless) sent from one device, component, manager, or controller to another device, component, manager, or controller configured to act in response to the control signal.

The read/write circuits 208 may be coupled to the non-volatile memory array 202 and the control circuit 214 in order to transfer data between the non-volatile memory array 202 and the input/output (IO) circuit 222 in response to the storage commands.

In some implementations, some of the components can be combined. In various designs, one or more of the components (alone or in combination), other tha memory structure 206, can be thought of as at least one control circuit or storage controller which is configured to perform the techniques described herein. For example, a control circuit may include any one of, or a combination of, storage controller 102, die controller 204, read/write circuits 208, column decoder 212, control circuit 214, decoder circuit 216, address decoder 218, sense blocks SB1, SB2, . . . , SBp, and so forth.

Associated circuitry may be required for operation of the memory cells and for communication with the memory cells. As non-limiting examples, memory devices may have circuitry used for controlling and driving memory cells to accomplish functions such as programming and reading. This associated circuitry may be on the same substrate as the memory cells and/or on a separate substrate. For example, a storage controller for memory read-write operations may be located on a separate storage controller chip and/or on the same substrate as the memory cells.

In various embodiments, memory structure 206 comprises a three-dimensional (3D) memory array of non-volatile memory cells in which multiple memory levels are formed above a single substrate, such as a wafer. The memory structure may comprise any type of non-volatile memory monolithically formed in one or more physical levels of arrays of memory cells having an active area disposed above a silicon (or other type of) substrate. In one example, the non-volatile memory cells comprise vertical NAND strings with charge-trapping material. In another embodiment, memory structure 206 comprises a two-dimensional (2D) memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 206 is not limited to the examples above. Many different types of memory array architectures or memory technologies can be used to form memory structure 206. No particular non-volatile memory technology is required for purposes of the new claimed embodiments proposed herein. Other examples of suitable technologies for memory cells of the memory structure 206 include resistive random access memory (ReRAM) memories, magnetoresistive RAM (MRAM) memory (e.g., MRAM, Spin Transfer Torque MRAM, Spin Orbit Torque MRAM), phase change memory (PCM), and the like. Examples of suitable technologies for memory cell architectures of the memory structure 206 include 2D arrays, 3D arrays, cross-point arrays, stacked 2D arrays, vertical bitline arrays, and the like.

Cross point memory—one example of a ReRAM or PCM RAM—includes reversible resistance-switching elements arranged in cross point arrays accessed by X lines and Y lines (e.g., wordlines and bitlines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one that is relatively inert (e.g., tungsten) and the other of which is electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

MRAM stores data within magnetic storage elements. The magnetic storage elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device can be built from a grid of such memory cells. In one embodiment for programming, each memory cell lies between a pair of write lines arranged at right angles to each other, parallel to the cell, one above and one below the cell. When current is passed through them, an induced magnetic field is created.

PCM exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). As such, the programming doses are laser pulses. The memory cells can be inhibited by blocking the memory cells from receiving the light. Note that the use of "pulse" in this document does not require a square pulse, but also includes a continuous (or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 2B:
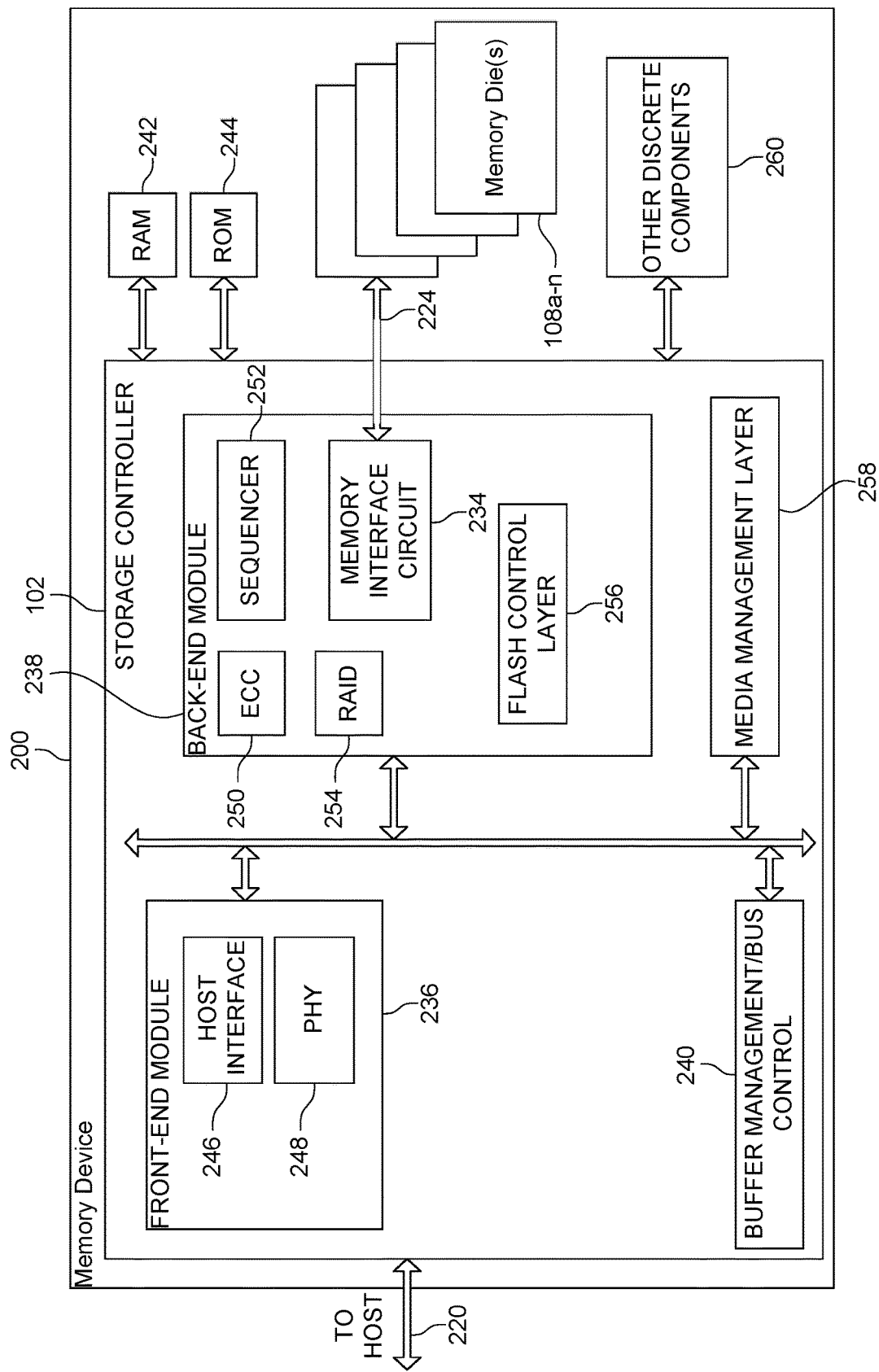
FIG. 2B is a block diagram of an example memory device that depicts more details of an example controller, in connection with which, example embodiments of the disclosed technology can be implemented.

FIG. 2B is a block diagram of example memory device 200 that depicts more details of one embodiment of controller 102. While the storage controller 102 in the embodiment of FIG. 2B is a flash memory controller, it should be appreciated that memory device 200 is not limited to flash memory. Thus, the storage controller 102 is not limited to the particular example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In an example operation, when a host needs to read data from or write data to the flash memory, it will communicate with the flash memory controller. If the host provides a logical address to which data is to be read/written, the flash memory controller can convert the logical address received from the host to a physical address in the flash memory. Alternatively, the host itself can provide the physical address. The flash memory controller can also perform various memory management functions including, but not limited to, wear leveling (distributing writes to avoid wearing out specific blocks of memory that would otherwise be repeatedly written to) and garbage collection (after a block is full, moving only the valid pages of data to a new block, so that the full block can be erased and reused).

The interface between storage controller 102 and memory dies 104 may be any suitable flash interface, such as Toggle Mode 200, 400, or 800. In one embodiment, memory device 200 may be a card-based system, such as a secure digital (SD) or a micro secure digital (micro-SD) card. In an alternate embodiment, memory system 100 may be part of an embedded memory system. For example, the flash memory may be embedded within the host. In other examples, memory device 200 can be a solid state drive (SSD).

In some embodiments, memory device 200 includes a single channel between storage controller 102 and memory die 108. However, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if only a single channel is shown in the drawings.

As depicted in FIG. 2B, storage controller 102 includes a front-end module 236 that interfaces with a host, a back-end module 238 that interfaces with the memory die 108, and various other modules that perform functions which will now be described in detail. The components of storage controller 102 depicted in FIG. 2B may take various forms including, without limitation, a packaged functional hardware unit (e.g., an electrical circuit) designed for use with other components, a portion of a program code (e.g., software or firmware) executable by a (micro) processor or processing circuitry that usually performs a particular function of related functions, a self-contained hardware or software component that interfaces with a larger system, or the like. For example, each module may include an ASIC, an FPGA, a circuit, a digital logic circuit, an analog circuit, a combination of discrete circuits, gates, or any other type of hardware or combination thereof. Alternatively or additionally, each module may include software stored in a processor readable device (e.g., memory) to program a processor to enable storage controller 102 to perform the functions described herein.

Referring again to modules of the storage controller 102, a buffer manager/bus control 240 manages buffers in RAM 242 and controls the internal bus arbitration of storage controller 102. ROM 244 stores system boot code. Although illustrated in FIG. 2B as located separately from the storage controller 102, in other embodiments, one or both of RAM 242 and ROM 244 may be located within the storage controller 102. In yet other embodiments, portions of RAM 242 and ROM 244 may be located within the storage controller 102, while other portions may be located outside the controller. Further, in some implementations, the storage controller 102, RAM 242, and ROM 244 may be located on separate semiconductor dies.

Front-end module 236 includes a host interface 246 and a physical layer interface (PHY) 248 that provide the electrical host interface via bus 220 with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back-end module 238 includes an error correction code (ECC) engine 250 that encodes the data bytes received from the host, and decodes and error corrects the data bytes read from the memory dies 104. A command sequencer 252 generates command sequences, such as program and erase command sequences, to be transmitted to memory dies 104. A RAID (Redundant Array of Independent Dies) module 254 manages generation of RAID parity and recovery of failed data. The RAID parity may be used as an additional level of integrity protection for the data being written into the memory device 200. In some cases, the RAID module 254 may be a part of the ECC engine 250. Note that the RAID parity may be added as one or more extra dies, or may be added within the existing die, e.g., as an extra plane, an extra block, or extra WLs within a block. As described above in connection with FIG. 2A, the memory interface circuit 234 provides command sequences 230 to memory die 104 and receives status information from memory die 104, via memory interface 224. A flash control layer 256 controls the overall operation of back-end module 238.

Additional components of memory device 200 illustrated in FIG. 2B include media management layer (MML) 258, which performs wear leveling of memory cells of memory dies 104, as well as, other discrete components 260, such as external electrical interfaces, external RAM, resistors, capacitors, or other components that may interface with storage controller 102. In alternative embodiments, one or more of the physical layer interface 248, RAID module 254, MML 258, or buffer management/bus controller 240 are optional components.

MML 258 (e.g., Flash Translation Layer (FTL)) may be integrated as part of the flash management for handling flash errors and interfacing with the host. In particular, MML 258 may be a module in flash management and may be responsible for the internals of NAND management. In particular, MML 258 may include an algorithm in the memory device firmware which translates writes from the host into writes to the memory structure 205 of each memory die 104. MML 258 may be needed because: 1) the memory structure 206 may have limited endurance; 2) the memory structure 206 may only be written in multiples of pages; and/or 3) the memory structure 206 may not be written unless it is erased as a block (or a tier within a block in some embodiments). MML 258 understands these potential limitations of the memory structure 206 which may not be visible to the host. Accordingly, MML 258 attempts to translate the writes from host into writes into the memory structure 206.

Storage controller 102 may interface with one or more memory dies 104. In one embodiment, storage controller 102 and multiple memory dies (together comprising non-volatile storage system 100) implement an SSD, which can emulate, replace, or be used in place of a hard disk drive inside a host, as a network access storage (NAS) device, in a laptop, in a tablet, in a server, etc. Additionally, the SSD need not be made to work as a hard drive.

Some embodiments of the memory device 200 may include one memory dies 104 connected to one storage controller 102. Other embodiments may include multiple memory dies 104 in communication with one or more controllers 102. In one example, the multiple memory dies 104 can be grouped into a set of memory packages. Each memory package may include one or more memory dies 104 in communication with storage controller 102. In one embodiment, a memory package includes a printed circuit board (or similar structure) with one or more memory dies 104 mounted thereon. In some embodiments, a memory package can include molding material to encase the memory dies 104 of the memory package. In some embodiments, storage controller 102 is physically separate from any of the memory packages.

Figure 2C:
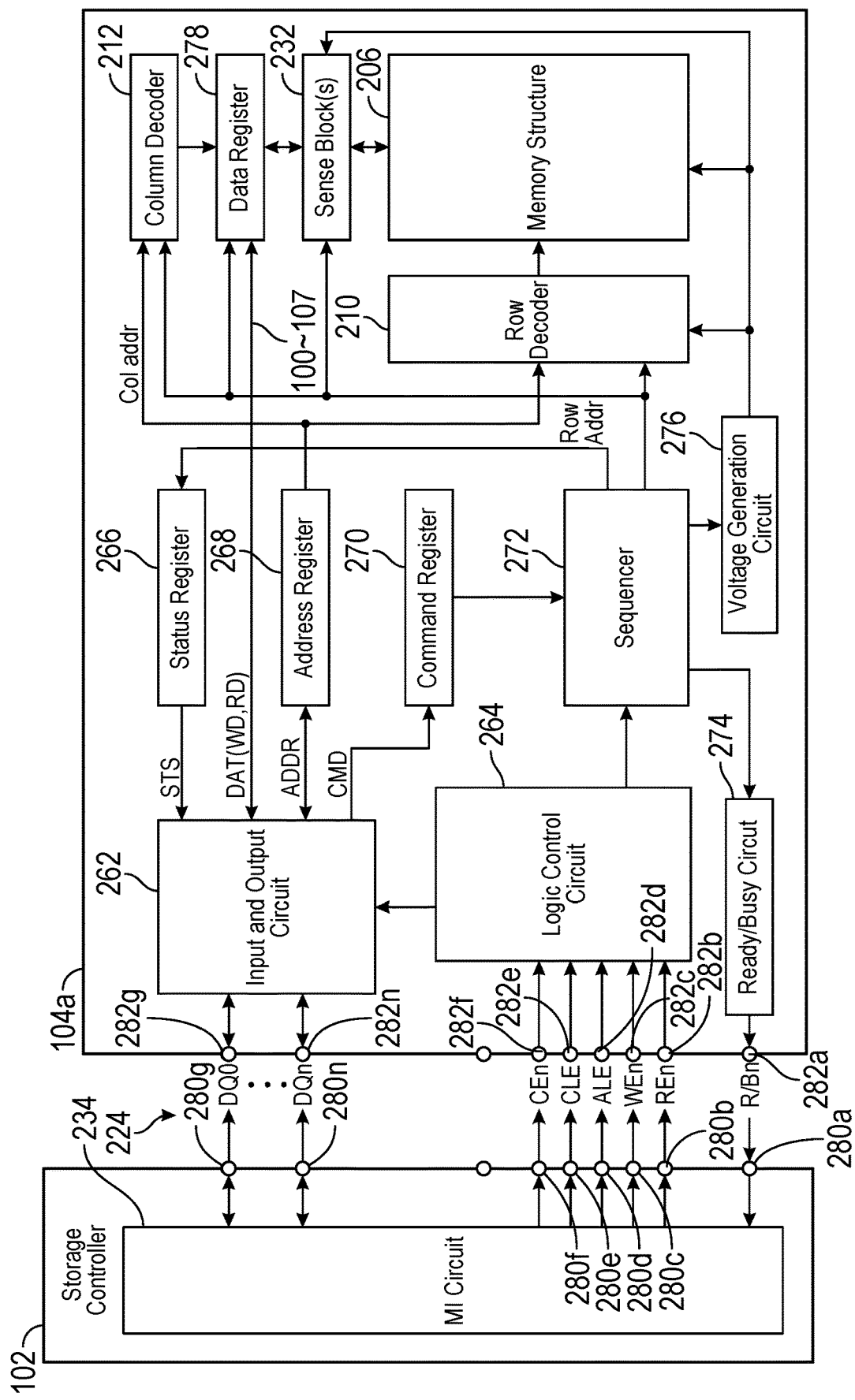
FIG. 2C is a block diagram of example memory system that depicts more details of an example embodiment of memory die, in connection with which, example embodiments of the disclosed technology can be implemented.

FIG. 2C is a block diagram of example memory system 200 that depicts more details of one embodiment of memory die 104a. With reference to FIG. 2B above, the memory die 104a is connected to the storage controller 102 via the memory interface 224 and operates based on commands from the storage controller 102.

For example, the memory die 104a transmits and receives, for example, DQ0 to DQn (hereinafter simply referred to as signals DQ or signals DQ[0:n], where n is an integer of the number of lines) to and from the storage controller 102. The DQ[0:n] signals may be an n-bit wide signa, where each DQ signal is a 1-bit wide signal. In various embodiments, n may be 7, thus DQ[7:0] signals is an 8-bit wide signal. The DQ[0:n] signals may be encoded with input/output (I/O) data, for example, data in (DIN)/data out (DOUT) for data operations (e.g., read operations, write operations, erase operations, etc.) and address data (e.g., address codes) and command data (e.g., command codes) for command/address sequencing of for the data operations. Data sent over the DQ[0:n] signals is latched with respect to a rising edge or a falling edge of a clock signal or data strobe (DQS) signal. In a single data rate ("SDR") mode, the data is latched on either the rising edge or the falling edge of the clock signal. In a double data rate ("DDR") mode (also referred to herein as toggle mode), the data is latched on both the rising and falling edges of the clock signal.

The memory die 104a also receives control signals, such as, but not limited to, CEn signal, CLE signal, ALE signal, WEn signal, REn signal, DQS signal, and the like from the storage controller 102 via the control bus 226 of the memory interface 224. Then, the memory die 104a also transmits control signals, for example but not limited to, a ready/busy signal (R/Bn) to the storage controller 102. In some embodiments, each of control signals may be a one-bit wide signal. In other embodiments, the control signals may have other bit-widths as desired.

The CEn signal is a signal for enabling the memory die 104a. In various embodiments, the CEn signal is an active-low CEn, such that the CEn is asserted at a logic LOW level (e.g., logic level 0 or low voltage (0 volt)) to enable the memory die 104a. A memory array 202 may include a plurality of memory dies 104, each of which may be substantially similar to memory die 104a and activated based on receiving the CEn signal. In some embodiments, memory dies that are not used for a specific task may remain in a standby state. In the standby state, the memory dies do not respond to control signals from the storage controller 102. After asserting the CEn signal, the activated memory die starts responding to the control signals from the storage controller 102. For example, when the storage controller 102 desires to activate memory die 104a, the storage controller 102 asserts the CEn signal at a logic LOW level.

The CLE signal is an active-high signal, according to various embodiments, for enabling command sequencing, for example, by indicating that the DQ[0:n] signal is encoded with a command code (also referred to as CMD) and is asserted, for example, at a logic HIGH level (e.g., logic level 1 or high voltage (e.g., 5 volts)), according to some embodiments. The CLE signal may be used to activate a command bus (e.g., of control bus 226) between the storage controller 102 and the memory die 104*a*, for example, when the CLE signal is asserted at a logic HIGH level.

The ALE signal is an active-high signal, according to various embodiments, for enabling address sequencing, for example, by indicating that the signal DQ is encoded with an address code (also referred to as ADDR) and is asserted, for example, at the logic HIGH level. The ALE signal may be used to activate an address bus (e.g., of control bus 226) between the storage controller 102 and the memory die 104*a*, for example, when the ALE signal is asserted at a logic HIGH level.

When the memory die 104*a* receives the ALE signal that is at a logic LOW level and the CLE signal that is at a logic HIGH level, the memory die 104*a* knows that the storage controller 102 is sending command data on the DQ[0:n] signals, which is latched into a command register 270. Similarly, when the memory die 104*a* receives the ALE signal at a logic HIGH level and the CLE signal at a logic LOW level, the memory die 104*a* knows that address data is being sent by the storage controller 102 and the address data is latched into an address register 268 of the memory die 104*a*.

The WEn signal is a clock signal for sampling a received signal into the memory die 104*a*. For example, a signal received by the memory die 104*a* is sampled and latched at each rising or falling edge of the WEn signal to obtain a bit pattern encoded into the received signal. Accordingly, DQ[0:n] signals are received in the memory die 104*a* when the WEn signal is toggled. For example, command data and/or address data sent to the memory die 104*a* may be latched with respect to a rising edge and/or a falling edge of the WEn signal. In various embodiments, WEn signal may be latched in SDR mode or DDR mode.

The REn signal is a signal used for the storage controller 102 to read data from the memory die 104*a*. For example, data is read out of the memory die 104*a* at each rising or falling edge of the REn signal. Accordingly, the memory die 104*a* outputs the DQ[0:n] signals to the storage controller 102 based on the toggled REn signal. The R/Bn signal is a signal indicating whether the memory die 104*a* is in a busy state or a ready state (in a state in which a command is not receivable or receivable from the storage controller 102) and is considered to be at the logic LOW level, for example, when the memory die 104*a* is in the busy state.

While the above example provides the CEn signal as an active-low signal and the CLE and ALE signals as active-high signals, other implementations are possible. In some embodiments, the active states may be reversed. For example, the CEn signal may be an active-high signal and the CLE and ALE signals may be active-low signals.

The storage controller 102 issues a command to perform a read operation, a command to perform a write operation, a command to perform an erase, or the like to the memory die 104*a* in response to a command from a host device (e.g., host device 106 and/or 112). The storage controller 102 manages the memory space of the memory die 104*a*. As part of the read, write, or erase operations, the memory die 104*a* issues various commands to perform command/address sequencing for a respective operation and the memory die 104*a* and/or storage controller 102 transmit DIN/DOUT to complete the respective operation.

As described above, the memory interface circuit 234 of the storage controller 102 connects to the input/output circuit 222 of the memory die 104*a* via a plurality of electrical contacts. As used herein, electrical contacts may be referred to as pins or pins of a chip for electrically connecting the memory die 104*a* to the storage controller 102. For example, the storage controller 102 includes a plurality of pins 280*a-n* electrically connected to a plurality of pins 282*a-n* of the memory die 104*a*. The memory interface circuit 234 transmits the CEn signal, CLE signal, ALE signal, and WEn signals to the memory die 104*a* over the control bus 226 of the memory interface 224 via respective pins and transmits DQ [0:n] signals over the data bus 228 of the memory interface 224 via respective pins. The input/output circuit 222 transmits the R/Bn signal to the storage controller 102 over the control bus 226 and the DQ [0:n] signals over the data bus 228 via respective pins. The pins may also be referred to as receivers or transmitters. For example, where a signal is transmitted from a pin on the storage controller to a pin of the memory die, the transmitting pin may be referred to as an transmitter and the receiving pin may be referred to as a receiver. Each pin may be referred to as either a receiver or output transmitted based on the scenario, for example, one pin may transmit at a first instance while the pin may also receive at a second instance.

As illustrated in FIG. 2C, the memory die 104*a* includes an input and output circuit 262, a logic control circuit 264, a status register 266, an address register 268, a command register 270, a sequencer 272, a ready/busy circuit 274, a voltage generation circuit 276, and a data register 278. The various components 262-278 may be included as part of the die controller 204, for example, as part of the control circuit 214 and/or decoder circuit 216. FIG. 2C also illustrates the memory structure 206, row decoder 210, a sense blocks 232, and column decoder 212, as described above in connection with FIG. 2B.

The input and output circuit 262 controls input and output of the DQ [0:n] signals to and from the storage controller 102. For example, the input and output circuit 262 transmits data received from the storage controller 102 as DIN to data register 278, transmits an address code to the address register 268, and transmits a command code to the command register 270. DIN, the command code, and the address are transmitted to the memory die 104*a* as DQ [0:n] signals encoded with a bit pattern for the DIN, command, or address. The input and output circuit 262 also transmits status information STS received from the status register 266, data received from the data register 278 to be transmitted to the storage controller 102 as DOUT. STS and DOUT are transmitted as DQ [0:n] signals encoded with a bit pattern for the STS or DOUT. The input and output circuit 262 and the data register 278 are connected via a data bus. For example, the data bus includes eight I/O data lines 100 to 107 corresponding to the 8-bit signals DQ0 to DQ7. The number of I/O data lines is not limited to eight, but may be set to 16, 32, or any number of data lines.

The logic control circuit 264 receives, for example, the CEn signal, the CLE signal, the ALE signal, the WEn signal, and the REn signal from the storage controller 102 via control bus 226. Then, logic control circuit 264 controls the input and output circuit 262 and the sequencer 272 in accordance with a received signal.

The status register 266 temporarily stores status information STS, for example, in a write operation, a read operation, and an erasing operation for data and notifies the storage controller 102 whether the operation normally ends.

The address register 268 temporarily stores the address code received from the storage controller 102 via the input and output circuit 262. For example, the input and output circuit 262 may detect DQ[0:n] signals and sample the DQ[0:n] signals according to the WEn signal to obtain a bit pattern encoded thereon. The input and output circuit 262 may then decode the bit pattern to obtain the data, which in this case may be an address code. The address code is then temporarily stored in the address register 268. Then, the address register 268 transmits a row address (row addr) to the row decoder 210 and transmits a column address (col addr) to the column decoder 212.

The command register 270 temporarily stores the command code received from the storage controller 102 via the input and output circuit 262 and transmits the command code to the sequencer 272. For example, the input and output circuit 262 may detect DQ[0:n] signals and sample the DQ[0:n] signals according to the WEn signal to obtain a bit pattern encoded thereon. The input and output circuit 262 may then decode the bit pattern to obtain the data, which in this case may be a command code. The command code is then temporarily stored in the command register 270.

The sequencer 272 controls operation of the memory die 104a. For example, the sequencer 272 controls the status register 266, the ready/busy circuit 274, the voltage generation circuit 276, the row decoder 210, the sense blocks 232, the data register 278, the column decoder 212, and the like according to a command code stored in the command register 270 to execute the write operation, the read operation, and the erasing operation according to the code.

The ready/busy circuit 274 transmits the R/Bn signal to the storage controller 102 according to an operation state of the sequencer 272. For example, the R/Bn signal is transmitted to the storage controller 102 via the control bus 226 of the memory interface 224.

The voltage generation circuit 276 generates a voltage necessary for an operation (e.g., a write operation, a read operation, or an erasing operation) according to control of the sequencer 272. The voltage generation circuit 276 may be an example of the power control circuit 215 of FIG. 2A. The voltage generation circuit 276 supplies the generated voltage, for example, to the memory structure 206, the row decoder 210, and the sense blocks 232. The row decoder 210 and the sense blocks 232 apply a voltage supplied from the voltage generation circuit 276 to memory cells in the memory structure 206. Details of the memory structure 206 are provided in connection with FIGS. 3-4G below.

The data register 278 includes a plurality of latch circuits. The latch circuit stores the write data WD and the read data RD. For example, in a write operation, the data register 278 temporarily stores the write data WD received from the input and output circuit 262 and transmits the write data WD to the sense blocks 232. For example, in a read operation, the data register 278 temporarily stores the read data RD received from the sense blocks 232 and transmits the read data RD to the input and output circuit 262.

Figure 3:
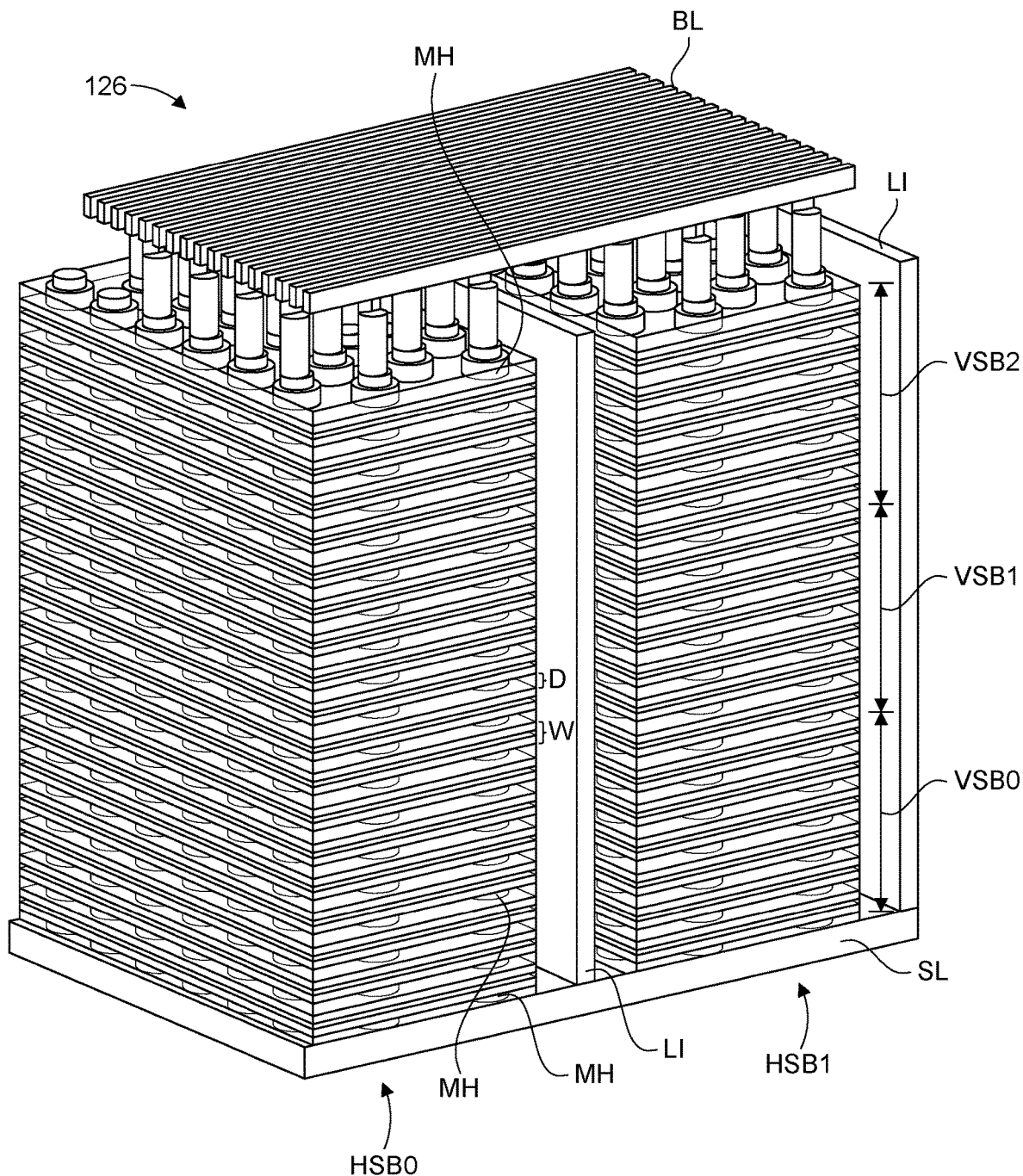
FIG. 3 is a perspective view of a portion of an example monolithic three-dimensional memory structure, in connection with which, example embodiments of the disclosed technology can be implemented.

FIG. 3 is a perspective view of a portion of a monolithic 3D memory array that includes a plurality of non-volatile memory cells, and that can comprise memory structure 206 in one embodiment. FIG. 3 illustrates, for example, a portion of one block of memory. The structure depicted includes a set of bitlines (BLs) positioned above a stack of alternating dielectric layers and conductive layers. For example purposes, one of the dielectric layers is marked as D and one of the conductive layers (also called wordline layers) is marked as W. The number of alternating dielectric and conductive layers can vary based on specific implementation requirements. In some embodiments, the 3D memory array includes between 108-300 alternating dielectric and conductive layers. One example embodiment includes 96 data wordline layers, 8 select layers, 6 dummy wordline layers, and 110 dielectric layers. More or less than 108-300 layers can also be used. Data wordline layers include data memory cells. Dummy wordline layers include dummy memory cells. As will be explained below, the alternating dielectric and conductive layers are divided into four "fingers" by local interconnects LI. FIG. 3 shows two fingers and two local interconnects LI. Below the alternating dielectric layers and wordline layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the 3D monolithic memory array that may comprise memory structure 206 is provided below with respect to FIGS. 4A-4H.

One of the local interconnects LI separates the block into two horizontal sub-blocks HSB0, HSB1. The block comprises multiple vertical sub-blocks VSB0, VSB1, VSB2. The vertical sub-blocks VSB0, VSB1, VSB2 can also be referred to as "tiers." Each vertical sub-block extends across the block, in one embodiment. Each horizontal sub-block HSB0, HSB1 in the block is a part of vertical sub-block VSB0. Likewise, each horizontal sub-block HSB0, HSB1 in the block is a part of vertical sub-block VSB1. Likewise, each horizontal sub-block HSB0, HSB1 in the block is a part of vertical sub-block VSB2. For ease of explanation, vertical sub-block VSB0 will be referred to as a lower vertical sub-block, vertical sub-block VSB1 will be referred to as a middle vertical sub-block, and VSB2 will be referred to as an upper vertical sub-block. In one embodiment, there are two vertical sub-blocks in a block. In other embodiments, there could be four or more vertical sub-blocks in a block.

A memory operation for a vertical sub-block may be performed on memory cells in one or more horizontal sub-blocks. For example, a programming operation of memory cells in vertical sub-block VSB0 may include: programming memory cells in horizontal sub-block HSB0 but not horizontal sub-block HSB1; programming memory cells in horizontal sub-block HSB1 but not horizontal sub-block HSB0; or programming memory cells in both horizontal sub-block HSB0 and horizontal sub-block HSB1.

The different vertical sub-blocks VSB0, VSB1, VSB2 are treated as separate units for erase/program purposes, in one embodiment. For example, the memory cells in one vertical sub-block can be erased while leaving valid data in the other vertical sub-blocks. Then, memory cells in the erased vertical sub-block can be programmed while valid data remains in the other vertical sub-blocks. In some cases, memory cells in the middle vertical sub-block VSB1 are programmed while there is valid data in the lower vertical sub-block VSB0 and/or the upper vertical sub-block VSB2. Programming the memory cells in middle vertical sub-block VSB1 may present challenges due to the valid data in the other vertical sub-blocks VSB0, VSB2.

Figure 4A:
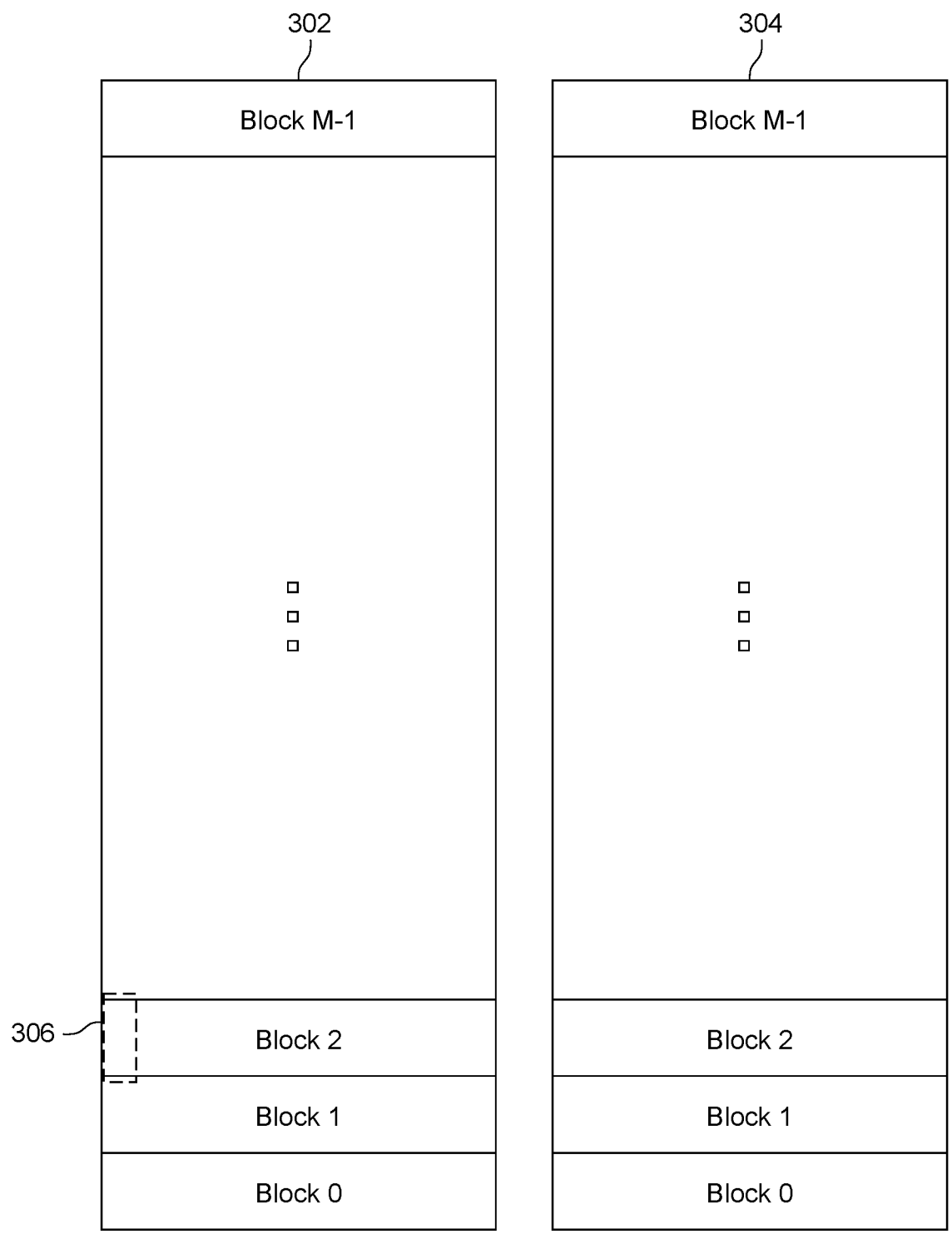
FIG. 4A is a block diagram of an example memory structure having two planes, in connection with which, example embodiments of the disclosed technology can be implemented.

FIG. 4A is a block diagram depicting one example organization of memory structure 206, which is divided into two planes 302 and 304. Each plane is then divided into M blocks. In one example, each plane has about 2000 blocks. However, different numbers of blocks and planes can also be used. In one embodiment, a block of memory cells constitutes a single unit for an erase operation. That is, in one embodiment, all memory cells of a block are erased together. In other embodiments, memory cells can be grouped into blocks for other reasons, such as to organize the memory structure 206 to enable the signaling and selection circuits. In some embodiments, a block represents a groups of connected memory cells that share a common set of wordlines.

Figure 4B:
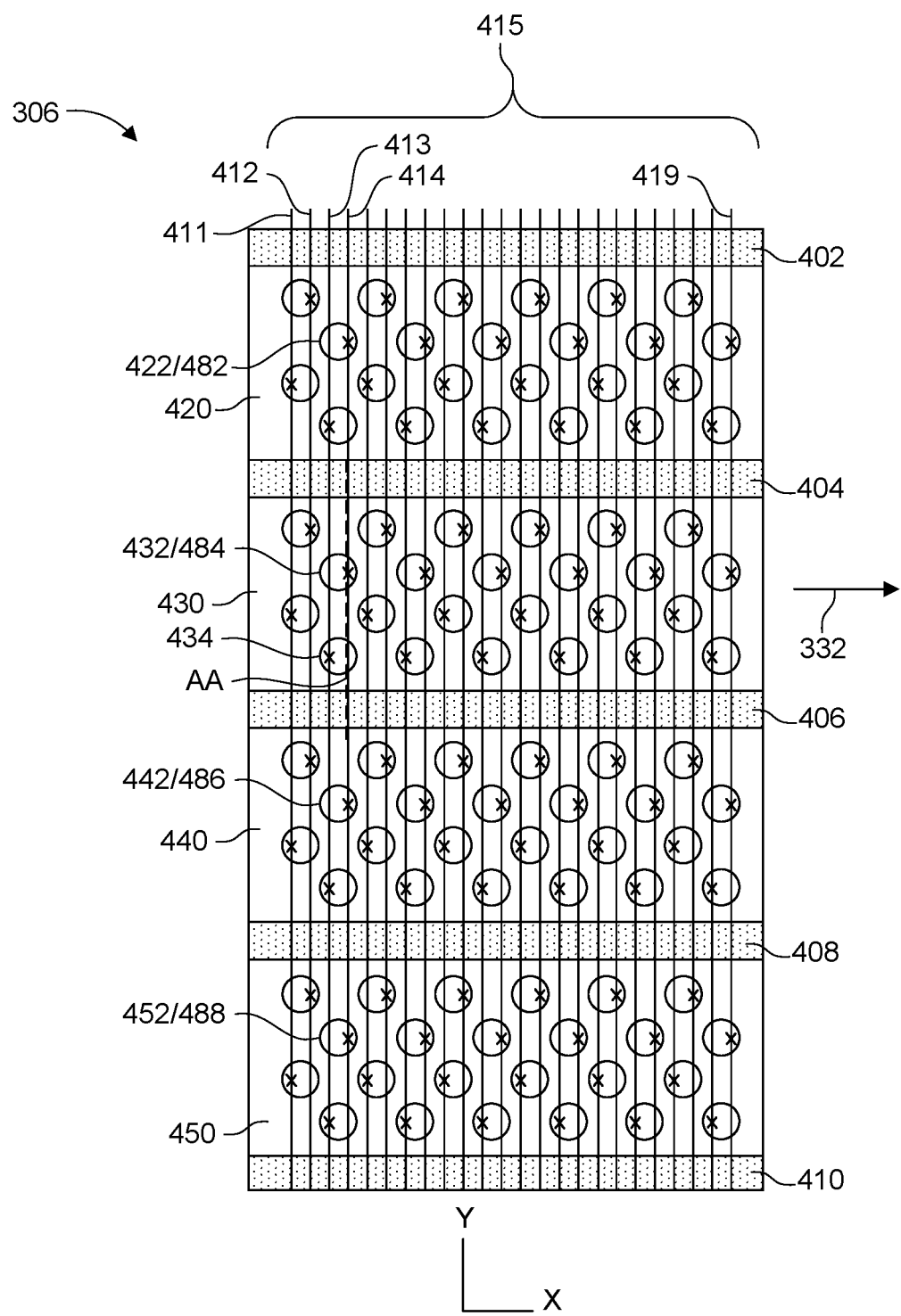
FIG. 4B depicts a top view of a portion of a block of example memory cells, in connection with which, example embodiments of the disclosed technology can be implemented.

FIGS. 4B-4F depict an example 3D NAND structure that corresponds to the structure of FIG. 3 and that can be used to implement memory structure 206 of FIGS. 2A and 2B. Although the example memory system of FIGS. 3-4H is a 3D memory structure that includes vertical NAND strings with charge-trapping material, it should be appreciated that other (2D and 3D) memory structures can also be used with the technology described herein. FIG. 4B is a block diagram depicting a top view of a portion of one block from memory structure 206. The portion of the block depicted in FIG. 4B corresponds to portion 306 in block 2 of FIG. 4A. As can be seen from FIG. 4B, the block depicted in FIG. 4B extends in the direction of 332. While in some embodiments, the memory array may have many layers, FIG. 4B illustrates only the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442 and 452. Vertical column 422 implements NAND string 482. Vertical column 432 implements NAND string 484. Vertical column 442 implements NAND string 486. Vertical column 452 implements NAND string 488. More details of the vertical columns are provided below. Since the block depicted in FIG. 4B extends in the direction of arrow 332, the block includes more vertical columns than depicted in FIG. 4B.

FIG. 4B also depicts a set of bitlines 415, including bitlines 411, 412, 413, 414, . . . 419. FIG. 4B shows twenty-four bitlines because only a portion of the block is depicted. It is contemplated that more than twenty-four bitlines connected to vertical columns of the block. Each of the circles representing vertical columns has an "x" to indicate its connection to one bitline. For example, bitline 414 is connected to vertical columns 422, 432, 442 and 452.

The block depicted in FIG. 4B includes a set of local interconnects 402, 404, 406, 408 and 410 that connect the various layers to a source line below the vertical columns. Local interconnects 402, 404, 406, 408 and 410 also serve to divide each layer of the block into four regions; for example, the top layer depicted in FIG. 4B is divided into regions 420, 430, 440 and 450, which are referred to as fingers. In the layers of the block that implement memory cells, the four regions are referred to as wordline fingers that are separated by the local interconnects. In one embodiment, the wordline fingers on a common level of a block connect together to form a single wordline. In another embodiment, the wordline fingers on the same level are not connected together. In one example implementation, a bitline only connects to one vertical column in each of regions 420, 430, 440 and 450. In that implementation, each block has sixteen rows of active columns and each bitline connects to four rows in each block. In one embodiment, all of the four rows connected to a common bitline are connected to the same wordline (via different wordline fingers on the same level that are connected together), in which case, the system uses the source side selection lines and the drain side selection lines to choose one (or another subset) of the four to be subjected to a memory operation (program, verify, read, and/or erase).

Although FIG. 4B shows four regions and sixteen rows of vertical columns in a block, with each region having four rows of vertical columns, those exact numbers are an example implementation. Other embodiments may include more or less regions per block, more or less rows of vertical columns per region, and/or more or less rows of vertical columns per block. FIG. 4B also shows the vertical columns being staggered. In other embodiments, different patterns of staggering can be used. In some embodiments, the vertical columns may not be staggered.

Figure 4C:
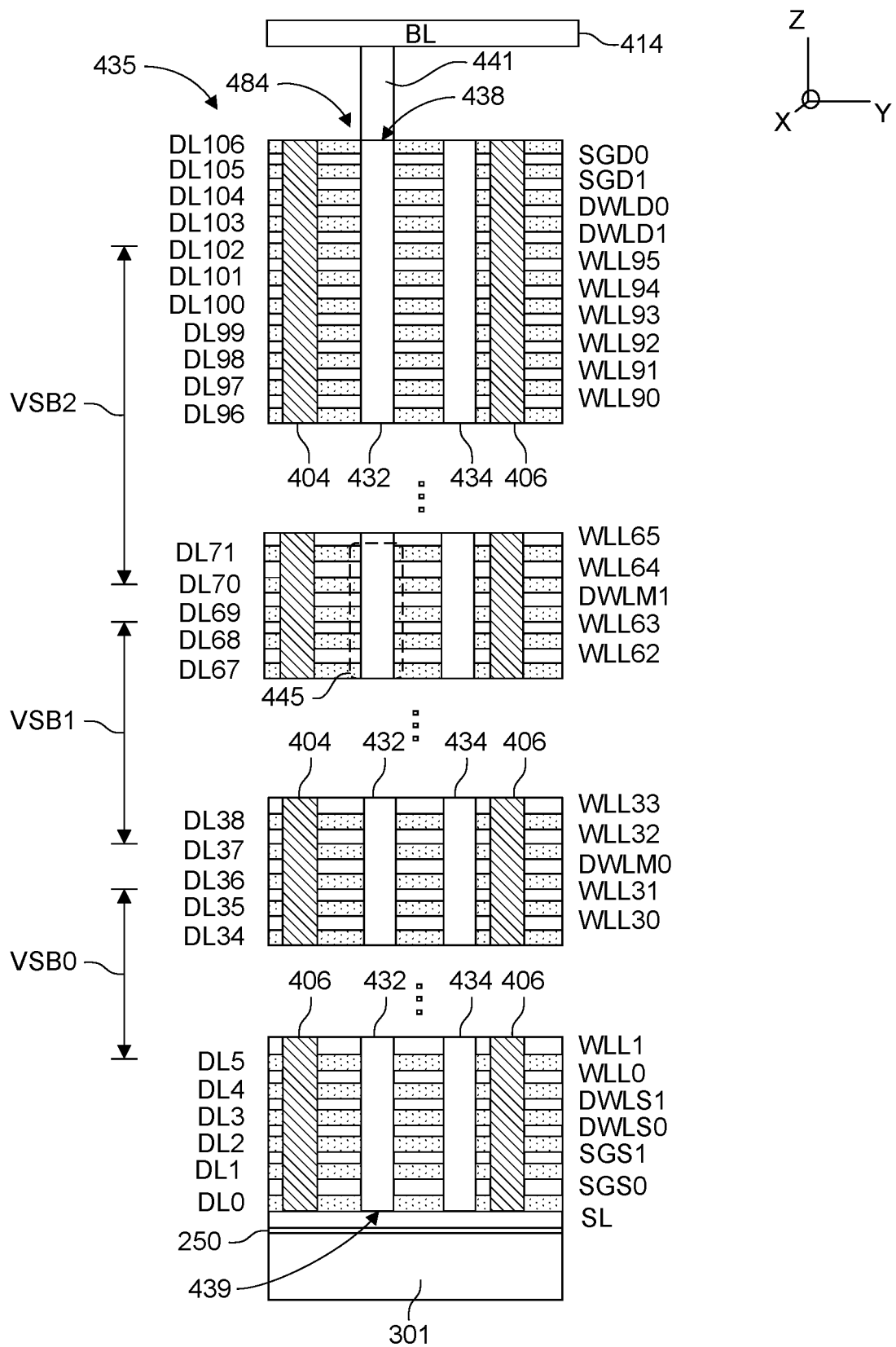
FIG. 4C depicts a stack showing a cross-sectional view along line AA of FIG. 4B.

FIG. 4C depicts an embodiment of a stack 435 showing a cross-sectional view along line AA of FIG. 4B. Two SGD layers (SGD0, SDG1), two SGS layers (SGS0, SGS1) and six dummy wordline layers DWLD0, DWLD1, DWLM1, DWLM0, DWLS0 and DWLS1 are provided, in addition to the data wordline layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DLO-DL106.

Columns 432, 434 of memory cells are depicted in the multi-layer stack. The stack includes a substrate 301, an insulating film 250 on the substrate, and a portion of a source line SL. A portion of the bitline 414 is also depicted. Note that NAND string 484 is connected to the bitline 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bitline 414. The metal-filled slits 404 and 406 from FIG. 4B are also depicted.

The stack 435 is divided into three vertical sub-blocks (VSB0, VSB1, VSB2). Vertical sub-block VSB0 includes WLL0-WLL31. Layers SGS0, SGS1, DWLS0, DWLS1 could also be considered to be a part of vertical sub-block VSB0. Vertical sub-block VSB1 includes WLL32-WLL63. Layers SGD0, SGD1, DWLD0, DWLD1 could also be considered to be a part of vertical sub-block VSB2. Vertical sub-block VSB2 includes WLL64-WLL95. Each NAND string has a set of data memory cells in each of the vertical sub-blocks. Dummy wordline layer DMLM0 is between vertical sub-block VSB0 and vertical sub-block VSB1. Dummy wordline layer DMLM1 is between vertical sub-block VSB1 and vertical sub-block VSB2. The dummy wordline layers have dummy memory cell transistors that may be used to electrically isolate a first set of memory cell transistors within the memory string (e.g., corresponding to vertical sub-block VSB0 wordlines WLL0-WLL31) from a second set of memory cell transistors within the memory string (e.g., corresponding to the vertical sub-block VSB1 wordlines WLL32-WLL63) during a memory operation (e.g., an erase operation or a programming operation).

In another embodiment, one or more middle junction transistor layers are used to divide the stack 435 into vertical sub-blocks. A middle junction transistor layer contains junction transistors, which do not necessarily contain a charge storage region. Hence, a junction transistor is typically not considered to be a dummy memory cell. Both a junction transistor and a dummy memory cell may be referred to herein as a "non-data transistor." A non-data transistor, as the term is used herein, is a transistor on a NAND string, where the transistor is either configured to not store user or system data or operated in such a way that the transistor is not used to store user data or system data. A wordline that is connected to non-data transistors is referred to herein as a non-data wordline. Examples of non-data wordlines include, but are not limited to, dummy wordlines, a select line in a middle junction transistor layer, or the like.

The stack 435 may have more than three vertical sub-blocks. For example, the stack 435 may be divided into four, five, or more vertical sub-blocks. Each of the vertical sub-blocks may contain at least one data memory cell. In some embodiments, additional layers similar to the middle dummy wordline layers DWLM may be provided to divide the stack 435 into the additional vertical sub-blocks. In one embodiment, the stack has two vertical sub-blocks.

Figure 4D:
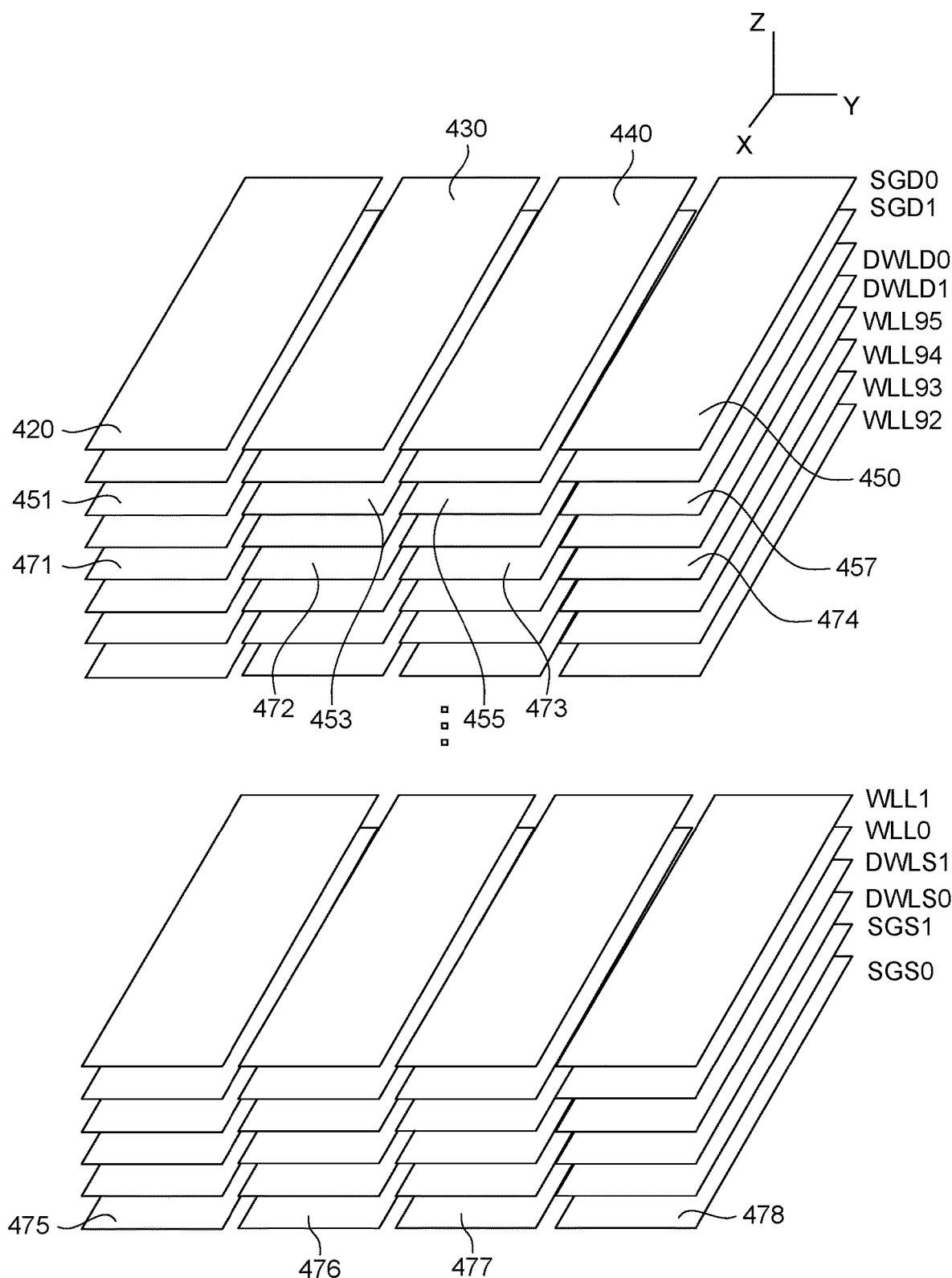
FIG. 4D depicts an alternative view of the select gate layers and wordline layers of the stack of FIG. 4C.

FIG. 4D depicts an alternative view of the SG layers and wordline layers of the stack 435 of FIG. 4C. Each of SGD layers SGD0 and SGD0 (the drain side SG layers) includes parallel rows of SG lines associated with the drain side of a set of NAND strings. For example, SGD0 includes drain side SG regions 420, 430, 440 and 450, consistent with FIG. 4B. Below the SGD layers are the drain side dummy wordline layers. In one implementation, each dummy wordline layer represents a wordline that is connected to a set of dummy memory cells at a given height in the stack. For example, DWLD0 includes wordline layer regions 451, 453, 455 and 457. A dummy memory cell, also referred to herein as a non-data memory cell, does not store data and is ineligible to store data, while a data memory cell is eligible to store data. Moreover, the threshold voltage Vth of a dummy memory cell is generally fixed at the time of manufacture or may be periodically adjusted, while the Vth of the data memory cells changes more frequently, e.g., during erase and programming operations of the data memory cells.

Below the dummy wordline layers are the data wordline layers. For example, WLL95 comprises wordline layer regions 471, 472, 473 and 474. Below the data wordline layers are the source side dummy wordline layers. Below the source side dummy wordline layers are the SGS layers. Each of the SGS layers SGS0 and SGS1 (the source side SG layers) includes parallel rows of SG lines associated with the source side of a set of NAND strings. For example, SGS0 includes source side SG lines 475, 476, 477 and 478. In some embodiments, each SG line is independently controlled, while in other embodiments, the SG lines are connected and commonly controlled.

Figure 4E:
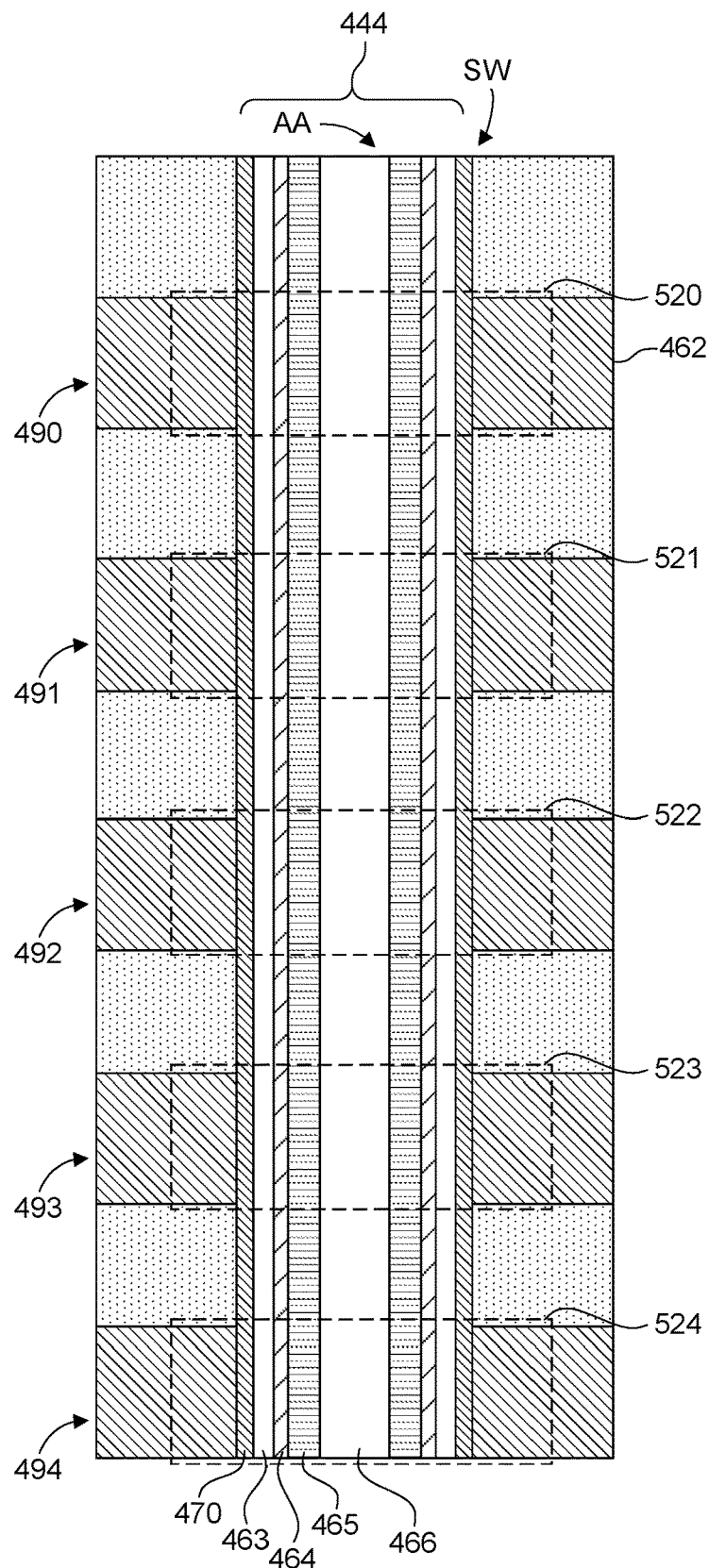
FIG. 4E depicts a view of a region of FIG. 4C.

FIG. 4E depicts a view of the region 445 of FIG. 4C. Data memory cell transistors 520 and 521 are above dummy memory cell transistor 522. Below dummy memory cell transistor 522 are data memory cell transistors 523 and 524. A number of layers can be deposited along the sidewall (SW) of the memory hole 444 and/or within each wordline layer, e.g., using atomic layer deposition. For example, each column (e.g., the pillar which is formed by the materials within a memory hole) can include a blocking oxide/block high-k material 470, charge-trapping layer or film 463 such as SiN or other nitride, a tunneling layer 464, a polysilicon body or channel 465, and a dielectric core 466. A wordline layer can include a conductive metal 462 such as tungsten as a control gate. For example, control gates 490, 491, 492, 493 and 494 are provided. In this example, all of the layers except the metal are provided in the memory hole. In other approaches, some of the layers may be in the control gate layer. Additional pillars can be similarly formed in the different memory holes. A pillar can form a columnar active area (AA) of a NAND string.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Non-data transistors (e.g., select transistors, dummy memory cell transistors) may also include the charge trapping layer 463. For example, in FIG. 4E, dummy memory cell transistor 522 includes the charge trapping layer 463. Thus, the Vth of at least some non-data transistors may also be adjusted by storing or removing electrons from the charge trapping layer 463. However, it is not required that all non-data transistors have an adjustable Vth. For example, the charge trapping layer 463 is not required to be present in every select transistor.

Each of the memory holes can be filled with a plurality of annular layers comprising a blocking oxide layer, a charge trapping layer, a tunneling layer, and a channel layer. A core region of each of the memory holes is filled with a body material, and the plurality of annular layers are between the core region and the WLLs in each of the memory holes. In some cases, the tunneling layer 464 can comprise multiple layers such as in an oxide-nitride-oxide configuration.

Figure 4F:
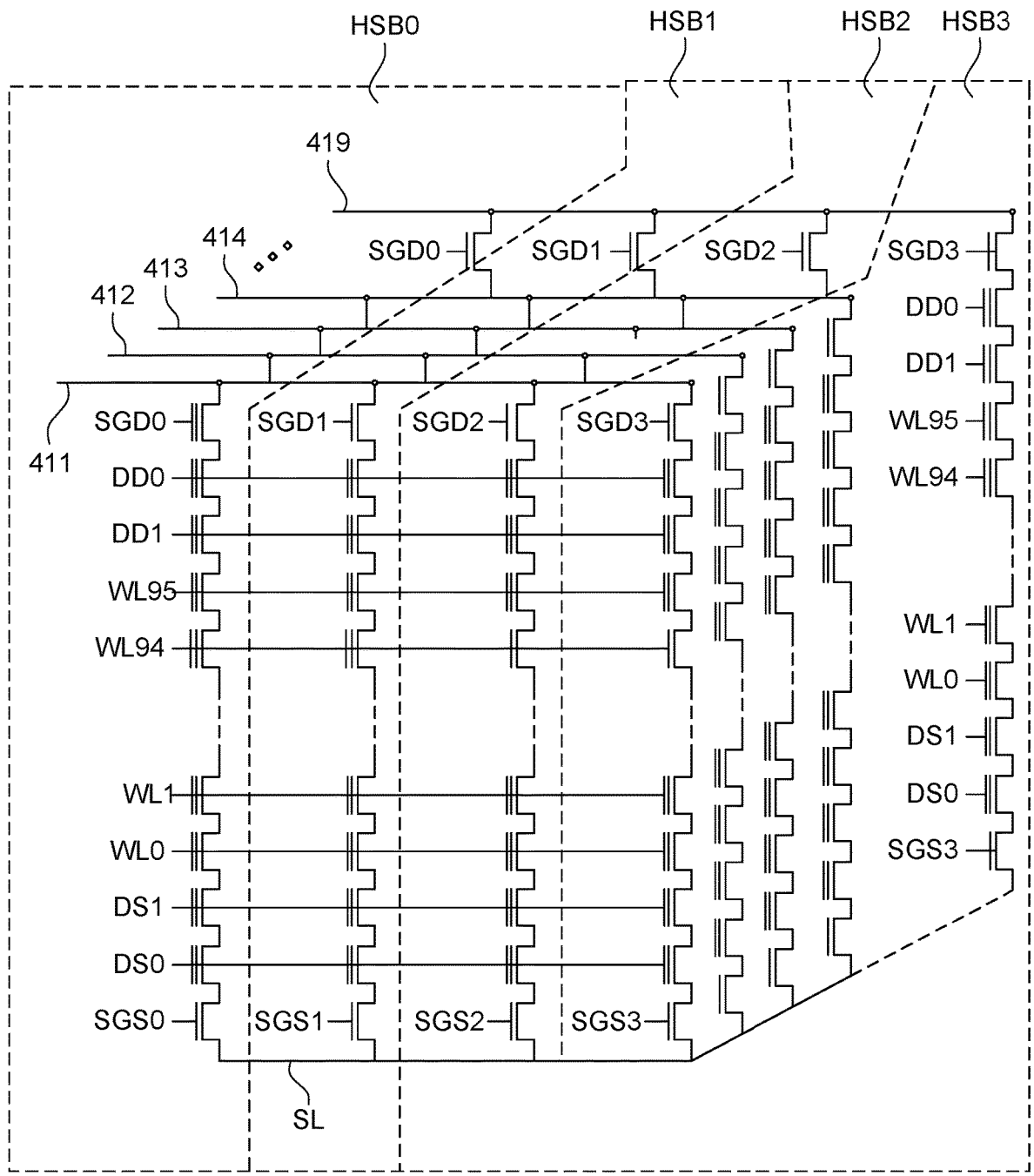
FIG. 4F is a schematic of a plurality of example NAND strings showing multiple horizontal sub-blocks, in connection with which, example embodiments of the disclosed technology can be implemented.

FIG. 4F is a schematic diagram of a portion of the memory depicted in FIGS. 3-4E. FIG. 4F shows physical wordlines WLL0-WLL95 running across the entire block. The structure of FIG. 4F corresponds to portion 306 in Block 2 of FIGS. 4A-E, including bitlines 411, 412, 413, 414, . . . 419. Within the block, each bitline is connected to four NAND strings. Drain side selection lines SGD0, SGD1, SGD2 and SGD3 are used to determine which of the four NAND strings connect to the associated bitline(s). Source side selection lines SGS0, SGS1, SGS2 and SGS3 are used to determine which of the four NAND strings connect to the common source line. The block can also be thought of as divided into four horizontal sub-blocks HSB0, HSB1, HSB2 and HSB3. Horizontal sub-block HSB0 corresponds to those vertical NAND strings controlled by SGD0 and SGS0, horizontal sub-block HSB1 corresponds to those vertical NAND strings controlled by SGD1 and SGS1, horizontal sub-block HSB2 corresponds to those vertical NAND strings controlled by SGD2 and SGS2, and horizontal sub-block HSB3 corresponds to those vertical NAND strings controlled by SGD3 and SGS3.

Figure 4G:
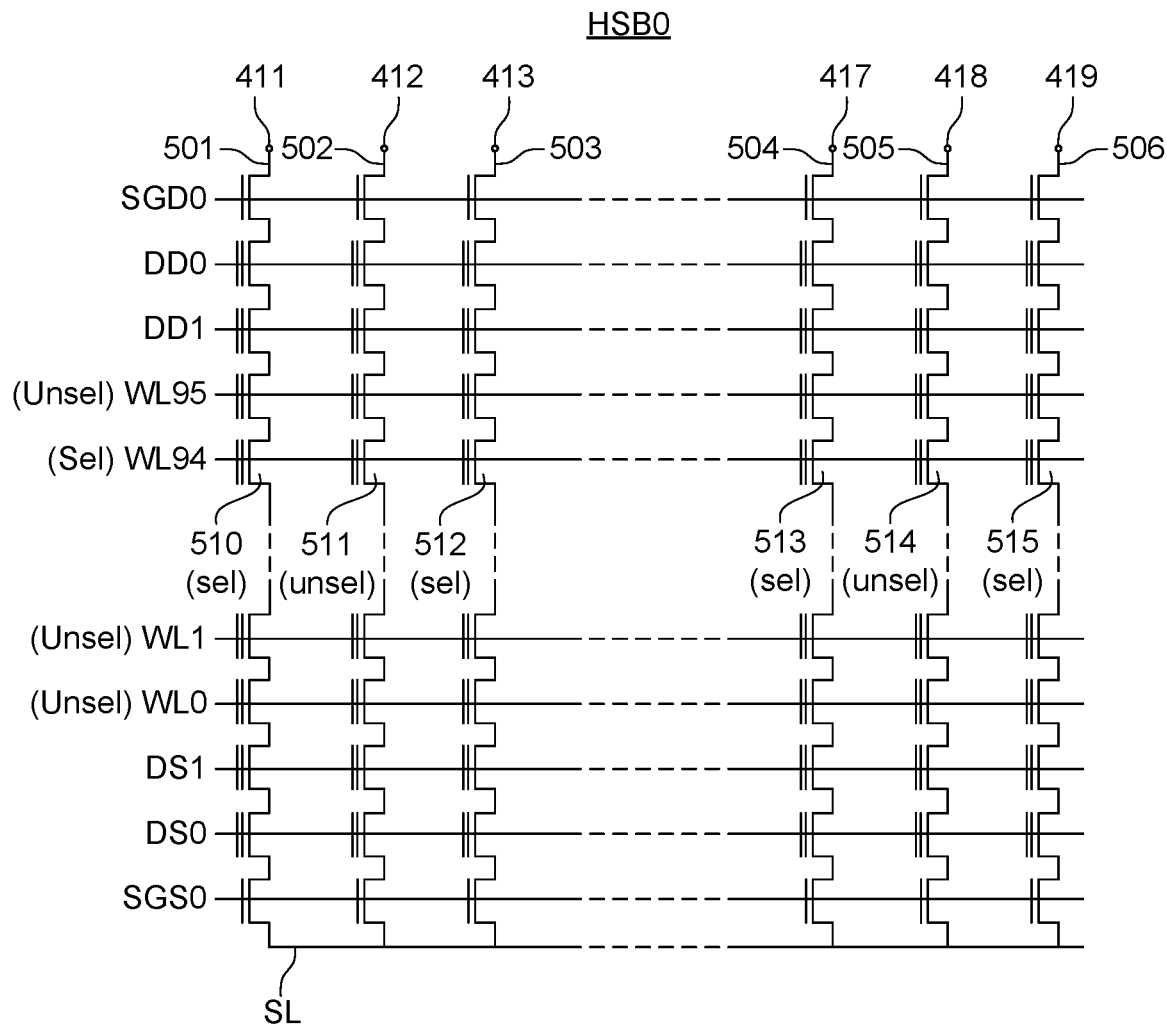
FIG. 4G is a schematic of a plurality of NAND strings showing one example horizontal sub-block, in connection with which, example embodiments of the disclosed technology can be implemented.
Figure 4H:
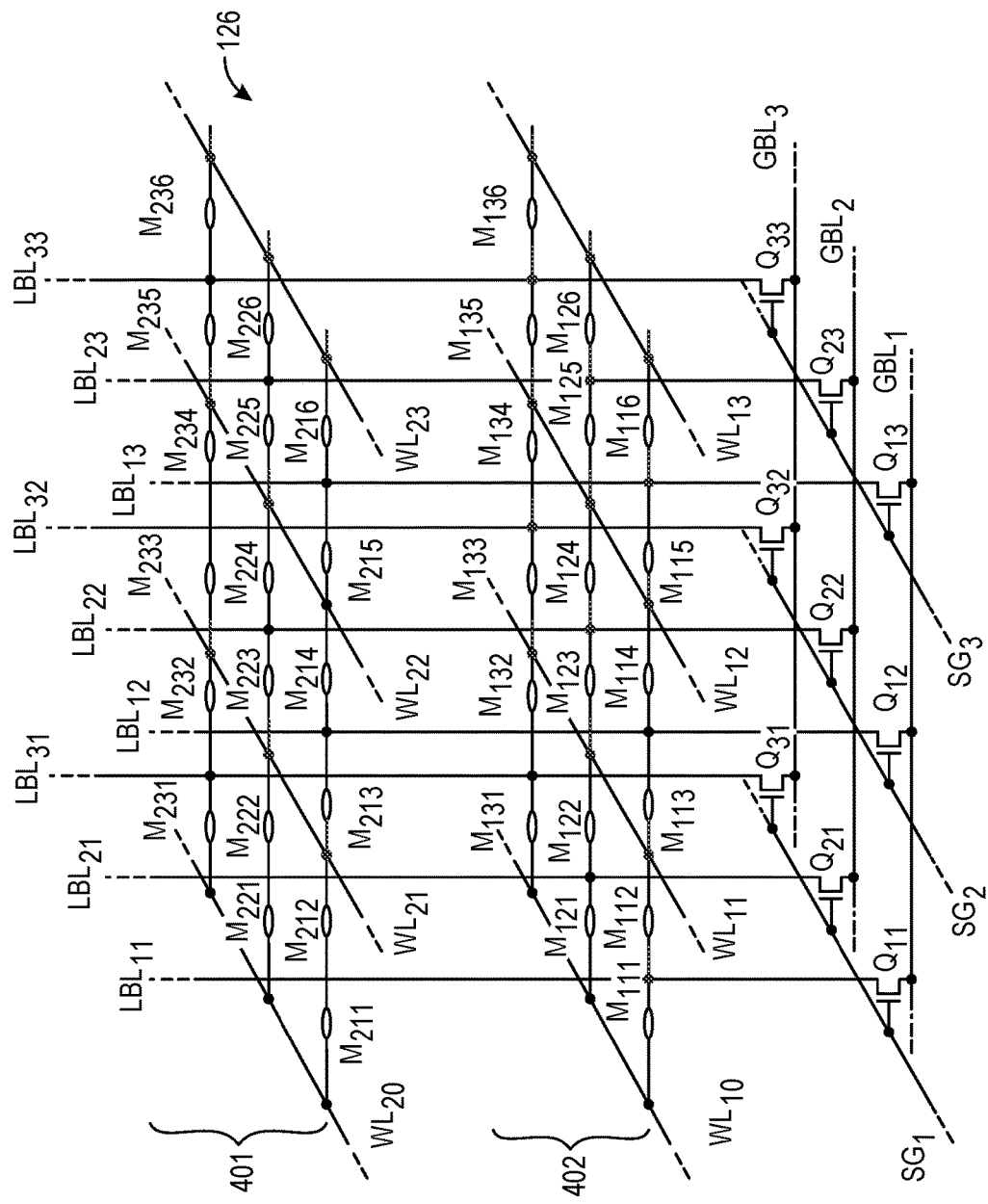
FIG. 4H depicts various embodiments of a portion of a three-dimensional memory array with a vertical cross-point structure, in connection with which, example embodiments of the disclosed technology can be implemented.

FIG. 4G is a schematic of horizontal sub-block HSB0. Horizontal sub-blocks HSB1, HSB2 and HSB3 may have similar structures. FIG. 4G shows physical wordlines WL0-WL95 running across the entire sub-block HSB0. All of the NAND strings of sub-block HSB0 are connected to SGD0 and SGS0. For ease of depiction, FIG. 4G only depicts six NAND strings 501, 502, 503, 504, 505, and 506; however, horizontal sub-block HSB0 may have thousands of NAND strings (e.g., 15,000 or more).

FIG. 4G is being used to explain the concept of a selected memory cell. A memory operation is an operation designed to use the memory for its purpose and includes one or more of reading data, writing/programming data, erasing memory cells, refreshing data in memory cells, and the like. During any given memory operation, a subset of the memory cells will be identified to be subjected to one or more parts of the memory operation. These memory cells identified to be subjected to the memory operation are referred to as selected memory cells. Memory cells that have not been identified to be subjected to the memory operation are referred to as unselected memory cells. Depending on the memory architecture, the memory type, and the memory operation, unselected memory cells may be actively or passively excluded from being subjected to the memory operation.

As an example of selected memory cells and unselected memory cells, during a programming process, the set of memory cells intended to take on a new electrical characteristic (or other characteristic) to reflect a changed programming state are referred to as the selected memory cells, while the memory cells that are not intended to take on a new electrical characteristic (or other characteristic) to reflect a changed programming state are referred to as the unselected memory cells. In certain situations, unselected memory cells may be connected to the same wordline as selected memory cells. Unselected memory cells may also be connected to different wordlines than selected memory cells. Similarly, during a reading process, the set of memory cells to be read are referred to as the selected memory cells, while the memory cells that are not intended to be read are referred to as the unselected memory cells.

To better understand the concept of selected memory cells and unselected memory cells, assume a programming operation is to be performed and, for example purposes only, that wordline WL94 and horizontal sub-block HSB0 are selected for programming (see FIG. 4G). That means that all of the memory cells connected to WL94 that are in horizontal sub-blocks HSB1, HSB2 and HSB3 (the other horizontal sub-blocks) are unselected memory cells. Some of the memory cells connected to WL94 in horizontal sub-block HSB0 are selected memory cells and some of the memory cells connected to WL94 in horizontal sub-block HSB0 are unselected memory cells depending on how the programming operation is performed and the data pattern being programmed. For example, those memory cells that are to remain in the erased state (e.g., state S0) will be unselected memory cells because their programming state will not change in order to store the desired data pattern, while those memory cells that are intended to take on a new electrical characteristic (or other characteristic) to reflect a changed programming state (e.g., programmed to states S1-S7) are selected memory cells. Looking at FIG. 4G, assume for example purposes, that memory cells 511 and 514 (which are connected to wordline WL94) are to remain in the erased state; therefore, memory cells 511 and 514 are unselected memory cells (labeled unsel in FIG. 4G). Additionally, assume, for example purposes, that memory cells 510, 512, 513 and 515 (which are connected to wordline WL94) are each to be programmed to a respective one of data states S1-S7; therefore, memory cells 510, 512, 513 and 515 are selected memory cells (labeled sel in FIG. 4G).

FIG. 4H illustrates another memory structure that can be used for the structure 126 of FIG. 1A. FIG. 4H illustrates a three-dimensional vertical cross-point structure, the wordlines still run horizontally, with the bitlines oriented to run in a vertical direction.

FIG. 4H depicts one embodiment of a portion of a monolithic three-dimensional memory array structure 126 that includes a first memory level 402 positioned below a second memory level 401. As depicted, the local bitlines LBL11-LBL33 are arranged in a first direction (e.g., a vertical direction) and the wordlines WL10-WL23 are arranged in a second direction perpendicular to the first direction. This arrangement of vertical bitlines in a monolithic three-dimensional memory array is one embodiment of a vertical bitline memory array. As depicted, disposed between the intersection of each local bitline and each wordline is a particular memory cell (e.g., memory cell M111 is disposed between local bitline LBL11 and wordline WL10). This structure can be used with a number of different memory cell structures. In one example, the particular memory cell may include a floating gate device or a charge trap device (e.g., using a silicon nitride material). In another example, the particular memory cell may include a reversible resistance-switching material, a metal oxide, a phase change memory (PCM) material, or a ReRAM material. The global bitlines GBL1-GBL3 are arranged in a third direction that is perpendicular to both the first direction and the second direction. A set of bitline select devices (e.g., Q11-Q31), such as a vertical thin film transistor (VTFT), may be used to select a set of local bitlines (e.g., LBL11-LBL31). As depicted, bitline select devices Q11-Q31 are used to select the local bitlines LBL11-LBL31 and to connect the local bitlines LBL11-LBL31 to the global bitlines GBL1-GBL3 using row select line SG1. Similarly, bitline select devices Q12-Q32 are used to selectively connect the local bitlines LBL12-LBL32 to the global bitlines GBL1-GBL3 using row select line SG2 and bitline select devices Q13-Q33 are used to selectively connect the local bitlines LBL13-LBL33 to the global bitlines GBL1-GBL3 using row select line SG3.

Referring to FIG. 4H, as only a single bitline select device is used per local bitline, only the voltage of a particular global bitline may be applied to a corresponding local bitline. Therefore, when a first set of local bitlines (e.g., LBL11-LBL31) is biased to the global bitlines GBL1-GBL3, the other local bitlines (e.g., LBL12-LBL32 and LBL13-LBL33) must either also be driven to the same global bitlines GBL1-GBL3 or be floated. In one embodiment, during a memory operation, all local bitlines within the memory array are first biased to an unselected bitline voltage by connecting each of the global bitlines to one or more local bitlines. After the local bitlines are biased to the unselected bitline voltage, then only a first set of local bitlines LBL11-LBL31 are biased to one or more selected bitline voltages via the global bitlines GBL1-GBL3, while the other local bitlines (e.g., LBL12-LBL32 and LBL13-LBL33) are floated. The one or more selected bitline voltages may correspond with, for example, one or more read voltages during a read operation or one or more programming voltages during a programming operation.

FIG. 5 depicts an overlay of an example nano-SIM host 510 and an example memory card 520. The overlay includes a comparison of the physical boundaries of nano-SIM host 510 and memory card 520, as well as a comparison of their respective pin locations. The pins of nano-SIM host 510 are depicted by solid lines while the pins of memory card 520 are depicted by dashed lines.

As depicted, the form factors for nano-SIM host 510 and memory card 520 are quite similar. As alluded to above, the form factor/appearance similarity between memory cards/hosts and nano-SIM hosts can lead to problematic "mistaken insertion" scenarios where a user mistakenly inserts a memory card into a nano-SIM host.

As depicted in FIG. 5, in these "mistaken insertion" scenarios, pins of the memory card may overlap with pins of the nano-SIM host. As a common example, a data line I/O pin of the memory card will overlap with a supply pin of the nano-SIM host. Such an overlap is depicted in FIG. 5 where memory card data line I/O pin 520(*b*) overlaps with nano-SIM host supply pin 510(*a*). It may also be noted that nano-SIM host supply pin 510(*a*) does not overlap with memory card supply pin 520(*a*)—which as alluded to above, will be the case in certain mistaken insertion scenarios.

As alluded to above, overlap between memory card data line I/O pin 520(*b*) and nano-SIM host supply pin 510(*a*) can be especially problematic when nano-SIM host supply pin 510(*a*) does not overlap with memory card supply pin 520(*a*). In these scenarios, nano-SIM host supply pin 510(*a*) may drive an I/O pad associated with memory card data line I/O pin 520(*b*) to the supply voltage of nano-SIM host 510 while memory card supply pin 520(*a*) is floating. With memory card supply pin 520(*a*) floating, the voltage of memory card 520's MCIO supply line will be essentially 0 V as voltage of memory card 520's MCIO supply line is derived from the voltage of memory card supply pin 520(*a*). This is problematic because—among other reasons—the reference voltage signals designed to protect components of memory card 520 are conventionally derived from voltage of memory card 520's MCIO supply line (as described above, these reference voltage signals may be supplied to gate terminals of reference voltage signal-receiving MOS devices of a voltage mode driver implemented in memory card 520). Accordingly, when the voltage of memory card 520's MCIO supply line is 0 V (or essentially 0 V), the values of the reference voltage signals will follow. When supplied at essentially 0 V, the reference voltage signals designed to protect components of memory card 520 can be ineffectual. This lack of reference voltage signal protection can lead to electrical overstress-related degradation of memory card 520 when the supply voltage of nano-SIM host 510 drives voltage of the I/O pad associated with memory card data line I/O pin 520(*b*) to non-zero values (e.g., 3.3 V).

In addition to electrical overstress, other problems can arise when voltage of the I/O pad associated with memory card data line I/O pin 520(*b*) is driven by the supply voltage of nano-SIM host 510 while memory card supply pin 520(*a*) is floating. For example, a current path may be created through components of memory card 520 electrically connected between the I/O pad associated with memory card data line I/O pin 520(*b*) and memory card 520's MCIO supply line (such electrical components may include "top branch" MOS devices of a voltage mode driver implemented in memory card 520). Namely, current may flow from the I/O pad associated with memory card data line I/O pin 520(*b*) to the lower voltage MCIO supply line of memory card 520 through the components—leading to electromigration-related degradation of memory card 520.

The above-described concerns (i.e., lack of effective reference voltage protection and current paths between memory card data line I/O pad and MCIO supply line) may be similar when memory card supply pin 520(*a*) is not floating—but voltage of the MCIO supply line is lower than voltage of the I/O pad associated with memory card data line I/O pin 520(*b*). These scenarios may arise when a host (e.g., a memory card host) is faulty. In these scenarios, reference voltage signals derived from memory card 520's MCIO supply line voltage (e.g., 1.8 V) may not be high enough to provide effective protection to memory card 520 when voltage of the I/O pad associated with memory card data line I/O pin 520(*b*) is driven to a higher voltage (e.g., 3.3 V). Similarly, because the I/O pad associated with memory card data line I/O pin 520(*b*) voltage is higher than MCIO supply line voltage (i.e., 3.3 V vs. 1.8 V), there may still be a current path through components of memory card 520 electrically connected between the I/O pad associated with memory card data line I/O pin 520(*b*) and the lower voltage MCIO supply line.

As alluded to above (and as will be described in greater detail below), embodiments address electromigration issues by adding an ESD float rail that is maintained at the higher of the voltage of the I/O pad associated with memory card data line I/O pin 520(*b*) and MCIO supply line voltage. By electrically connecting certain components to the ESD float rail instead of the MCIO supply line, embodiments can reduce/eliminate current paths through these components during mistaken insertion scenarios—thereby reducing electromigration-related degradation of memory card 520.

Figure 6:
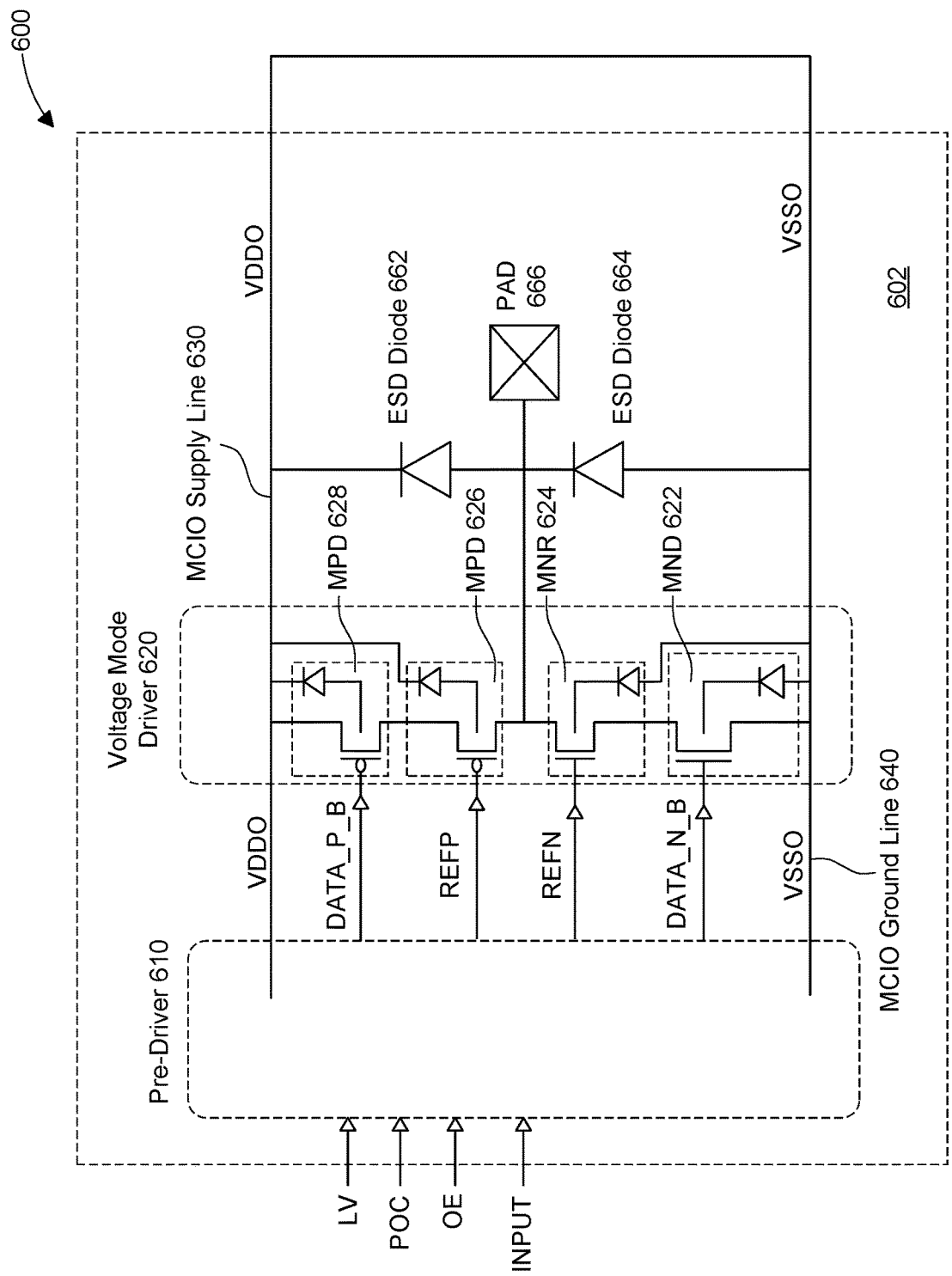
FIG. 6 depicts an example transceiver implemented in a memory card.

FIG. 6 depicts an example transceiver 602 implemented in a memory card 600. Transceiver 602 (e.g., a data line transceiver, a control line transceiver, etc.) may be an example of a conventional transceiver lacking the fail-safe reference voltage supply circuit(s) of the present technology. While not depicted, memory card 600 may be inserted into a host. As alluded to above, in "mistaken insertion" scenarios the host may be a non-memory card host (e.g., a nano-SIM host).

A memory card (e.g., memory card 600) typically includes one or more transceivers (e.g., transceiver 602). Examples of transceivers in memory cards may include data line transceivers (i.e., transceivers associated with data lines of a memory card), control line transceivers (i.e., transceivers associated with control lines of a memory card), etc. A memory card transceiver can send and receive signals to and from a host (e.g., a memory card host) via an I/O pad (e.g., I/O pad 666). When the transceiver is transmitting (i.e., in a transmitter mode), a voltage mode driver (e.g., voltage mode driver segment 620) of the transceiver can drive voltage of the I/O pad to desired values—thereby transmitting desired signals to the host. When the transceiver is receiving (i.e., in a receiver mode), voltage of the I/O pad is driven by external signals received from the host. In general, the voltage mode driver is enabled (i.e., on/activated) when the transceiver is transmitting and disabled (i.e., off/disactivated) when the transceiver is receiving. The voltage mode driver is enabled in response to voltage mode driver-enabling output enable (OE) signals, and disabled in response to voltage mode driver disabling OE signals. Voltage mode driver OE signals—along with input signals desired to be transmitted via the I/O pad—are typically provided to a pre-driver (e.g., pre-driver 610) of the transceiver by control/processing circuitry of the memory card.

Consistent with above, transceiver 602 comprises a pre-driver 610, a voltage mode driver segment 620, and an I/O pad 666.

Pre-driver 610 receives voltage mode driver OE signals and input signals (as depicted, pre-driver 610 may also receiver "low voltage" (LV) and power on control (POC) signals). The input signals relate to signals desired to be transmitted to a host via I/O pad 666 (such input signals will typically accompany a voltage mode driver enabling OE signal). Conventionally, voltage mode driver OE signals relate to enabling or disabling voltage mode driver segment 620. Namely, voltage mode driver enabling OE signals are sent by control/processing circuitry of memory card 600 to enable voltage mode driver segment 620. By contrast, voltage mode driver disabling OE signals are generally sent by control/processing circuitry of memory card 600 to disable voltage mode driver segment 620.

As alluded to above (and as will be described in greater detail in conjunction with FIGS. 7A-7B), embodiments of the present technology harness voltage mode driver OE signals for a new (and additional) purpose—namely triggering exit and re-entry of fail-safe mode operation for a fail-safe reference voltage supply circuit. In doing so, embodiments can achieve a simpler fail-safe solution than alternatives which require a specialized signal and/or specialized processing circuitry to trigger exiting/re-entering fail-safe mode. Accordingly, embodiments may be less expensive/simpler to implement than alternative solutions.

Referring again to FIG. 6, in response to receiving voltage mode driver OE signals and input signals, pre-driver 610 supplies voltage mode driver segment 620 with data-driven voltage signals (i.e., DATA_P_B and DATA_N_B). For example, in response to receiving a voltage mode driver disabling OE signal, pre-driver 610 can set the values of DATA_P_B and DATA_N_B to disable voltage mode driver segment 620. Relatedly, in response to receiving a voltage mode driver enabling OE signal, pre-driver 610 can set the values of DATA_P_B and DATA_N_B to enable voltage mode driver segment 620. Example voltages for DATA_P_B and DATA_N_B are depicted in example table 800 of FIG. 8. As depicted, the voltages are typically derived from the voltage of MCIO supply line 630 (e.g., VDDO, 0.5VDDO, 0.45VDDO) or the voltage of MCIO ground line 640 (e.g., 0 V).

As alluded to above, when pre-driver 610 receives a voltage mode driver enabling OE signal, pre-driver 610 will also typically receive an accompanying input signal (i.e., a voltage associated with a signal desired to be transmitted to a host via I/O pad 666). Accordingly, in these scenarios pre-driver 610 will typically set the values of DATA_P_B and DATA_N_B to: (1) enable voltage mode driver segment 620; and (2) ensure that voltage mode driver segment 620 drives voltage of I/O pad 666 in a manner that transmits the desired signal to the host.

As will be described in greater detail below, voltage mode driver segment 620 comprises a top branch and a bottom branch. When voltage mode driver segment 620 is disabled, both the top and bottom branches will be disabled. When voltage mode driver 620 is enabled, only one of the top branch and the bottom branch will be enabled. When the top branch is enabled and the bottom branch is disabled, voltage mode driver segment 620 may drive I/O pad 666 to a first voltage (associated with a first desired signal to be transmitted to the host). By contrast, when the bottom branch is enabled and the top branch is disabled, voltage mode driver segment 620 may drive I/O pad 666 to a second voltage (associated with a second desired signal to be transmitted to the host). In other words, for a first value of the input signal (e.g., 1), pre-driver 610 may set the respective values of DATA_P_B and DATA_N_B such that only the top branch of voltage mode driver segment 620 is enabled. By contrast, for a second value of the input signal (e.g., 0), pre-driver 610 may set the respective values of DATA_P_B and DATA_N_B such that only the bottom branch of voltage mode driver segment 620 is enabled. As will be described in greater detail below, depending on whether the top branch or bottom branch is enabled, voltage mode driver segment 620 will drive voltage of I/O pad 666 to different values.

As depicted, pre-driver 610 also provides two reference voltage signals to voltage mode driver segment 620 (i.e., REFP and REFN). As alluded to above, the reference voltage signals protect components of memory card 600.

Conventionally, the reference voltage signals are derived from voltage of MCIO supply line 630 and voltage of MCIO ground line 640. Example MCIO supply line 630-based voltages (e.g., VDDO, 0.5VDDO, 0.45VDDO, etc.) and MCIO ground line 640-based voltages (e.g., 0 V) for REFP and REFN are displayed in example table 800 of FIG. 8. As depicted in example table 800, the values of REFP and REFN may vary based on the values of power on control (POC) signals and "low voltage" (LV) signals received by pre-driver 610.

As alluded to above, and as will be described in greater detail below, deriving reference voltage signals (e.g., REFP and REFN) from the voltage of MCIO supply line 630 can be problematic in certain mistaken insertion scenarios where the memory card supply pin of memory card 600 is floating. With the memory card supply pin of memory card 600 floating, the voltage of MCIO supply line 630 will be essentially 0 V. When voltage of MCIO supply line 630 is 0 V (or essentially 0 V), the values of the reference voltage signals will follow. When supplied at essentially 0 V, the reference voltage signals designed to protect the components of memory card 600 can be ineffectual. This lack of reference voltage signal protection can lead to electrical over-stress-related and electromigration-related degradation of memory card 600 when an external supply voltage drives voltage of I/O pad 666 to non-zero values (e.g., 3.3 V).

As alluded to above, and as will be described in greater detail below, embodiments of the present technology address these problematic scenarios by selectively deriving reference voltage signals from I/O pad voltage during operation in a fail-safe mode. For example, when the memory card supply pin is floating—supplied reference voltage signals will be I/O-based voltages that effectively protect components of the memory card.

Referring now to voltage mode driver segment 620, as depicted, voltage mode driver segment 620 includes four MOS devices: MPD 628, MPR 626, MNR 624, and MND 622. Before describing these MOS devices in more detail, it may be noted that certain memory card transceivers include multi-segment voltage mode drivers. For this reason, voltage mode driver segment 620 is referred to as a "segment." However, it should be understood that in various implementations voltage mode driver segment 620 may comprise the only "segment" of a voltage mode driver implemented in transceiver 602.

Gate terminals of MPD 628 and MND 622 may be supplied with data-driven voltage signals DATA_P_B and DATA_N_B respectively (as alluded to above, these data-driven signals may be supplied by pre-driver 610). Accordingly, MPD 628 and MND 622 may be referred to as data-driven signal-receiving MOS devices of voltage mode driver segment 620.

Gate terminals MPR 626 and MNR 624 may be supplied with reference voltage signals REFP and REFN respectively (as alluded to above, these reference voltage signals may be supplied by pre-driver 610). Accordingly, MPR 626 and MNR 624 may be referred to as reference voltage signal-receiving MOS devices of voltage mode driver segment 620. As alluded to above, the reference voltage signals are designed to protect the MOS devices and other components of memory card 600.

As depicted, MPD 628 and MPR 626 comprise a "top branch" of voltage mode driver segment 620 electrically connected between MCIO supply line 630 and I/O pad 666. Namely, a source terminal of MPD 628 is electrically connected to MCIO supply line 630. Accordingly, the source terminal of MPD 628 is supplied with the voltage of MCIO supply line 630 (i.e., VDDO). When the MCIO supply line I/O pad of memory card 600 is non-floating, the voltage of MCIO supply line 630 (i.e., VDDO) may be 1.8V, 3.3 V, etc. However, when the supply pad of memory card 600 is floating, the voltage of MCIO supply line 630 may be 0 V (or essentially 0 V). As depicted, a drain terminal of MPD 628 is electrically connected to a source terminal of MPR 626 (for this reason voltage mode driver segment 620 may sometimes be referred to as a voltage mode cascoded driver segment). In turn, a drain terminal of MPR 626 is electrically connected to I/O pad 666—thereby connecting the top branch of voltage mode driver segment 620 to I/O pad 666. While not depicted, in various implementations one or more resistors (or other electrical components) may be electrically connected between the drain terminal of MPR 626 and I/O pad 666. As the term "electrically connected" is used herein, in these implementations the drain terminal of MPR 626 would still be electrically connected to I/O pad 666 as an electrical current can pass between them. In various examples, MPD 628 and MPR 626 may comprise "pull-up" MOS devices. Accordingly, the top branch of voltage mode driver segment 620 may also be referred to as the pull-up branch.

As depicted, MND 622 and MNR 624 comprise a "bottom branch" of voltage mode driver segment 620 that is electrically connected between an MCIO ground line of memory card 600 (i.e., an MCIO ground line 640) and I/O pad 666. Namely, a source terminal of MND 622 is electrically connected to MCIO ground line 640. Accordingly, MCIO ground line 640 supplies the source terminal of MND 622 with the ground voltage (i.e., 0 V). A drain terminal of MND 622 is electrically connected to a source terminal of MNR 624. In turn, a drain terminal of MNR 624 is electrically connected to I/O pad 666—thereby connecting the bottom branch of voltage mode driver segment 620 to I/O pad 666. While not depicted, in various implementations one or more resistors (or other electrical components) may be electrically connected between the drain terminal of MNR 624 and I/O pad 666. As the term "electrically connected" is used herein, in these implementations the drain terminal of MNR 624 would still be electrically connected to I/O pad 666 as an electrical current can pass between them. In various examples, MND 622 and MNR 624 may comprise "pull-down" MOS devices. Accordingly, the bottom branch of voltage mode driver segment 620 may also be referred to as the pull-down branch.

When voltage mode driver segment 620 is disabled, both the top and bottom branches of voltage mode driver segment 620 will be disabled. When voltage mode driver segment 620 is enabled, one of the top and bottom branches will be enabled, while the other branch is disabled. In general, a branch will be disabled if at least one of its constituent MOS devices is disabled. For example, if MPD 628 is disabled (based on the value of DATA_P_B), the top branch may be disabled. Similarly, if MND 622 is disabled (based on the value of DATA_N_B), the bottom branch may be disabled.

As alluded to above, when voltage mode driver segment 620 is enabled (i.e., one of the top and bottom branches is enabled), the values of DATA_P_B and DATA_N_B will vary depending on the desired signal to be transmitted via I/O pad 666. For example, if the desired signal to be transmitted is 1 (in this example, pre-driver 610 may receive an input signal of 1 from control/processing circuitry of memory card 600), DATA_P_B may be 0.45VDDO and DATA_N_B may be the ground voltage. Based on these data-driven signals, MPD 628 will be enabled, while MND 622 is disabled. Thus, the top branch will drive voltage of I/O pad 666 to VDDO (i.e., the voltage of MCIO supply line 630 supplied at the source terminal of MPD 628). By contrast, if the desired signal to be transmitted is 0 (in this example, pre-driver 610 may receive an input signal of 0 from control/processing circuitry of memory card 600), DATA_P_B may be VDDO and DATA_N_B may be 0.55VDDO. Based on these data-driven signals, MND 622 will be enabled while MPD 628 is disabled. Thus, the bottom branch will drive voltage of I/O pad 666 to the ground voltage (i.e., the voltage of MCIO ground line 640 supplied at the source terminal of MND 622). In this way, voltage mode driver 620 can drive voltage of I/O pad 666 to different values depending on input signal desired to be transmitted to the host.

When voltage mode driver segment 620 is disabled, voltage mode driver segment 620 will not drive voltage of I/O pad 666. In these scenarios, voltage of I/O pad 666 may be driven externally by a host. Here, the MOS devices of voltage mode driver segment 620) still require reference voltage protection as they are electrically connected to I/O pad 666. Accordingly, even when voltage mode driver segment 620 is disabled, reference voltage signals should be supplied to the gate terminals of MPR 626 and MNR 624 in order to protect the MOS devices and other components of memory card 600. Again, such reference voltage signals are conventionally derived from the voltage MCIO supply line 630.

However, as alluded to above, and as will be described in greater detail below, deriving the reference voltage signals from the voltage of MCIO supply line 630 can be problematic in certain mistaken insertion scenarios where the supply pin of memory card 600 is floating. With the supply pin of memory card 600 floating, the voltage of MCIO supply line 630 will be essentially 0 V. When the voltage of MCIO supply line 630 is 0 V (or essentially 0 V), the values of the reference voltage signals will follow. When supplied at essentially 0 V, the reference voltage signals designed to protect components of memory card 600 can be ineffectual. This lack of reference voltage signal protection can lead to electrical overstress-related degradation of memory card 600 when an external supply voltage drives voltage of I/O pad 666 to non-zero values (e.g., 3.3 V). As alluded to above, and as will be described in greater detail below, embodiments of the present technology address these problematic scenarios by selectively deriving reference voltage signals from I/O pad voltage during operation in a fail-safe mode. Accordingly, even if a memory card's supply pin is floating and/or at a lower voltage than an I/O pad—supplied reference voltage signals will effectively protect components of the memory card.

In addition to electrical overstress, other problems can arise when I/O pad 666 is driven externally while memory card 600's supply pin is floating. For example, a current path may be created through components of memory card 600 electrically connected between I/O pad 666 and (the lower voltage) MCIO supply line 630. Such electrical components may include the "top branch" MOS devices of voltage mode driver segment 620 (including their internal diodes) and ESD diode 662 (here ESD diode 662 may protect components of memory card 600 during ESD events—the same may be true of ESD diode 664). Namely, current may flow from I/O pad 666 to lower voltage MCIO supply line 630 through the components—leading to electromigration-related degradation of memory card 600.

As alluded to above (and as will be described in greater detail below), embodiments partially address these electromigration issues by providing effective/appropriate reference voltage signals. Embodiments further address these electromigration issues by adding an ESD float rail maintained at a voltage that is the higher of I/O pad voltage and MCIO supply line voltage. Accordingly, by electrically connected n-terminals of certain electrical components to the ESD float rail instead of the MCIO supply line, embodiments can eliminate/reduce current paths through these components during mistaken insertion scenarios—thereby reducing electromigration-related degradation of the memory card.

Figure 7A:
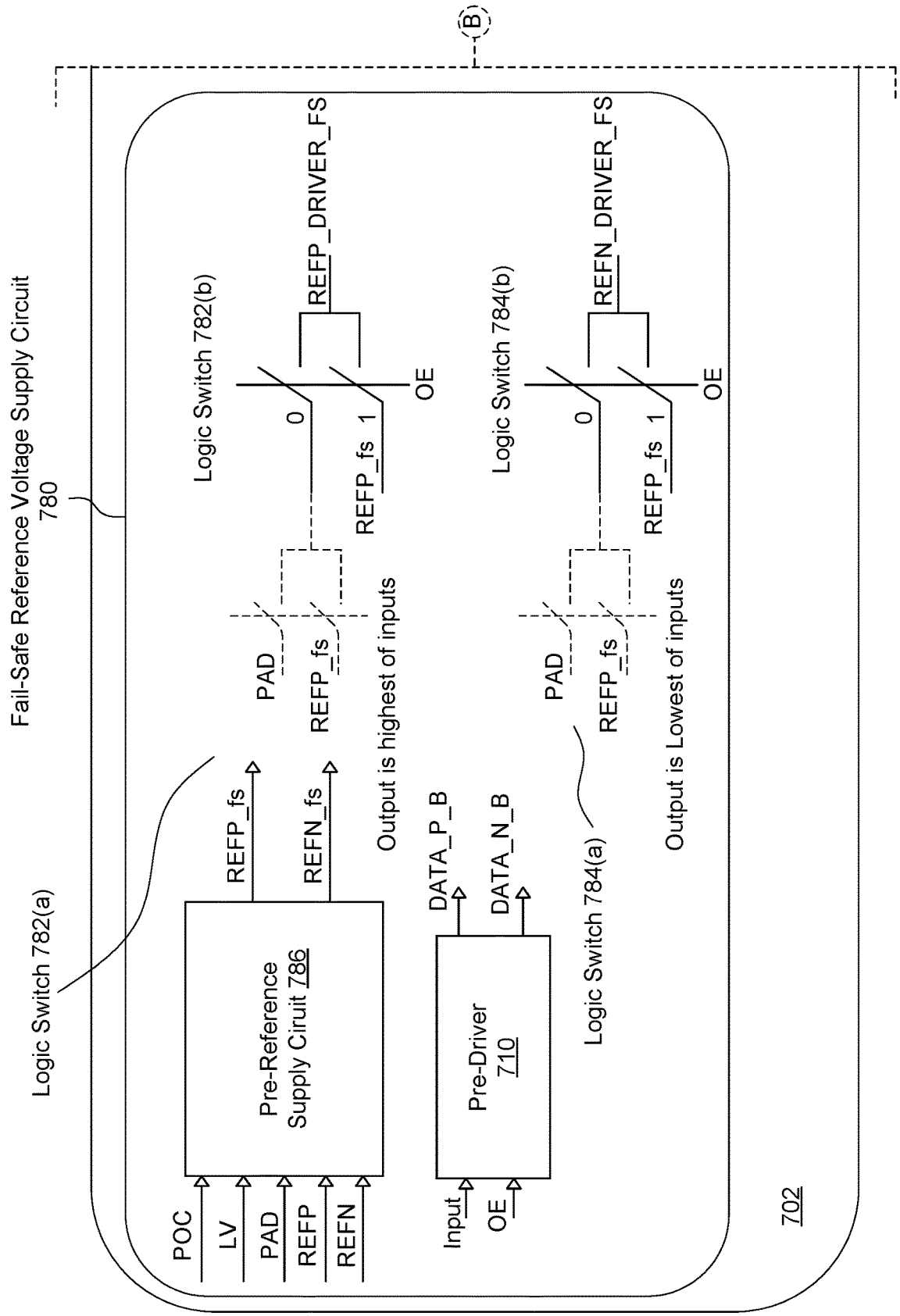
FIGS. 7A and 7B depict an example transceiver implemented in a memory card, in accordance with embodiments of the present technology.
Figure 7B:
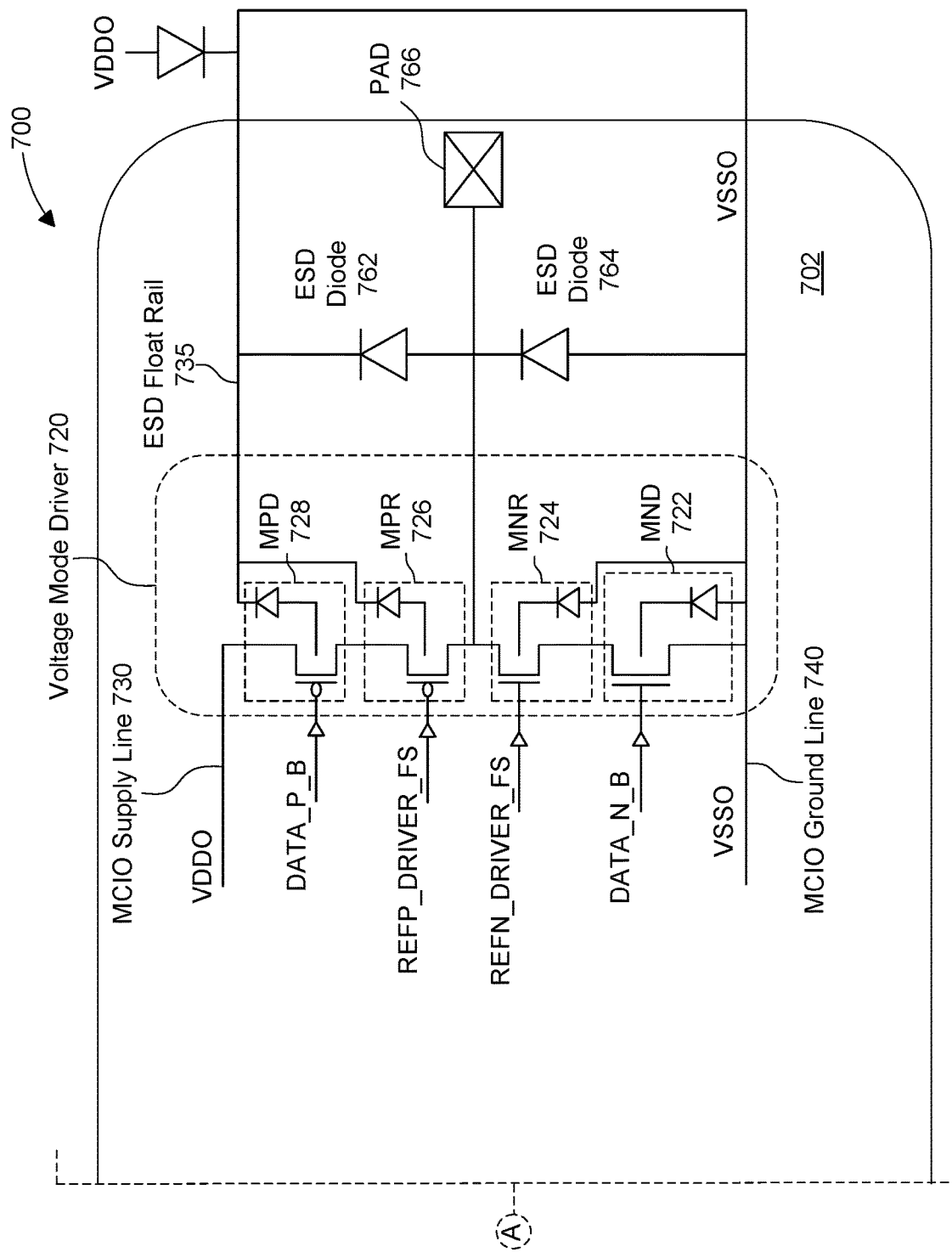

Before describing embodiments of the present technology in FIGS. 7A-7B, it should be understood that the above-described concerns (i.e., lack of effective reference voltage protection and current paths between I/O pad and MCIO card supply line) may be similar when memory card 600's supply pin is not floating—but MCIO supply line 630 is at lower voltage than I/O pad 666. Such scenarios may arise during faulty operation of a host. In these scenarios, reference voltage signals derived from voltage of MCIO supply line 630 (e.g., 1.8 V) may not be high enough to provide effective protection to memory card 600 when voltage of I/O pad 666 is driven to a higher voltage (e.g., 3.3 V). Similarly, because voltage of I/O pad 666 is higher than voltage of MCIO supply line 630 (e.g., 3.3 V vs. 1.8 V), there may still be a current path through components of memory card 600 electrically connected between I/O pad 666 and lower voltage memory card supply line 630. As will be described in greater detail below, embodiments are designed to address these scenarios as well.

FIGS. 7A and 7B depict an example transceiver 702 implemented in a memory card 700, in accordance with embodiments of the present technology. As depicted, transceiver 702 includes a fail-safe reference voltage supply circuit 780 in accordance with the present technology. Transceiver 702 also includes an ESD float rail 735 in accordance with the present technology. Excluding fail-safe reference voltage supply circuit 780 and ESD float rail 735, transceiver 702 may be the same/similar as transceiver 602 described in conjunction with FIG. 6.

Before describing FIGS. 7A-7B in more detail, it should be understood that FIGS. 7A-7B merely depict an illustrative example of a memory card of the present technology. That is, the general principles disclosed herein may be implemented using various fail-safe reference voltage supply circuits architectures. Relatedly, these principles may be implemented in conjunction with various transceiver architectures, voltage mode driver architectures, etc.

Namely, embodiments of the present technology provide memory cards intelligently designed to provide protection when mistakenly inserted into non-memory card hosts. Embodiments achieve such protection with less footprint/circuitry than existing fail-safe solutions, and without electrical overstress-causing offset voltages characteristic of existing fail-safe solutions.

To realize these advantages, a memory card of the present technology includes a fail-safe reference voltage supply circuit that operates in a "fail-safe mode" by default, and exits and re-enters the fail-safe mode in response to voltage mode driver OE signals. Because the fail-safe solution of the present technology does not rely on large voltage comparison circuits, embodiments may be less expensive and easier to implement than existing fail-safe solutions. Relatedly, without (large) offset voltages characteristic of voltage comparison, embodiments may be realized with less electrical overstress-related degradation than existing fail-safe solutions.

In various examples, a memory card of the present technology (e.g., memory card 700) may comprise: (1) an I/O pad (e.g., I/O pad 766); (2) a voltage mode driver (e.g., voltage mode driver segment 720) comprising a reference voltage signal-receiving MOS device (e.g., MPR 726), wherein a drain terminal of the reference voltage signal-receiving MOS device is electrically connected to the I/O pad (as depicted in FIGS. 7A-7B, the voltage mode driver may comprise one or more additional reference voltage signal-receiving MOS devices—e.g., MNR 724—electrically connected to the I/O pad); and (3) a fail-safe reference voltage signal supply circuit (e.g., fail-safe reference voltage signal supply circuit 780) that supplies a reference voltage signal (e.g., REFP_DRIVER_FS) to a gate terminal of the reference voltage signal-receiving MOS device based in part on voltage mode driver OE signals received by the fail-safe reference voltage signal supply circuit (as depicted, the fail-safe reference voltage signal supply circuit may supply additional reference voltage signals—e.g., REFN_DRIVER_FS—where the voltage mode driver has multiple reference voltage signal-receiving MOS devices).

The fail-safe reference voltage signal supply circuit may operate in a fail-safe mode by default, and switch to a normal operation mode in response to receiving a voltage mode driver enabling OE signal (i.e., an OE signal conventionally sent by processing circuitry of the memory card to enable the voltage mode driver). In various embodiments, processing circuitry of the memory card may only provide voltage mode driver enabling OE signals after an initialization process has been successfully completed between the memory card and a host into which the memory card is inserted. Because a (mistakenly inserted) memory card could not complete such an initialization process with a non-memory card host (e.g., a nano-SIM host), such a design feature ensures that during mistaken insertion scenarios the memory card only operates in the fail-safe mode. Upon completion of such an initialization process, the fail-safe reference voltage signal supply circuit can switch to a normal operation mode in response to receiving a voltage mode driver enabling OE signal.

As will be described in greater detail below, when the fail-safe reference voltage signal supply circuit operates in the fail-safe mode and a supply pin of the memory card is floating, the reference voltage signal supplied by the fail-safe reference voltage signal supply circuit may comprise an I/O pad-based voltage (e.g., a voltage derived from voltage of I/O pad 766). By contrast, when the fail-safe reference voltage signal supply circuit operates in the normal operation mode, the reference voltage signal supplied by the fail-safe reference voltage signal supply circuit may comprise an MCIO supply line-based voltage (e.g., a voltage derived from voltage of MCIO supply line 730)—as would be conventional in existing non-fail-safe technologies.

In certain examples, the fail-safe reference voltage signal supply circuit may comprise: (a) a first logic switch sub-circuit (e.g., logic switch sub-circuit 782(*a*)); and (b) a second logic switch sub-circuit (e.g., logic switch sub-circuit 782(*b*)). The first logic switch sub-circuit may comprise: (i) a first source terminal that receives the I/O pad-based voltage (e.g., PAD); (ii) a second source terminal that receives a pre-reference voltage (e.g., REFP_fs—the value of this pre-reference voltage may vary depending on whether the fail-safe reference voltage signal supply circuit operates in the fail-safe mode vs. the normal operation mode and/or depending on voltage of the MCIO supply line); and (iii) a drain terminal that supplies, to a first source terminal of the second logic switch sub-circuit, the higher voltage received by the first and second source terminals of the first logic switch sub-circuit. The second logic switch sub-circuit may comprise: (i) the first source terminal (of the second logic switch sub-circuit) that receives voltage supplied from the drain terminal of the first logic switch sub-circuit; (ii) a second source terminal that receives the pre-reference voltage; (iii) a switching terminal that receives voltage mode driver OE signals; and (iv) a drain terminal that supplies the reference voltage signal to the gate terminal of the reference voltage signal-receiving MOS device such that: (α) the reference voltage signal comprises the voltage received by the first source terminal of the second logic switch sub-circuit by default (and in response to the switching terminal of the second logic switch sub-circuit receiving a voltage mode driver disabling OE signal); and (β) in response to the switching terminal of the second logic switch sub-circuit receiving a voltage mode driver enabling OE signal (i.e., the trigger for switching to the normal operation mode), the reference voltage signal comprises the voltage received by the second source terminal of the second logic switch sub-circuit. When the fail-safe reference voltage signal supply circuit operates in the fail-safe mode and the memory card supply pin is floating, the pre-reference voltage may be a second I/O pad-based voltage (e.g., 0.5PAD) which is smaller than the I/O based-voltage supplied at the first source terminal of first logic switch sub-circuit. Accordingly, the drain terminal of the first logic switch sub-circuit may supply the I/O pad-based voltage (e.g., PAD) to the first source terminal of the second logic switch sub-circuit. Relatedly, by default (and in response to receiving a voltage mode driver disabling OE signal), the drain terminal of the second logic switch sub-circuit may supply, as the reference voltage signal, the I/O pad-based voltage (e.g., PAD) received at the first source terminal of the second logic switch sub-circuit. In this way, an I/O pad-based reference voltage signal is supplied to the gate terminal of the reference voltage signal-receiving MOS device when the voltage of the MCIO supply line (e.g., voltage of MCIO supply line 730) is essentially 0 V (as the supply pin of the memory card is floating)—thereby reducing/eliminating electrical overstress-related degradation in such a scenario.

In some embodiments, the voltage mode driver may further comprise a data-driven signal-receiving MOS device (e.g., MPD 728—as depicted the voltage mode driver may include one or more additional data-driven signal-receiving MOS devices—e.g., MND 722). A source terminal of the data-driven signal-receiving MOS device may be electrically connected to the MCIO supply line (e.g., MCIO supply line 730). A drain terminal of the data-driven signal-receiving MOS device may be connected to a source terminal of the reference voltage signal-receiving MOS device (e.g., MPR 726). Accordingly, the data driven signal-receiving MOS device and the reference voltage signal-receiving MOS device may comprise a "top branch" of the voltage mode driver. In these examples, when the fail-safe reference voltage signal supply circuit operates in the fail-safe mode and the supply pin of the memory card is floating, the voltage supplied to a gate terminal of the reference voltage signal-receiving MOS device may be an I/O pad-based voltage (e.g., DATA_P_B may be an I/O pad-based voltage as well) in order to protect the memory card.

In some embodiments, the memory card may further comprise an electrostatic discharge (ESD) float rail (e.g., ESD float rail 735). Voltage of the ESD float rail may be set to the higher of the voltage of the I/O pad and voltage of the MCIO supply line. In these examples, the data-driven signal-receiving MOS device may include a first internal diode (e.g., the internal diode of MPD 728) and the reference voltage signal-receiving MOS device may include a second internal diode (e.g., the internal diode of MPR 726). N-terminals of the first and second internal diodes respectively may be electrically connected to the ESD float rail. Such a design breaks from convention where these n-terminals are instead electrically connected to the MCIO supply line. However by connecting the n-terminals of the first and second internal diodes to the ESD float rail instead, embodiments can reduce/eliminate electromigration-related degradation caused by currents flowing through the first and second internal diodes when the MCIO supply line is at a lower voltage than the I/O pad. In some embodiments, the memory card may further comprise a diode associated with the I/O pad (e.g., ESD diode 762). In these embodiments, a p-terminal of the I/O pad-associated diode may be electrically connected to the I/O pad while an n-terminal of the I/O pad-associated diode is electrically connected to the ESD float rail. Again, such a design breaks from convention where the n-terminal of the I/O pad-associated diode is electrically connected to the MCIO supply line. However by connecting the n-terminal of the I/O pad-associated diode to the ESD float rail instead, embodiments can reduce/eliminate electromigration-related degradation caused by currents flowing through the I/O pad-associated diode when the MCIO supply line is at a lower voltage than the I/O pad.

Specific features of transceiver 702 including fail-safe reference voltage supply circuit 780 will be described in greater detail in the following paragraphs.

High Level Overview of Data Line Transceiver 702 Architecture

As depicted, transceiver 702 includes a fail-safe reference voltage supply circuit 780, a voltage mode driver segment 720, and an I/O pad 766.

Similar to transceiver 602 described in conjunction with FIG. 6, transceiver 702 can send and receive signals to and from a host (e.g., a memory card host) via I/O pad 766. When transceiver 702 is transmitting (i.e., in a transmitter mode), voltage mode driver segment 720 can drive voltage of I/O pad 766 to desired values—thereby transmitting desired signals to the host. When transceiver 702 is receiving (i.e., in a receiver mode), voltage of I/O pad 766 is driven by external signals received from the host. In general, voltage mode driver segment 720 is enabled (i.e., on/activated) when transceiver 702 is transmitting. Voltage mode driver segment 720 is generally disabled (i.e., off/disactivated) when transceiver 702 is receiving. Voltage mode driver segment 720 can be enabled in response to voltage mode driver enabling output enable (OE) signals, and disabled in response to voltage mode driver disabling OE signals. Voltage mode driver OE signals—along with input signals desired to be transmitted via I/O pad 766—are provided to fail-safe reference voltage supply circuit 780 by control/processing circuitry memory card 700.

Fail-Safe Reference Voltage Supply Circuit 780

As depicted, fail-safe reference voltage supply circuit 780 includes a pre-driver 710, a pre-reference supply circuit 786, and two sets of cascaded logic switch sub-circuits: i.e., cascaded logic switch sub-circuits 782(*a-b*) and 784(*a-b*). Cascaded logic switch sub-circuits 782(*a-b*) and 784(*a-b*) may be implemented using various types of MOS devices and well-proven configurations for logic switch circuits.

Pre-driver 710 receives voltage mode driver OE signals and input signals. As depicted, pre-driver 710 may also receive "low voltage" (LV) and power on control (POC) signals.

The input signals relate to signals desired to be transmitted to a host via I/O pad 766 (such input signals will typically accompany a voltage mode driver enabling OE signal). Conventionally, voltage mode driver OE signals relate to enabling or disabling voltage mode driver segment 720. Namely, voltage mode driver enabling OE signals can be sent by control/processing circuitry of memory card 700 to enable voltage mode driver segment 720. By contrast, voltage mode driver disabling OE signals can be sent by control/processing circuitry of memory card 700 to disable voltage mode driver segment 720.

As alluded to above, embodiments of the present technology harness voltage mode driver OE signals for a new (and additional) purpose—namely triggering exit and re-entry of fail-safe mode operation for fail-safe reference voltage supply circuit 780. Namely (and as will be described in greater detail below), embodiments can trigger exiting/ re-entering fail-safe mode by supplying the voltage mode driver OE signals at switching terminals of logic switches 782(*b*) and 784(*b*). In doing so, embodiments can achieve a simpler fail-safe solution than alternatives which require a specialized signal and/or specialized processing circuitry to trigger exiting/re-entering fail-safe mode. Accordingly, embodiments may be less expensive/simpler to implement than alternative solutions.

Referring again to pre-driver 710, in response to receiving the voltage mode driver OE signals and input signals, pre-driver 710 supplies data-driven signals DATA_P_B and DATA_N_B to MPD 728 and MND 722 of voltage mode driver segment 720 respectively. For example, in response to receiving a voltage mode driver disabling OE signal, pre-driver 710 can set the values of DATA_P_B and DATA_N_B to disable voltage mode driver segment 720. Relatedly, in response to receiving a voltage mode driver enabling OE signal, pre-driver 710 can set the values of DATA_P_B and DATA_N_B to enable voltage mode driver segment 720. As alluded to above, when pre-driver 710 receives a voltage mode driver enabling OE signal, pre-driver 710 will also typically receive an accompanying input signal (i.e., a voltage associated with a signal desired to be transmitted to the host via I/O pad 766). Accordingly, in these scenarios pre-driver 710 will typically set the values of DATA_P_B and DATA_N_B to: (1) enable voltage mode driver segment 720; and (2) ensure that voltage mode driver segment 720 drives voltage of I/O pad 766 in a manner that transmits the desired signal to the host.

Conventionally, the data-driven voltage signals DATA_P_B and DATA_N_B are derived from voltages of MCIO supply line 730 and MCIO ground line 740. For example, if a desired signal to be transmitted is 1 (in this example, pre-driver 710 may receive an input signal of 1 from control/processing circuitry of memory card 700), DATA_P_B may be 0.45VDDO and DATA_N_B may be the ground voltage. Based on these data-driven signals, MPD 728 may be enabled, while MND 722 is disabled. Thus, the top branch of voltage mode driver segment 720 will drive voltage of I/O pad 766 to VDDO (i.e., the voltage of MCIO supply line 730 supplied at the source terminal of MPD 728). By contrast, if the desired signal to be transmitted is 0 (in this example, pre-driver 710 may receive an input signal of 0 from control/processing circuitry of memory card 700), DATA_P_B may be VDDO and DATA_N_B may be 0.55VDDO. Based on these data-driven signals, MND 722 may be enabled while MPD 728 is disabled. Thus, the bottom branch of voltage mode driver segment 720 will drive voltage of I/O pad 766 to the ground voltage (i.e., the voltage of MCIO ground line 740 supplied at the source terminal of MND 722). In this way, voltage mode driver 720 can drive voltage of I/O pad 766 to different values depending on the input signal desired to be transmitted to the host. Relatedly, to disable voltage mode driver segment 720, DATA_P_B may be VDDO and DATA_N_B may be 0 V.

However, just as driving reference voltage signals off the voltage of MCIO supply line 730 can be problematic in certain mistaken insertion scenarios where the supply pin of memory card 700 is floating, the same can be true for driving the data-driven voltage signals off the voltage of MCIO supply line 730. Accordingly, in certain embodiments where fail-safe reference voltage supply circuit 780 is operating in a fail-safe mode (by default and/or in response to voltage mode driver disabling OE signals) and memory card 700's supply pin is floating, pre-driver 710 may derive DATA_P_B from voltage of I/O pad 766 instead. For example, pre-driver 710 may drive DATA_P_B to 0.5PAD instead of VDDO.

As depicted, pre-driver 710 may also supply "conventional reference voltage signals" (i.e., REFP and REFN) to pre-reference supply circuit 786. As alluded to in conjunction with FIG. 6 (and as depicted in table 800 of FIG. 8), pre-driver 710 may adjust the values of REFP and REFN based on the values of the LV and POC signals received by pre-driver 710.

Referring now to pre-reference supply circuit 786, pre-reference supply circuit 786 may supply pre-reference voltages (i.e., REFP_fs and REFN_fs) to source terminals of logic switch sub-circuits 782(*a*) and 784(*a*) respectively. As depicted in example table 900 of FIG. 9, when memory card 700's supply pin is floating- and voltage of MCIO supply line 730 is essentially 0 V (i.e., VDDO=0)—the pre-reference voltages supplied by pre-reference supply circuit 786 may be I/O pad 766—based voltages (e.g., 0.5PAD). By contrast, when memory card 700's supply pin is non-floating—and voltage of MCIO supply line 730 is non-zero (e.g., VDDO=1.8 V or 3.3 V)—the pre-reference voltages supplied by pre-reference supply circuit 786 may have the same/similar values as the conventional reference voltages supplied to pre-reference supply circuit 786 by pre-driver 710 (i.e., REFP and REFN). As described in conjunction with FIG. 6, these conventional reference voltages (i.e., REFP and REFN) are derived from MCIO supply line 730 voltage and/or MCIO ground line 740 voltage.

As depicted, pre-reference supply circuit 786 may supply an I/O pad 766-based pre-reference voltage (e.g., 0.5PAD) in response to receiving a first value of POC signal (e.g., POC=0). That is, in effect this first value of POC signal may trigger pre-reference supply circuit 786 to supply the I/O pad 766-based pre-reference voltage when memory card 700's supply pin is floating. By contrast, pre-reference supply circuit 786 may supply MCIO supply line 730-based and/or MCIO ground line 740-based pre-reference voltages in response to receiving a second value of POC signal (e.g., POC=1). In effect this second value of POC signal can trigger pre-reference supply circuit 786 to supply the MCIO supply line/MCIO ground line-based pre-reference voltages that conventional architectures supply as reference voltage signals (i.e., REFP and REFN described in conjunction with FIGS. 6 and 8).

Referring now to cascaded logic switch sub-circuits 782(*a-b*) and 784(*a-b*), cascaded logic switch sub-circuits 782(*a-b*) may supply a first reference voltage signal (i.e., REFP_DRIVER_FS) to MPR 726 of voltage mode driver segment 720. Cascaded logic switch sub-circuits 784(*a-b*) may supply a second reference voltage signal (i.e., REFN_DRIVER_FS) to MNR 724 of voltage mode driver segment 720. As depicted, the values of REFP_DRIVER_FS and REFN_DRIVER_FS respectively may depend on whether fail-safe reference voltage supply circuit 780 receives a voltage mode driver enabling OE signal (e.g., OE=1) vs. a voltage mode driver disabling OE signal (e.g., OE=0). Design and operation of these cascaded logic switch sub-circuits will now be described in greater detail.

Cascaded logic switch sub-circuits 782(*a-b*) comprise logic switch sub-circuit 782(*a*) and logic switch sub-circuit 782(*b*).

As depicted, a first source terminal of logic switch sub-circuit 782(*a*) receives a first I/O pad 766-based voltage (i.e., PAD). In certain embodiments the first I/O pad 766-based voltage (i.e., PAD) may be a charged-device-model (CDM)-protected version of the voltage of I/O pad 766. A second source terminal of logic switch sub-circuit 782(*a*) receives a first pre-reference voltage (i.e., REFP_fs). As described above, the value of REFP_fs may vary based in part on whether memory card 700's supply pin is floating. For example, when memory card 700's supply pin is floating (i.e., when voltage of MCIO supply line 730 is essentially 0 V), REFP_fs may be a second I/O pad 766-based voltage (e.g., 0.5PAD). In some embodiments, this second I/O pad 766-based voltage (e.g., 0.5PAD) may be smaller than the first I/O pad 766-based voltage (i.e., PAD)—although this need not be the case. By contrast, when memory card 700's supply pin is non-floating, the value of REFP_fs may be an MCIO supply line 730-based voltage or an MCIO ground line-based voltage. For example, when voltage of MCIO supply line 730 is 1.8 V, REFP_fs may be the ground voltage. By contrast, when voltage of MCIO supply line 730 is 3.3 V, REFP_fs may be an MCIO supply line 730-based voltage (e.g., 0.45VDDO).

In response to receiving the first I/O pad 766-based voltage (i.e., PAD) and the first pre-reference voltage (i.e., REFP_fs) at its first and second source terminals respectively, logic switch sub-circuit 782(*a*) will supply the higher of the two voltages at its drain terminal. As depicted, the drain terminal of logic switch sub-circuit 782(*a*) is electrically connected to a first source terminal of logic switch sub-circuit 782(*b*)—thus the cascaded terminology.

As depicted, the first source terminal of logic switch sub-circuit 782(*b*) receives the voltage supplied by the drain terminal of logic switch sub-circuit 782(*a*)—which will be the higher of the first I/O pad 766-based voltage (i.e., PAD) and the first pre-reference voltage (i.e., REFP_fs). Here, the voltage received by the first source terminal of logic switch sub-circuit 782(*b*) may be associated with "fail-safe" operation (referred to herein as a "fail-safe" voltage). A second source terminal of logic switch sub-circuit 782(*b*) receives the first pre-reference voltage (i.e., REFP_fs). Here, the voltage received by the second source terminal of logic switch sub-circuit 782(*b*) may be associated with "normal" operation (referred to herein as a "normal operation" voltage). A switching terminal of logic switch sub-circuit 782(*b*) receives voltage mode driver OE signals. By this mechanism, the voltage mode driver OE signals received at the switching terminal of logic switch sub-circuit 782(*b*) act as trigger for exiting/re-entering fail-safe operation. Namely, by default and/or in response to receiving a voltage mode driver disabling OE signal at its switching terminal (i.e., OE=0), logic switch sub-circuit 782(*b*) will supply, at its drain terminal, the "fail-safe" voltage received by the first source terminal of logic switch sub-circuit 782(*b*). Thus, the first reference voltage signal (i.e., REFP_DRIVER_FS) supplied to MPR 726 of voltage mode driver segment 720 may be the "fail-safe" voltage received by the first source terminal of logic switch sub-circuit 782(*b*). By contrast, in response to receiving a voltage mode driver enabling OE signal at its switching terminal (i.e., OE=1), logic switch sub-circuit 782(*b*) will supply, at its drain terminal, the "normal operation" voltage received by the second source terminal of logic switch sub-circuit 782(*b*). Thus, the first reference voltage signal (i.e., REFP_DRIVER_FS) supplied to MPR 726 of voltage mode driver segment 720 may be the "normal operation" voltage received by the second source terminal of logic switch sub-circuit 782(*b*).

To illustrate the concept, imagine that memory card 700 is mistakenly inserted into a non-memory card host (e.g., a nano-SIM host). In this scenario, the supply pin of memory card 700 may be floating while the supply voltage of the non-memory card host drives voltage of I/O pad 766 to non-zero values. In this situation, memory card 700 will not be able to successfully complete an initialization process with the non-memory card host. Accordingly, by default fail-safe reference voltage supply circuit 780 will operate in the fail-safe mode. Relatedly, when the supply pin of memory card 700 is floating, the POC signal received by pre-reference supply circuit 786 will be POC=0 (see e.g., table 900 of FIG. 9). Accordingly, the value of REFP_fs supplied by pre-reference supply circuit 786 will be the second I/O pad 766-based voltage (e.g., 0.5PAD).

Referring now to the operation of cascaded logic switch sub-circuits 782(*a-b*), with the MCIO supply line pad of memory card 700 floating, the first pre-reference voltage (i.e., REFP_fs) supplied at the second source terminal of logic switch sub-circuit 782(*a*) will be the second I/O pad 766-based voltage (e.g., 0.5PAD). The first source terminal of logic switch sub-circuit 782(*a*) will be supplied with the first I/O pad 766-based voltage (i.e., PAD). Regardless of which I/O pad 766-based voltage is higher (i.e., the first I/O pad 766-based voltage supplied at the first source terminal of logic switch sub-circuit 782(*a*) or the second I/O pad 766-based voltage supplied at the second source terminal of logic switch sub-circuit 782(*a*))—the drain terminal of logic switch sub-circuit 782(*a*) will supply an I/O pad 766-based voltage to the first source terminal of logic switch sub-circuit 782(*b*). As alluded to above, in the fail-safe mode (i.e., by default and/or in response to receiving a voltage mode driver disabling OE signal at its switching terminal), logic switch sub-circuit 782(*b*) will supply, at its drain terminal, the I/O pad 766-based voltage received by the first source terminal of logic switch sub-circuit 782(*b*). Accordingly, logic switch sub-circuit 782(*b*) will supply, to MPR 726, the I/O pad 766-based voltage (e.g., PAD) received at the first source terminal of logic switch sub-circuit 782(*b*). That is, the first reference voltage signal (i.e., REFP_DRIVER_FS) received by MPR 726 will be an I/O pad 766-based voltage (e.g., PAD). Such a reference voltage signal should provide effective protection to MPR 726 (and the other components of memory card 700)—even when the supply pin of memory card 700 is floating and voltage of I/O pad 766 is driven to non-zero values by the non-memory card host.

Referring now to cascaded logic switch sub-circuits 784 (*a-b*), cascaded logic switch sub-circuits 784(*a-b*) comprise logic switch sub-circuit 784(*a*) and logic switch sub-circuit 784(*b*).

As depicted, a first source terminal of logic switch sub-circuit 784(*a*) receives the first I/O pad 766-based voltage (i.e., PAD). As alluded to above, in certain embodiments the first I/O pad 766-based voltage (i.e., PAD) may be a CDM-protected version of the voltage of I/O pad 766. A second source terminal of logic switch sub-circuit 784(*a*) receives a second pre-reference voltage (i.e., REFN_fs). The value of REFN_fs may vary based in part on whether memory card 700's supply pin is floating. For example, when memory card 700's supply pin is floating (i.e., when voltage of MCIO supply line 730 is essentially 0 V), REFN_fs may be the second I/O pad 766-based voltage (e.g., 0.5PAD). By contrast, when memory card 700's MCIO supply line pad is non-floating, the value of REFN_fs may be an MCIO supply line 730-based voltage or an MCIO ground line 740-based voltage. For example, when voltage of MCIO supply line 730 is 1.8 V, REFN_fs may be VDDO. By contrast, when voltage of MCIO supply line 730 is 3.3 V, REFN_fs may be a fraction of VDDO (e.g., 0.55VDDO).

In response to receiving the first I/O pad 766-based voltage (i.e., PAD) and the second pre-reference voltage (i.e., REFN_fs) at its first and second source terminals respectively, logic switch sub-circuit 784(*a*) will supply the lower of the two voltages at its drain terminal. As depicted, the drain terminal of logic switch sub-circuit 784(*a*) is electrically connected to a first source terminal of logic switch sub-circuit 784(*b*)—thus the cascaded terminology.

As depicted, the first source terminal of logic switch sub-circuit 784(*b*) receives the voltage supplied by the drain terminal of logic switch sub-circuit 784(*a*)—which will be the lower of the first I/O pad 766-based voltage (i.e., PAD) and the second pre-reference voltage (i.e., REFN_fs). Here, the voltage received by the first source terminal of logic switch sub-circuit 784(*b*) may be a "fail-safe" voltage (as defined above). A second source terminal of logic switch sub-circuit 784(*b*) receives the second pre-reference voltage (i.e., REFN_fs). Here, the voltage received by the second source terminal of logic switch sub-circuit 784(*b*) may be a "normal operation" voltage (as defined above). A switching terminal of logic switch sub-circuit 784(*b*) receives voltage mode driver OE signals. By this mechanism, the voltage mode driver OE signals received at the switching terminal of logic switch sub-circuit 784(*b*) act as trigger for exiting/re-entering fail-safe operation. Namely, by default and/or in response to receiving a voltage mode driver disabling OE signal at its switching terminal (i.e., OE=0), logic switch sub-circuit 784(*b*) will supply, at its drain terminal, the "fail-safe" voltage received by the first source terminal of logic switch sub-circuit 784(*b*). Thus, the second reference voltage signal (i.e., REFN_DRIVER_FS) supplied to MNR 724 of voltage mode driver segment 720 may be the "fail-safe" voltage received by the first source terminal of logic switch sub-circuit 784(*b*). By contrast, in response to receiving a voltage mode driver enabling OE signal at its switching terminal (i.e., OE=1), logic switch sub-circuit 784(*b*) will supply, at its drain terminal, the "normal operation" voltage received by the second source terminal of logic switch sub-circuit 784(*b*). Thus, the second reference voltage signal (i.e., REFN_DRIVER_FS) supplied to MNR 724 of voltage mode driver segment 720 may be the "normal operation" voltage received by the second source terminal of logic switch sub-circuit 784(*b*).

To illustrate the concept, imagine again that memory card 700 is mistakenly inserted into a non-memory card host (e.g., a nano-SIM host). In this scenario, the supply pin of memory card 700 may be floating while the supply voltage of the non-memory card host drives voltage of I/O pad 766 to non-zero values. In this situation, memory card 700 will not be able to successfully complete an initialization process with the non-memory card host. Accordingly, by default fail-safe reference voltage supply circuit 780 will operate in the fail-safe mode. Relatedly, when the supply pin of memory card 700 is floating, the POC signal received by pre-reference supply circuit 786 will be POC=0 (see e.g., table 900 of FIG. 9). Accordingly, the value of REFN_fs supplied by pre-reference supply circuit 786 will be the second I/O pad 766-based voltage (e.g., 0.5PAD).

Referring now to the operation of cascaded logic switch sub-circuits 784(*a-b*), with the supply pin of memory card 700 floating, the second pre-reference voltage (i.e., REFN_fs) supplied at the second source terminal of logic switch sub-circuit 784(*a*) will be the second I/O pad 766-based voltage (e.g., 0.5PAD). The first source terminal of logic switch sub-circuit 784(*a*) will be supplied with the first I/O pad 766-based voltage (i.e., PAD). Regardless of which I/O pad 766-based voltage is lower (i.e., the first I/O pad 766-based voltage supplied at the first source terminal of logic switch sub-circuit 784(*a*) or the second I/O pad 766-based voltage supplied at the second source terminal of logic switch sub-circuit 784(*a*))—the drain terminal of logic switch sub-circuit 784(*a*) will supply an I/O pad 766-based voltage to the first source terminal of logic switch sub-circuit 784(*b*). As alluded to above, in the fail-safe mode (i.e., by default and/or in response to receiving a voltage mode driver disabling OE signal at its switching terminal), logic switch sub-circuit 784(*b*) will supply, at its drain terminal, the I/O pad 766-based voltage received by the first source terminal of logic switch sub-circuit 784(*b*). Accordingly, logic switch sub-circuit 784(*b*) will supply, to MNR 724, the I/O pad 766-based voltage (e.g., 0.5PAD) received at the first source terminal of logic switch sub-circuit 784(*b*). That is, the second reference voltage signal (i.e., REFN_DRIVER_FS) received by MNR 724 will be an I/O pad 766-based voltage (e.g., 0.5PAD). Such a reference voltage signal should provide effective protection to MNR 724 (and the other components of memory card 700)—even when the supply pin of memory card 700 is floating and voltage of I/O pad 766 is driven to non-zero values by the non-memory card host.

Voltage Mode Driver Segment 720

Voltage mode driver segment 720 may be the same/similar as voltage mode driver segment 620 described in conjunction with FIG. 6—and will not be described again for the sake of brevity.

ESD Float Rail 735

In some embodiments memory card 700 may further comprise ESD float rail 735. As alluded to above, by connecting n-terminals of certain components conventionally electrically connected between I/O pad 766 and MCIO supply line 730 to ESD float rail 735 instead—embodiments can reduce/eliminate electromigration-related degradation caused by currents flowing through these components when MCIO supply line 730 is at a lower voltage than I/O pad 766.

Accordingly, voltage of ESD float rail 735 may be set to the higher of the voltage of I/O pad 766 and voltage of MCIO supply line 730. In this way, current paths flowing from I/O pad 766 to MCIO supply line 730 (through components of memory card 700) may be eliminated/reduced.

As depicted, the MOS devices of voltage mode driver segment 720 (i.e., MPD 728, MPR 726, MNR 724, and MND 722) all include internal diodes. N-terminals of the internal diodes of MPD 728 and MPR 726 are electrically connected to ESD float rail 735. Such a design breaks from convention where these n-terminals would instead be electrically connected to MCIO supply line 730. However by connecting the n-terminals of the internal diodes of MPD 728 and MPR 726 to ESD float rail 735 instead, embodiments can reduce/eliminate electromigration-related degradation caused by currents flowing through these diodes when MCIO supply line 730 is at a lower voltage than I/O pad 766. As depicted, in some embodiments memory card 700 may further comprise a diode associated with the I/O pad (i.e., ESD diode 762—as depicted memory card 700 may also include ESD diode 764). In these embodiments, a p-terminal of ESD diode 762 may be electrically connected to I/O pad 766 while an n-terminal of ESD diode 762 is electrically connected to ESD float rail 735. Again, such a design breaks from convention where the n-terminal of ESD diode 762 would typically be electrically connected to MCIO supply line 730. However by connecting the n-terminal of ESD diode 762 to ESD float rail 735 instead, embodiments can reduce/eliminate electromigration-related degradation caused by currents flowing through ESD diode 762 when MCIO supply line 730 is at a lower voltage than I/O pad 766.

Figure 8:
FIG. 8 depicts a table illustrating example values for reference voltage signals and data-driven signals.

FIG. 8 depicts a table 800 illustrating example values for reference voltage signals and data-driven signals. Such values may be example values for the memory card architecture depicted in FIG. 6.

Referring now to table 800, "OE" may refer to voltage mode driver OE signals received by a conventional pre-driver (e.g., pre-driver 610). OE=0 may correspond to a voltage mode driver disabling OE signal. OE=1 may correspond to a voltage mode driver enabling OE signal.

"VDDO" may refer to voltage of an MCIO supply line of a memory card (e.g., voltage of MCIO supply line 630).

"POC" may refer to power on control (POC) signals received by a conventional pre-driver (e.g., pre-driver 610).

"LV" may refer to a signal named "low voltage" received by a conventional pre-driver (e.g., pre-driver 610).

"INPUT" may refer to the input signal received by a conventional pre-driver (e.g., pre-driver 610)

"PAD" may refer to voltage of a memory card transceiver I/O pad (e.g., I/O pad 666).

"REFP" may refer to a first reference voltage signal supplied by a conventional pre-driver (e.g., pre-driver 610).

"REFN" may refer to a second reference voltage signal supplied by a conventional pre-driver (e.g., pre-driver 610).

"DATA_P_B" may refer to a first data-driven voltage signal supplied by a conventional pre-driver (e.g., pre-driver 610) to a first data-driven voltage signal-receiving MOS device (e.g., MPD 628) of a voltage mode driver (e.g., voltage mode driver segment 620).

"DATA_N_B" may refer to a second data-driven voltage signal supplied by a conventional pre-driver (e.g., pre-driver 610) to a second data-driven voltage signal-receiving MOS device (e.g., MND 622) of a voltage mode driver (e.g., voltage mode driver segment 620).

FIG. 9 depicts a table 900 illustrating example values for pre-reference voltages, reference voltage signals, and data-driven signals, in accordance with various embodiments of the present technology. Such values may be example values for the memory card architecture depicted in FIGS. 7A-7B.

Referring now to table 900, "OE" may refer to voltage mode driver OE signals received by a fail-safe reference voltage supply circuit (e.g., fail-safe reference voltage supply circuit 780) of the present technology. OE=0 may correspond to a voltage mode driver disabling OE signal. OE=1 may correspond to a voltage mode driver enabling OE signal.

"VDDO" may refer to voltage of an MCIO supply line of a memory card (e.g., voltage of MCIO supply line 730).

"POC" may refer to power on control (POC) signals received by a fail-safe reference voltage supply circuit (e.g., fail-safe reference voltage supply circuit 780) of the present technology.

"LV" may refer to a signal named "low voltage" received by a fail-safe reference voltage supply circuit (e.g., fail-safe reference voltage supply circuit 780) of the present technology.

"INPUT" may refer to the input signal received by a fail-safe reference voltage supply circuit (e.g., fail-safe reference voltage supply circuit 780) of the present technology.

"PAD" may refer to voltage of a memory card transceiver I/O pad (e.g., I/O pad 766).

"REFP_fs" may refer to a first pre-reference voltage supplied by a pre-reference supply circuit (e.g., pre-reference supply circuit 786) of the present technology.

"REFN_fs" may refer to a second pre-reference voltage supplied by a pre-reference supply circuit (e.g., pre-reference supply circuit 786) of the present technology.

"REFP" may refer to a first reference voltage signal supplied by a conventional pre-driver (e.g., pre-driver 610). As alluded to above, REFP may be a value for REFP_fs when the MCIO supply line pad of a memory card is non-floating.

"REFN" may refer to a second reference voltage signal supplied by a conventional pre-driver (e.g., pre-driver 610). As alluded to above, REFN may be a value for REFN_fs when the MCIO supply line pad of a memory card is non-floating.

"DATA_P_B" may refer to a first data-driven voltage signal supplied by a fail-safe reference voltage supply circuit (e.g., fail-safe reference voltage supply circuit 780) to a first data-driven voltage signal-receiving MOS device (e.g., MPD 728) of a voltage mode driver (e.g., voltage mode driver segment 620).

"DATA_N_B" may refer to a second data-driven voltage signal supplied by a fail-safe reference voltage supply circuit (e.g., fail-safe reference voltage supply circuit 780) to a second data-driven voltage signal-receiving MOS device (e.g., MND 722) of a voltage mode driver (e.g., voltage mode driver segment 720).

Figure 10:
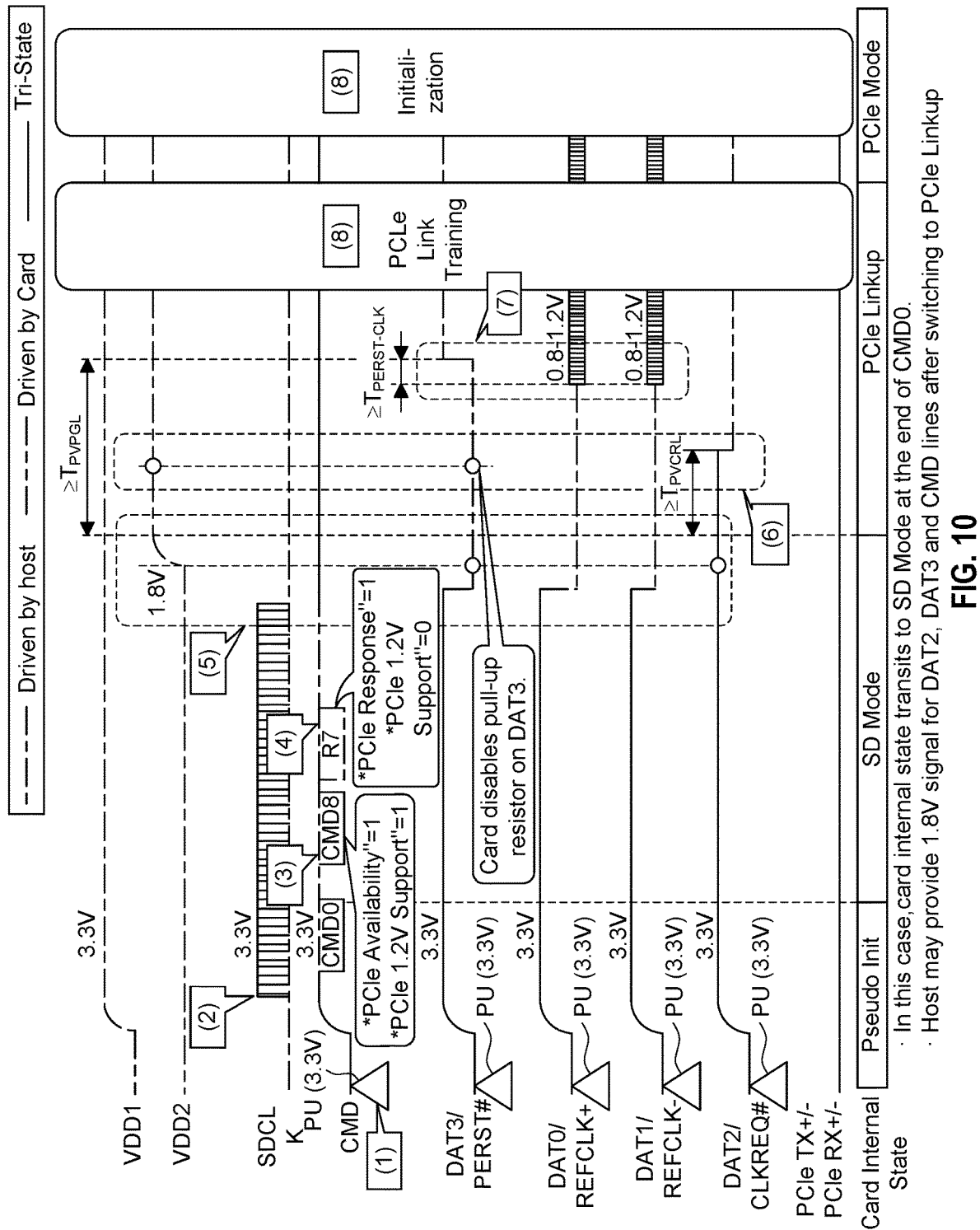
FIG. 10 depicts an example initialization process between a memory card and a memory card host, in accordance with various embodiments of the present technology.

FIG. 10 depicts an example initialization process 1000 between a memory card and a memory card host, in accordance with various embodiments of the present technology. In various examples, the memory card host may be a high voltage signalizing (HVS) memory card host.

As alluded to above, a memory card of the present technology may operate in a fail-safe mode by default until an initialization process has been successfully completed between the memory card and a host into which the memory card is inserted. Because a (mistakenly inserted) memory card could not complete such an initialization process with a non-memory card host (e.g., a nano-SIM host), such a design feature ensures that during mistaken insertion scenarios the memory card only operates in the fail-safe mode.

As depicted, in the example HVS initialization process of FIG. 10, complete signaling may occur in 3.3 V domain. As shown, the memory card host may commence the initialization process by pulling up the command line (i.e., CMD) and data lines (i.e., DAT0, DAT1, DAT2, DAT3, etc.) of the memory card to 3.3V. The memory card host may provide a supply voltage VDD1 to the memory card. Once the supply voltage VDD1 is stable, the memory card host may provide SDCLK to the memory card and issue CMD0.

Figure 11A:
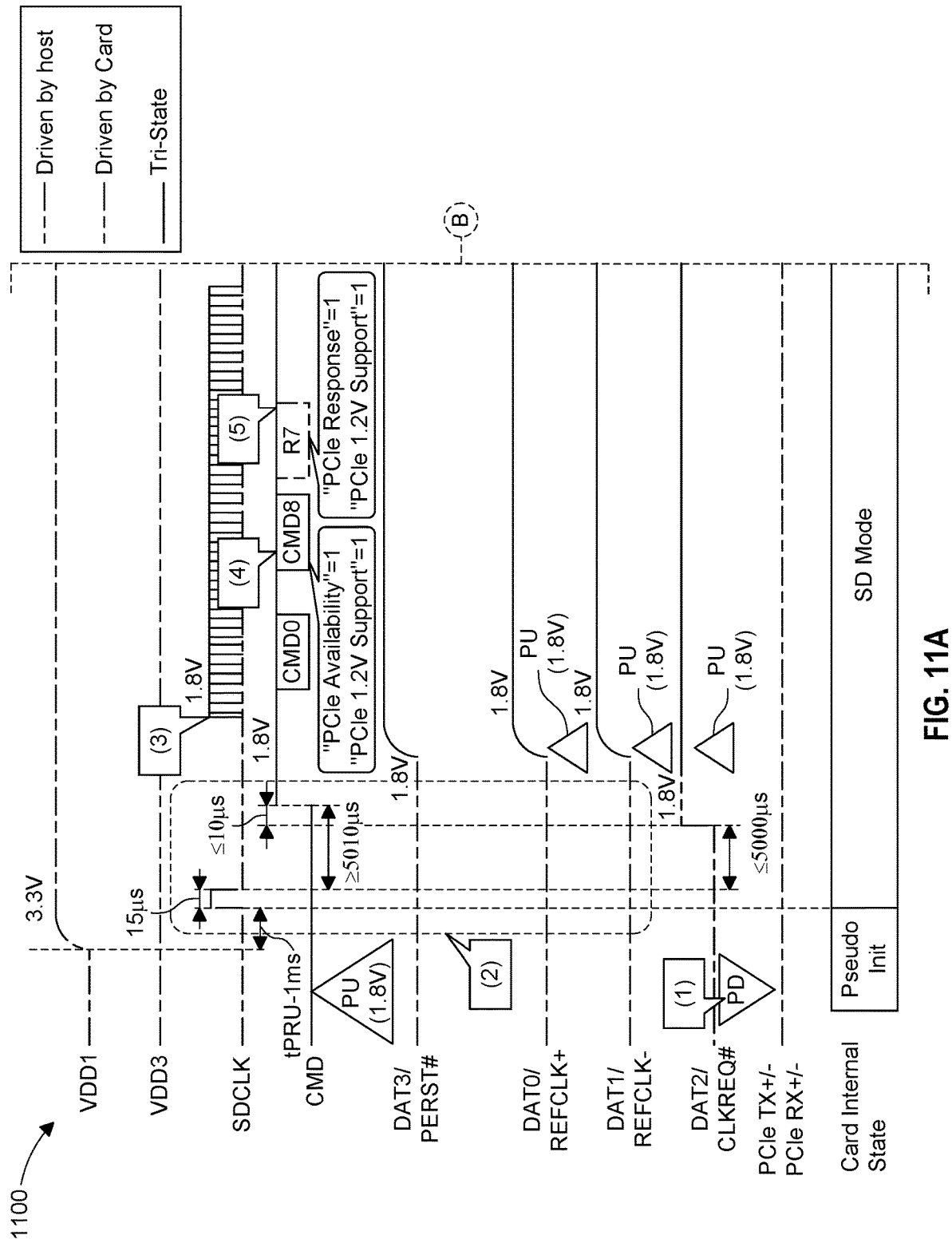
FIGS. 11A and 11B depict another example initialization process between a memory card and a memory card host, in accordance with various embodiments of the present technology.
Figure 11B:
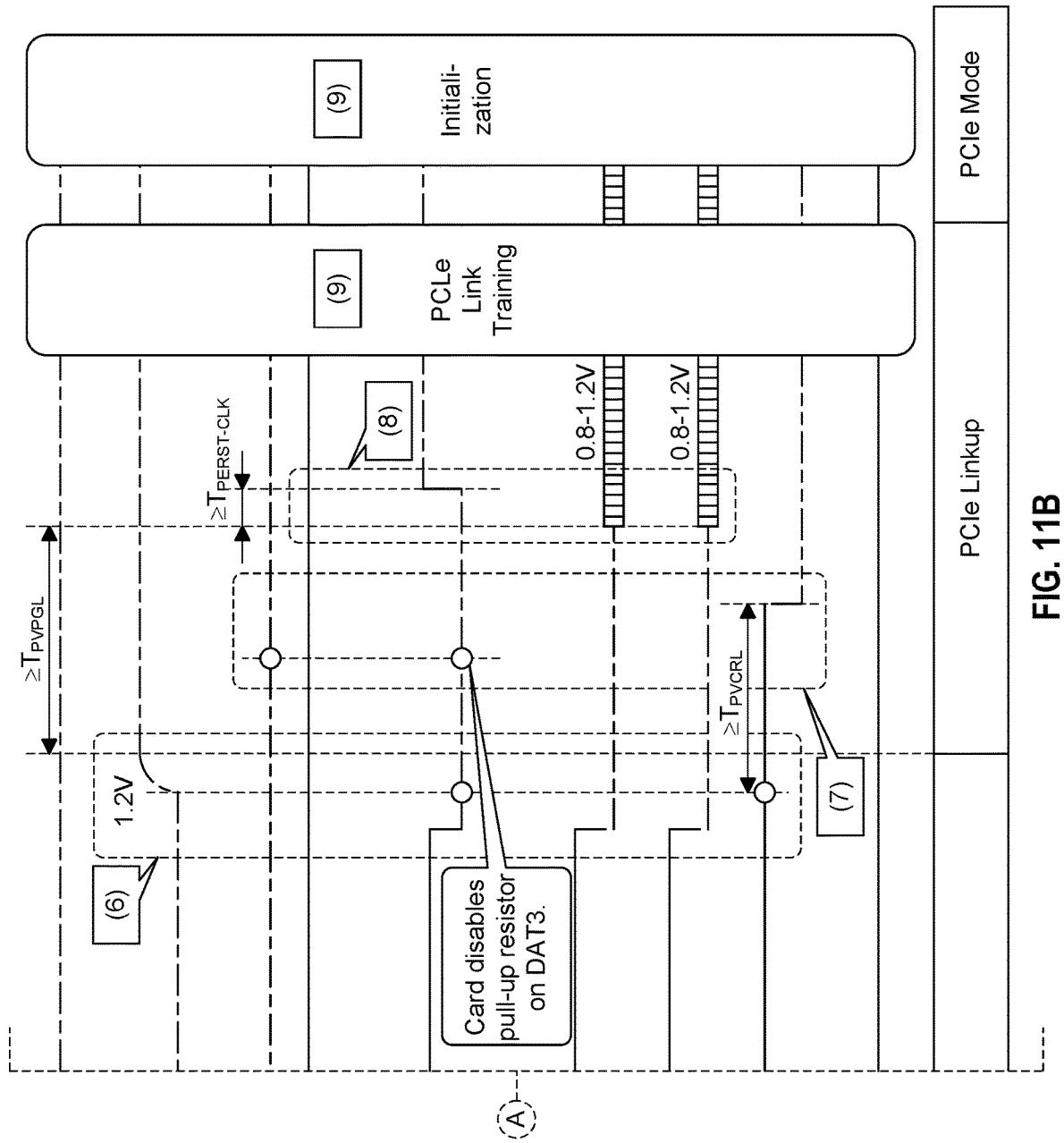

FIGS. 11A and 11B depict another example initialization process 1100 between a memory card and a memory card host, in accordance with various embodiments of the present technology. In various examples, the memory card host may be a low voltage signalizing (LVS) memory card host.

As depicted, in the example LVS initialization process of FIGS. 11A-11B, complete signaling may occur in the 1.8 V domain. As shown, the memory card host may commence the initialization process by driving the SDCLK, CMD, DAT0, DAT1 and DAT3 lines of the memory card low, and pulling down the DAT2 line of the memory card. After this, the memory card host may provide a supply voltage VDD1 to the memory card and execute an LVS identification sequence during which the memory card identifies that the memory card host is a memory card LVS host by checking pulse width of a SDCLK pulse as well as voltage levels of CMD and data lines DAT0-DAT3.

During both example initialization processes 1000 and 1100, the memory card will not generally need to switch on any data line or command lines transmitters. That is, only receivers associated with these lines will be turned on. Through initialization processes 1000 and 1100, the control/processing circuitry of the memory card can determine that the host is in fact a memory card host. Accordingly, after successful completion of either of initialization processes 1000 or 1100, the control/processing circuitry of the memory card exit fail-safe mode based on requirement.

Figure 12A:
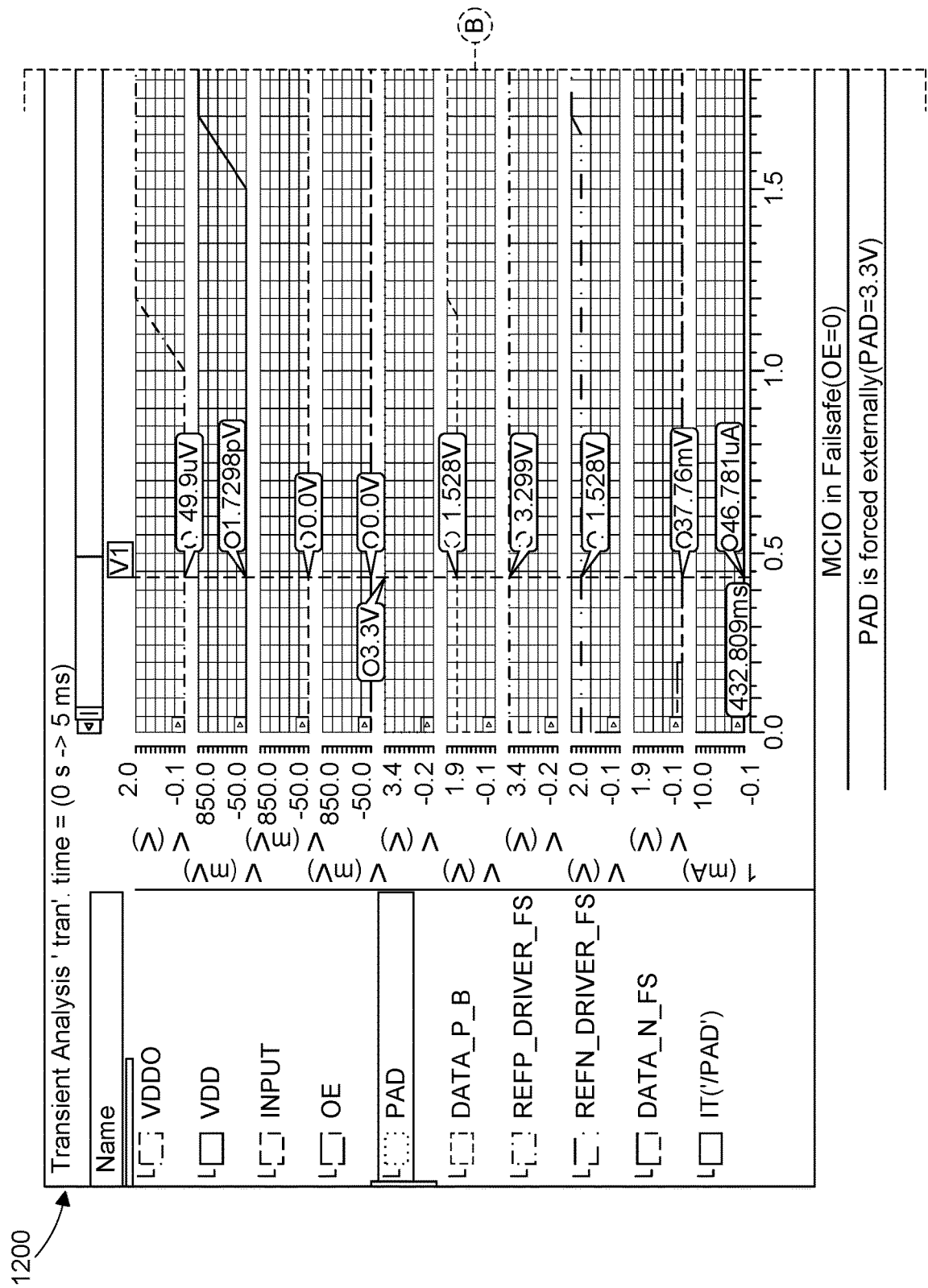
FIGS. 12A and 12B depict example simulation results for a fail-safe architecture in accordance with various embodiments of the present technology.
Figure 12B:
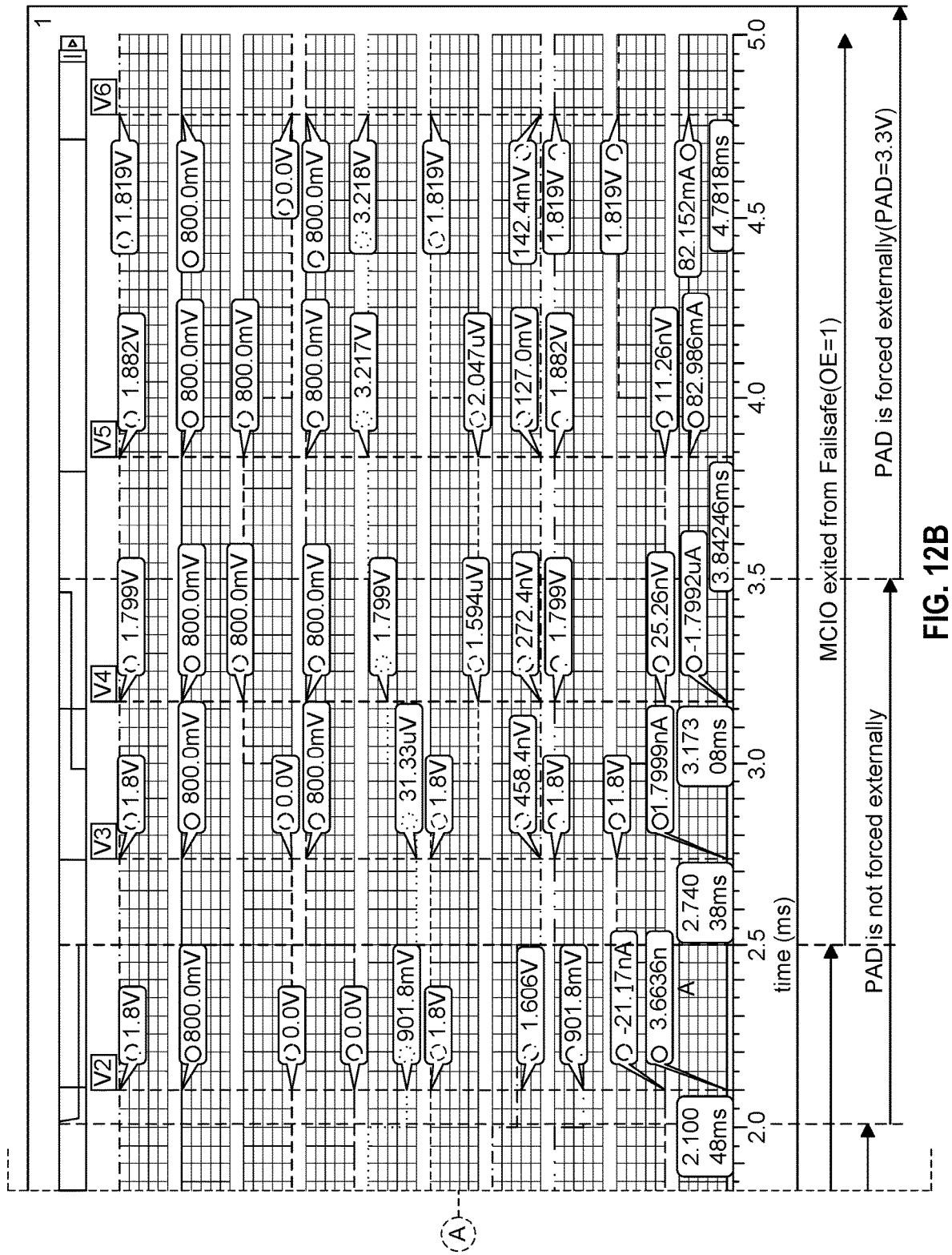
Figure 13A:
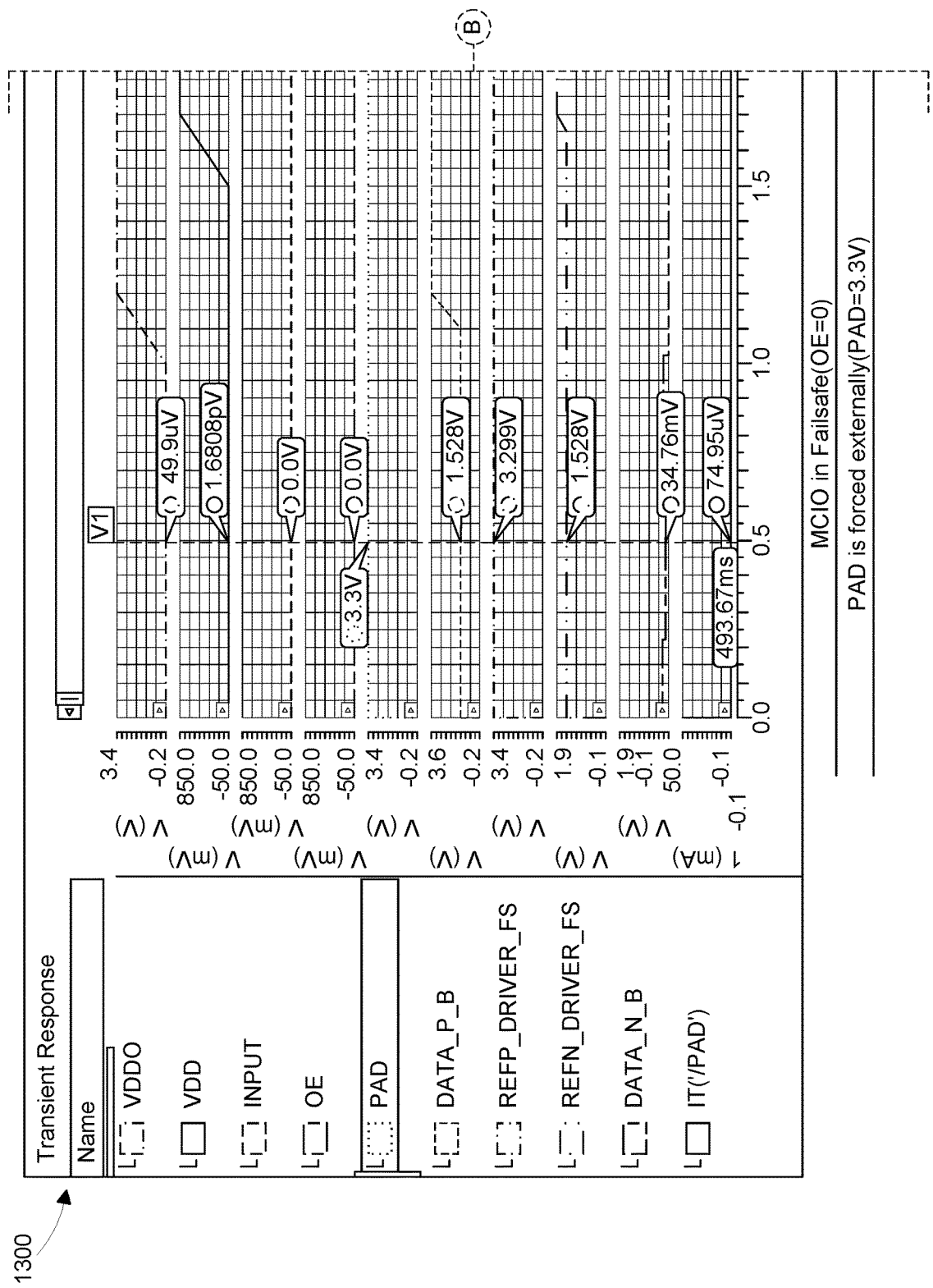
FIGS. 13A and 13B depict further example simulation results for a fail-safe architecture in accordance with various embodiments of the present technology.
Figure 13B:
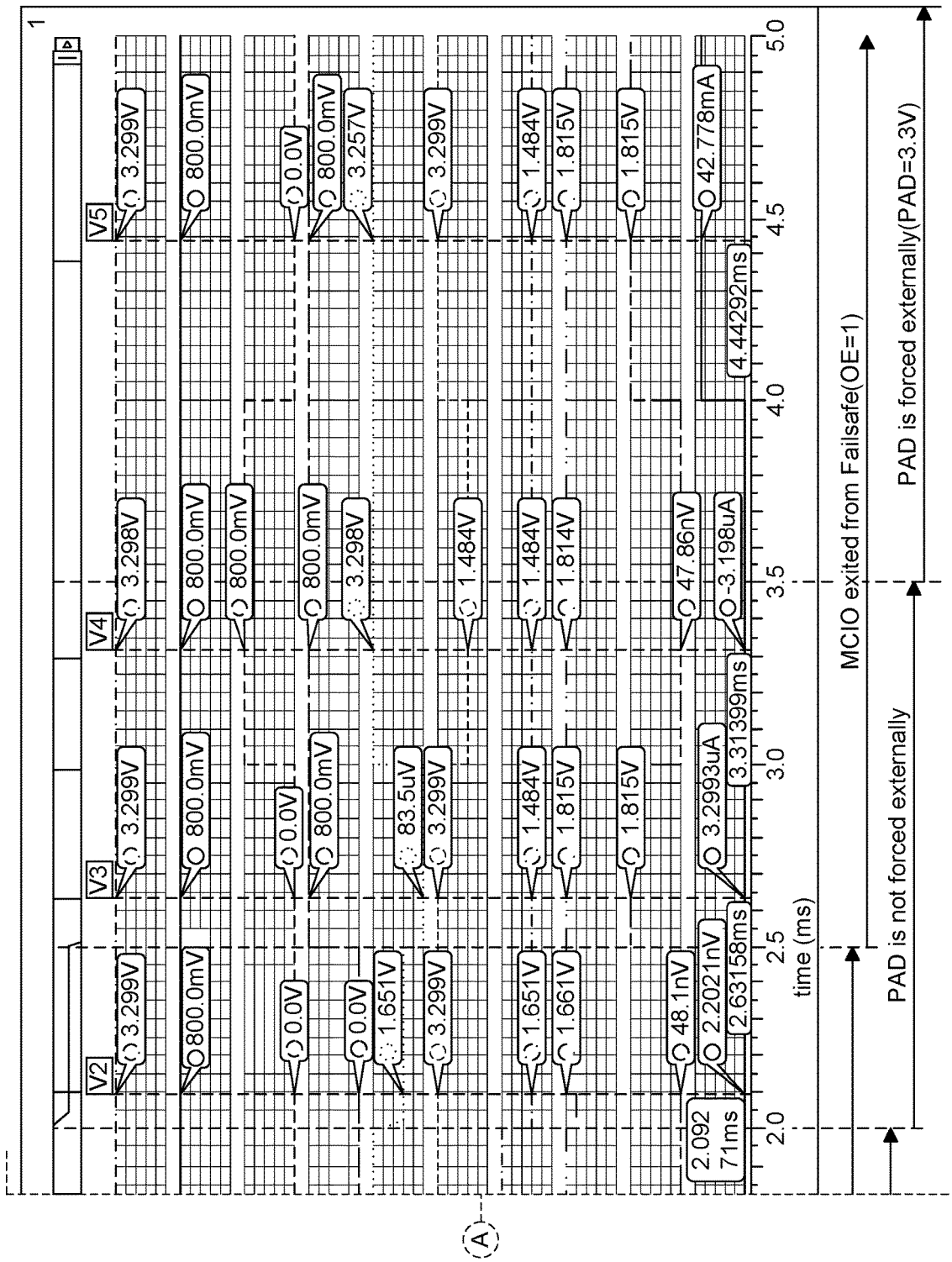

FIGS. 12A, 12B, 13A, and 13B depict example simulations results for fail-safe architectures of the present technology. In particular, diagram 1200 of FIGS. 12A-12B depicts example simulation results when the MCIO supply line voltage of a memory card is 1.8 V. Diagram 1300 of FIGS. 13A-13B depicts example simulation results when the MCIO supply line voltage of a memory card is 3.3 V.

As depicted in diagrams 1200 and 1300, the fail-safe architectures of the present technology operate in fail-safe mode until OE=1 and then move smoothly to normal operation mode.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A memory card comprising:
   an input/output (I/O) pad;
   a voltage mode driver comprising a reference voltage signal-receiving device, wherein a drain terminal of the reference voltage signal-receiving device is electrically connected to the I/O pad; and
   a fail-safe reference voltage signal supply circuit comprising:
     a first logic switch sub-circuit comprising:
       a first source terminal that receives an I/O pad-based voltage,
       a second source terminal that receives a pre-reference voltage, and
       a drain terminal that supplies, to a first source terminal of a second logic switch sub-circuit, higher of the voltages received by the first and second source terminals of the first logic switch sub-circuit; and
     the second logic switch sub-circuit comprising:
       the first source terminal that receives the voltage supplied from the drain terminal of the first logic switch sub-circuit,
       a second input terminal that receives the pre-reference voltage,
       a switching terminal that receives voltage mode driver output enable (OE) signals, and
       a drain terminal that supplies a reference voltage signal to a gate terminal of the reference voltage signal-receiving device such that:
         by default, the reference voltage signal comprises the voltage received by the first source terminal of the second logic switch sub-circuit, and
         in response to the switching terminal of the second logic switch sub-circuit receiving a voltage mode driver OE signal, the reference voltage signal comprises the voltage received by the second source terminal of the second logic switch sub-circuit.

2. The memory card of claim 1, wherein:
   the fail-safe reference voltage signal supply circuit operates in a fail-safe mode by default; and the fail-safe reference voltage signal supply circuit switches to a normal operation mode in response to receiving the voltage mode driver OE signal.

3. The memory card of claim 2, wherein:
the reference voltage signal comprises the I/O pad-based voltage when the fail-safe reference voltage signal supply circuit operates in the fail-safe mode and a supply pin of the memory card is floating.

4. The memory card of claim 3, wherein, when the fail-safe reference voltage signal supply circuit operates in the fail-safe mode and the supply pin is floating:
the pre-reference voltage is a second I/O pad-based voltage.

5. The memory card of claim 2, wherein:
the voltage mode driver further comprises a data-driven signal-receiving MOS device;
a source terminal of the data-driven signal-receiving device is electrically connected to a supply line of an I/O domain of the memory card;
a drain terminal of the data-driven signal-receiving device is connected to a source terminal of the first reference voltage signal-receiving device;
a gate terminal of the data-driven signal-receiving device is supplied with a data-driven voltage signal; and
when the fail-safe reference voltage signal supply circuit operates in the fail-safe mode and the supply pin is floating the data-driven voltage signal is the I/O pad-based voltage.

6. The memory card of claim 5, further comprising an electrostatic discharge (ESD) float rail.

7. The memory card of claim 6, wherein:
the data-driven signal-receiving device includes a first internal diode;
the reference voltage signal-receiving device includes a second internal diode;
negative terminals of the first and second internal diodes respectively are electrically connected to the ESD float rail; and
voltage of the ESD float rail is higher of voltage of the I/O pad and voltage of the supply line of the I/O domain of the memory card.

8. The memory card of claim 7, further comprising a diode associated with the I/O pad, wherein:
a positive terminal of the diode is electrically connected to the I/O pad; and
a negative terminal of the diode is electrically connected to the ESD float rail.

9. A memory card comprising:
an I/O pad;
a voltage mode driver comprising a reference voltage signal-receiving device, wherein a drain terminal of the reference voltage signal-receiving device is electrically connected to the I/O pad; and
a fail-safe reference voltage signal supply circuit comprising:
a first logic switch sub-circuit comprising:
a first source terminal that receives an I/O pad-based voltage,
a second source terminal that receives a pre-reference voltage, and
a drain terminal that supplies, to a first source terminal of a second logic switch sub-circuit, higher of the voltages received by the first and second source terminals of the first logic switch sub-circuit; and the second logic switch sub-circuit comprising:
the first source terminal that receives the voltage supplied from the drain terminal of the first logic switch sub-circuit,
a second input terminal that receives the pre-reference voltage,
a switching terminal that receives voltage mode driver OE signals, and
a drain terminal that supplies a reference voltage signal to a gate terminal of the reference voltage signal-receiving device such that:
by default, the reference voltage signal comprises the voltage received by the first source terminal of the second logic switch sub-circuit, and
in response to the switching terminal of the second logic switch sub-circuit receiving a voltage mode driver OE signal, the reference voltage signal comprises the voltage received by the second source terminal of the second logic switch sub-circuit;
wherein:
the fail-safe reference voltage signal supply circuit operates in a fail-safe mode by default, and
the fail-safe reference voltage signal supply circuit switches to a normal operation mode in response to receiving the voltage mode driver OE signal.

10. The memory card of claim 9, wherein the reference voltage signal comprises the I/O pad-based voltage when the fail-safe reference voltage signal supply circuit operates in the fail-safe mode and a supply pin of the memory card is floating.

11. The memory card of claim 10, wherein the I/O pad-based voltage comprises a charge device model (CDM)-protected version of voltage of the I/O pad.

12. The memory card of claim 10, wherein, when the fail-safe reference voltage signal supply circuit operates in the fail-safe mode and the supply pin is floating:
the pre-reference voltage is a second I/O pad-based voltage.

13. The memory card of claim 10, wherein:
the voltage mode driver further comprises a data-driven signal-receiving device;
a source terminal of the data driven signal-receiving device is electrically connected to a supply line of an I/O domain of the memory card;
a drain terminal of the data-driven signal-receiving device is connected to a source terminal of the reference voltage signal-receiving device;
a gate terminal of the data-driven signal-receiving device is supplied with a data-driven voltage signal; and
when the fail-safe reference voltage signal supply circuit operates in the fail-safe mode and the supply pin is floating the data-driven voltage signal is the I/O pad-based voltage.

14. The memory card of claim 13, further comprising an ESD float rail, wherein:
the data-driven signal-receiving device includes a first internal diode;
the reference voltage signal-receiving device includes a second internal diode;
negative terminals of the first and second internal diodes respectively are electrically connected to the ESD float rail; and
voltage of the ESD float rail is higher of voltage of the I/O pad and voltage of the supply line of the I/O domain of the memory card.

15. The memory card of claim 14, further comprising a diode associated with the I/O pad, wherein:
- a positive terminal of the diode is electrically connected to the I/O pad; and
- a negative terminal of the diode is electrically connected to the ESD float rail.

16. A memory card comprising:
an I/O pad;
a voltage mode driver comprising a reference voltage signal-receiving device, wherein a drain terminal of the reference voltage signal-receiving device is electrically connected to the I/O pad;
a fail-safe reference voltage signal supply circuit comprising:
- a first logic switch sub-circuit comprising:
  - a first source terminal that receives an I/O pad-based voltage,
  - a second source terminal that receives a pre-reference voltage, and
  - a drain terminal that supplies, to a first source terminal of a second logic switch sub-circuit, higher of the voltages received by the first and second source terminals of the first logic switch sub-circuit; and
- the second logic switch sub-circuit comprising:
  - the first source terminal that receives the voltage supplied from the drain terminal of the first logic switch sub-circuit,
  - a second input terminal that receives the pre-reference voltage,
  - a switching terminal that receives voltage mode driver output enable (OE) signals, and
  - a drain terminal that supplies a reference voltage signal to a gate terminal of the reference voltage signal-receiving device such that:
    - by default, the reference voltage signal comprises the voltage received by the first source terminal of the second logic switch sub-circuit, and
    - in response to the switching terminal of the second logic switch sub-circuit receiving a voltage mode driver OE signal, the reference voltage signal comprises the voltage received by the second source terminal of the second logic switch sub-circuit;

wherein:
the fail-safe reference voltage signal supply circuit operates in a fail-safe mode by default,
the fail-safe reference voltage signal supply circuit operates in a normal operation mode in response to receiving the voltage mode driver OE signal, and
the reference voltage signal is an I/O pad-based voltage when the fail-safe reference voltage signal supply circuit operates in the fail-safe mode and a supply pin of the memory card is floating.

17. The memory card of claim 16, wherein the I/O pad-based voltage pad comprises a CDM-protected version of voltage of the I/O pad.

18. The memory card of claim 16, further comprising an ESD float rail.

19. The memory card of claim 1, wherein the I/O pad-based voltage comprises a charge device model (CDM)-protected version of voltage of the I/O pad.

* * * * *